(12) United States Patent
Yamazaki

(10) Patent No.: US 9,415,578 B2
(45) Date of Patent: *Aug. 16, 2016

(54) PLATEMAKING METHOD, PLATEMAKING DEVICE, PRINTING PRESS, AND PRINTING PLATE

(71) Applicant: FUJIFILM Corporation, Tokyo (JP)

(72) Inventor: Yoshirou Yamazaki, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/861,845

(22) Filed: Sep. 22, 2015

(65) Prior Publication Data
US 2016/0009071 A1    Jan. 14, 2016

Related U.S. Application Data

(63) Continuation of application No. PCT/JP2014/058440, filed on Mar. 26, 2014.

(30) Foreign Application Priority Data

Mar. 29, 2013  (JP) .................................. 2013-074304

(51) Int. Cl.
| | |
|---|---|
| *B41C 1/05* | (2006.01) |
| *B23K 26/36* | (2014.01) |
| *B41N 1/16* | (2006.01) |
| *B41N 1/22* | (2006.01) |
| *B41C 1/00* | (2006.01) |
| *B41N 1/12* | (2006.01) |

(52) U.S. Cl.
CPC .................. *B41C 1/05* (2013.01); *B23K 26/362* (2013.01); *B41N 1/16* (2013.01); *B41C 1/00* (2013.01); *B41N 1/12* (2013.01); *B41N 1/22* (2013.01)

(58) Field of Classification Search
CPC .............. B41N 1/12; B41N 1/16; B41N 1/22; B41C 1/00; B41C 1/003; B41C 1/045; B41C 1/05; B41C 1/18
See application file for complete search history.

(56) References Cited

U.S. PATENT DOCUMENTS

| | | | |
|---|---|---|---|
| 2010/0242760 A1* | 9/2010 | Otsuka ................ | B41F 27/1275 101/382.1 |
| 2011/0252990 A1 | 10/2011 | Shimazaki et al. | |
| 2011/0255134 A1* | 10/2011 | Shigeta ..................... | B41C 1/05 358/3.3 |

FOREIGN PATENT DOCUMENTS

| | | |
|---|---|---|
| JP | 2010-100019 A | 5/2010 |
| JP | 2011-224878 A | 11/2011 |
| JP | 2012-074281 A | 4/2012 |

OTHER PUBLICATIONS

International Search Report (ISR) (PCT Form PCT/ISA/210), in PCT/JP2014/058440, dated Jun. 24, 2014.
Written Opinion of the ISA/JPO (PCT/ISA/237) (and English translation thereof) in International Patent Application No. PCT/JP2014/058440, dated Jun. 24, 2014.
United States Notice of Allowance dated Apr. 14, 2016 in co-pending U.S. Appl. No. 14/851,889.

* cited by examiner

*Primary Examiner* — Blake A Tankersley
(74) *Attorney, Agent, or Firm* — McGinn IP Law Group PLLC

(57) ABSTRACT

There is provided a platemaking method of forming relief based on relief pattern data in a printing plate to be pressed on a printing medium, and the platemaking method includes the steps of: acquiring setting printing pressure; estimating distribution of printing pressure on the basis of image data; calculating an amount of correction of the relief pattern data on the basis of the distribution of printing pressure and setting printing pressure; correcting the relief pattern data on the basis of the amount of correction, and acquiring exposure amount data from engraving shape data corrected. It is possible to form relief in consideration of deformation of a printing plate in accordance with the distribution of printing pressure and the setting printing pressure in the printing plate to favorably print and reproduce an image on a printing medium.

13 Claims, 41 Drawing Sheets

A → WHITE SPACE AREA | DOT AREA | SOLID FILL AREA

HIGH PRINTING PRESSURE AREA | LOW PRINTING PRESSURE AREA

A → WHITE SPACE AREA | DOT AREA | SOLID FILL AREA

FIG.21

|  | AMOUNT OF CORRECTION 1 | AMOUNT OF CORRECTION 2 | AMOUNT OF CORRECTION 3 | AMOUNT OF CORRECTION 4 | AMOUNT OF CORRECTION 5 |
|---|---|---|---|---|---|
| DOT | DOT EXPOSURE TABLE 1 | DOT EXPOSURE TABLE 2 | DOT EXPOSURE TABLE 3 | DOT EXPOSURE TABLE 4 | DOT EXPOSURE TABLE 5 |
| PROTRUDED THIN LINE | PROTRUDED THIN LINE EXPOSURE TABLE 1 | PROTRUDED THIN LINE EXPOSURE TABLE 2 | PROTRUDED THIN LINE EXPOSURE TABLE 3 | PROTRUDED THIN LINE EXPOSURE TABLE 4 | PROTRUDED THIN LINE EXPOSURE TABLE 5 |
| OTHER | OTHER EXPOSURE TABLE 1 | OTHER EXPOSURE TABLE 2 | OTHER EXPOSURE TABLE 3 | OTHER EXPOSURE TABLE 4 | OTHER EXPOSURE TABLE 5 |

FIG.23

| SETTING PRINTING PRESSURE 1 | SETTING PRINTING PRESSURE 2 | SETTING PRINTING PRESSURE 3 | SETTING PRINTING PRESSURE 4 | SETTING PRINTING PRESSURE 5 |
|---|---|---|---|---|
| PRINTING PRESSURE MANAGEMENT CHART EXPOSURE TABLE 1 | PRINTING PRESSURE MANAGEMENT CHART EXPOSURE TABLE 2 | PRINTING PRESSURE MANAGEMENT CHART EXPOSURE TABLE 3 | PRINTING PRESSURE MANAGEMENT CHART EXPOSURE TABLE 4 | PRINTING PRESSURE MANAGEMENT CHART EXPOSURE TABLE 5 |

FIG.35

| FOCUS POSITION f-2 (HEIGHT: -40μm) | FOCUS POSITION f-1 (HEIGHT: -20μm) | FOCUS POSITION f0 (HEIGHT: 0) | FOCUS POSITION f+1 (HEIGHT: +20μm) | FOCUS POSITION f+2 (HEIGHT: +40μm) |
|---|---|---|---|---|
| EXPOSURE TABLE FOR ACHIEVING SHAPE CORRECTION (HEIGHT: -40μm) | EXPOSURE TABLE FOR ACHIEVING SHAPE CORRECTION (HEIGHT: -20μm) | EXPOSURE TABLE FOR ACHIEVING SHAPE CORRECTION (HEIGHT: 0) | EXPOSURE TABLE FOR ACHIEVING SHAPE CORRECTION (HEIGHT: +20μm) | EXPOSURE TABLE FOR ACHIEVING SHAPE CORRECTION (HEIGHT: +40μm) |

FIG.36

| FOCUS POSITION f-2 (HEIGHT: -40μm) | FOCUS POSITION f-1 (HEIGHT: -20μm) | FOCUS POSITION f0 (HEIGHT: 0) | FOCUS POSITION f+1 (HEIGHT: +20μm) | FOCUS POSITION f+2 (HEIGHT: +40μm) |
|---|---|---|---|---|
| EXPOSURE TABLE FOR ACHIEVING SETTING PRINTING PRESSURE MANAGEMENT (HEIGHT: -40μm) | EXPOSURE TABLE FOR ACHIEVING SETTING PRINTING PRESSURE MANAGEMENT (HEIGHT: -20μm) | EXPOSURE TABLE FOR ACHIEVING SETTING PRINTING PRESSURE MANAGEMENT (HEIGHT: 0) | EXPOSURE TABLE FOR ACHIEVING SETTING PRINTING PRESSURE MANAGEMENT (HEIGHT: +20μm) | EXPOSURE TABLE FOR ACHIEVING SETTING PRINTING PRESSURE MANAGEMENT (HEIGHT: +40μm) |

PLATEMAKING METHOD, PLATEMAKING DEVICE, PRINTING PRESS, AND PRINTING PLATE

CROSS-REFERENCE TO RELATED APPLICATIONS

This application is a Continuation of PCT International Application No. PCT/JP2014/058440 filed on Mar. 26, 2014, which claims priority under 35 U.S.C. §119(a) to Japanese Patent Application No. 2013-074304 filed on Mar. 29, 2013. Each of the above application(s) is hereby expressly incorporated by reference, in its entirety, into the present application.

BACKGROUND OF THE INVENTION

1. Field of the Invention

The present invention relates to a platemaking method, a platemaking device, a printing press, and a printing plate, and more particularly to a printing plate that is made by applying laser engraving to a flexographic plate, for example.

2. Description of the Related Art

Printing letterpress is widely adopted in the field of printing, such as flexographic printing, and particularly in recent years, the flexographic printing has received widespread attention as an eco-friendly printing method.

In the flexographic printing, printing is performed by using a soft and flexible plate and ink (such as water-based ink, and UV ink). The plate used in the flexographic printing is deformed in accordance with printing pressure (pressed amount) due to its flexibility. Accordingly, a flexographic printing plate enables favorable transfer printing to be applied also to a printing medium, such as corrugated cardboard whose surface has asperities, by properly following the surface to be brought into close contact with the surface.

Japanese Patent Application Laid-Open No. 2011-224878 (hereinafter referred to as PTL 1) discloses printing letterpress to be adopted in flexographic printing. The printing letterpress has a plurality of kinds of dot main protrusion each of whose height in a printing surface is different from each other in a tint area. In PTL 1, local expansion of a small dot is avoided to eliminate occurrence of non-printing failure near a solid portion, thereby eliminating instability in printing pressure caused by reducing height of a part of the dot protrusions.

Japanese Patent Application Laid-Open No. 2012-074281 (hereinafter referred to as PTL 2) discloses a printing plate for preventing a transfer area formed on a surface of an object to be transferred by transferring a pattern area of the printing plate from being formed in a trapezoid shape stretched from the pattern area. In the printing plate, there is provided a pattern area reduced from pattern area data, and in the pattern area, a reduction ratio of a portion existing on a front end side in a rotation direction of a plate cylinder, to which transfer printing is to be applied earlier, is lower than a reduction ratio of a portion existing on a rear end side therein, to which the transfer printing is to be applied later.

SUMMARY OF THE INVENTION

As ideal plate deformation characteristics of a printing plate to be used in flexographic printing or the like, it is desirable that vicinity of a surface (a portion required for ink transfer) of the printing plate is not deformed by printing pressure during printing, but the printing plate (a relief portion) is deformed so as to sink only in a height direction. Unfortunately, in actual printing, the printing plate is deformed from vicinity of the surface of the printing plate.

This kind of deformation of a printing plate varies in accordance with the amplitude of printing pressure occurring between a printing medium and the printing plate. The printing pressure between the printing plate and the printing medium varies depending on a relief shape of the printing plate, and is affected by a size of contact area between them. That is, in the printing plate, there is a tendency to allow printing pressure to increase more in an area (such as a dot (isolated point) forming area) having a relatively small contact area due to concentration of pressure than in an area (such as a solid fill area) having a relatively large contact area. Accordingly, there is a tendency to allow deformation of a plate to increase more in an area having a relatively small contact area than in an area having a relatively large contact area to cause a printed image on a printing medium to expand.

In addition, deviation in printing pressure is affected by not only a size (relief shape) of contact area of an area of interest but also a summation (relief shape) of contact area in a peripheral area including the area of interest, so that the printing pressure (a pressed amount of a printing plate) in the area of interest varies depending on a kind of peripheral image (such as a solid region, a dot percent, and a white patch).

Accordingly, in an area (such as an isolated point) with a small contact area, a way of expansion of a printed image on a printing medium is different between a case where there is an area (such as a solid fill) with a large contact area in neighborhood and a case other than that. Thus, image density reproduced on a printing medium may vary depending on a kind of relief of a peripheral area even in a dot formation area with the same contact area ratio to cause various kinds of degradation in image quality, such as that an isolated point or a thin line expands, to occur in a different region in the image. As above, in a conventional flexographic printing technique, it is difficult to ensure uniform printing reproducibility in an image because a dot and a thin line become thick or thin more than expected.

In addition, also in a case where there are variations in thickness of a printing plate, reproducibility of a printed image on a printing medium is unstable. If there is thickness distribution in a printing plate in itself due to a manufacturing error, or the like, a position (height) of the apex of relief at each of a thick portion and a thin portion of the printing plate is different even if having the same relief (engraving structure). That is, the position of the apex of relief at the thick portion becomes relatively high, and the position of the apex of relief at the thin portion becomes relatively low. Thus, in a printing plate having variations in thickness, printing pressure changes in accordance with distribution of the thickness, so that a way of expansion of an image reproduced on a printing medium differs depending on plate thickness.

Although there is a request that setting printing pressure during printing is wanted to be changed on a user side, if the setting printing pressure is changed, a way of expansion of an image reproduced on a printing medium varies, combined with a kind of relief in a peripheral area and distribution of plate thickness, described above. That is, it is expected that there is a case where a thick image or a thin image as a whole is printed according to user's preference by allowing general printing pressure (setting printing pressure) to be adjustable. In such a case, if the user changes setting printing pressure, printing pressure different from printing pressure intended by the user may be applied by being affected by a kind of relief, distribution of plate thickness, or the like, whereby a desired image cannot be accurately printed. Thus, it is desired to provide a method capable of simply checking whether or not actual printing is performed by setting printing pressure intended by a user.

The present invention is made in light of the above-mentioned circumstances, and it is one object of the present invention to provide a technique capable of reproducing a favorable image on a printing medium by determining relief (engraving shape) of a printing plate in consideration of deformation of the printing plate in accordance with distribution of printing pressure and setting printing pressure even if setting printing pressure is changeable.

In addition, it is another object of the present invention to provide a printing management technique of managing target printing pressure for printing at printing pressure suitable for a relief shape formed (engraved) in a printing plate.

One aspect of the present invention relates to a platemaking method of forming relief based on relief pattern data in a printing plate to be pressed on a printing medium, and the platemaking method includes the steps of: acquiring setting printing pressure; calculating relief pattern data on the basis of image data; estimating distribution of printing pressure of a printing plate pressed on a printing medium on the basis of the image data; calculating an amount of correction of the relief pattern data on the basis of the distribution of printing pressure and the setting printing pressure; and correcting the relief pattern data on the basis of the amount of correction.

According to the present aspect, distribution of printing pressure is accurately acquired from image data, and the amount of correction of relief pattern data is calculated on the basis of the distribution of printing pressure and setting printing pressure so that relief pattern data is corrected on the basis of the amount of correction calculated. Thus, it is possible to perform correction of the relief pattern data and determination of relief in consideration of deformation of a printing plate in accordance with the distribution of printing pressure and the setting printing pressure to enable a favorable image to be printed and reproduced on a printing medium.

The relief pattern data may include arbitrary relief pattern data, and, for example, may appropriately include a dot printing relief, a printing of a protruded thin line relief, a solid fill printing relief, and a printing relief of other shapes.

In addition, the setting printing pressure is printing pressure to be reference when printing is performed by pressing a printing plate on a printing medium. The setting printing pressure is changeable according to user's preference, for example, if printing with thick density as a whole is desired, the setting printing pressure value is increased, and if printing with thin density as a whole is desired, the setting printing pressure value is reduced.

It is preferable that the relief includes an image relief based on the image data, and a printing pressure management relief for printing a management index of the printing pressure between the printing plate and the printing medium, and that the printing pressure management relief is formed in the printing plate on the basis of the setting printing pressure.

According to the present aspect, the printing pressure management relief for printing the management index of the printing pressure is formed in the printing plate on the basis of the setting printing pressure. Thus, in printing with a printing plate manufactured by the present aspect, the management index is printed on a printing medium to enable the printing pressure between the printing plate and the printing medium during the printing to be simply managed on the basis of the management index.

It is preferable that the platemaking method further includes the step of acquiring distribution data of plate thickness showing distribution of plate thickness of the printing plate, and that the distribution of printing pressure is estimated on the basis of the image data and the distribution data of plate thickness.

According to the present aspect, it is possible to accurately acquire distribution of printing pressure from the image data and the distribution data of plate thickness.

It is preferable that the distribution of printing pressure is estimated on the basis of an area ratio of a portion with which the printing medium is to be brought into contact within a predetermined range of the printing plate.

The printing pressure varies in accordance with a ratio of a contact area (ground area) between the printing plate and the printing medium. Thus, according to the present aspect, it is possible to accurately estimate distribution of printing pressure.

It is preferable that the relief includes a plurality of protrusions, and the relief pattern data includes height data of the plurality of protrusions and shape data of the plurality of protrusions, and also the amount of correction of the relief pattern data relates to at least any one of the height data and the shape data of the plurality of protrusions.

According to the present aspect, it is possible to correct the relief on the basis of at least any one of height and shape of the protrusions.

It is preferable that each of the plurality of protrusions includes a base and a tip provided on the base, on which a printing medium is pressed, and that the shape data of the plurality of protrusions includes at least shape data of the tip.

According to the present aspect, it is possible to correct the relief formed on the printing plate on the basis of the shape data of the tip of the protrusion. "The tip of the protrusion" means an edge including a portion (face) that is to be pressed on the printing medium during printing.

It is preferable that the shape data of the tip of each of the plurality of protrusions includes data on a portion of the tip that is to be brought into contact with the printing medium during printing.

According to the present aspect, it is possible to correct the relief formed on the printing plate on the basis of the data on a portion (face) of the tip of the protrusion that is to be brought into contact with the printing medium during printing.

It is preferable that the plurality of protrusions includes a base and a tip provided on the base, on which a printing medium is pressed, and that the height data of the plurality of protrusions relates to at least any one of tip height, base height, and entire height of the tip and the base.

According to the present aspect, it is possible to correct the relief formed on the printing plate on the basis of at least any one of the tip height, the base height, and the entire height of the tip and the base of the protrusions.

It is preferable that the relief includes a plurality of protrusions, and the relief pattern data includes volume data of the plurality of protrusions, the amount of correction of the relief pattern data relates to the volume data of the plurality of the protrusions.

According to the present aspect, it is possible to correct the relief formed on the printing plate on the basis of the volume data of the protrusions.

The relief pattern data and the amount of correction of the relief pattern data may directly use the volume data of the protrusions, or may use "an element (such as cross section size, cross-sectional area, and height) that defines the volume of the protrusions", which can indirectly express the volume data of the protrusions.

It is preferable that the platemaking method further includes the step of forming the relief on the printing plate on the basis of the relief pattern data corrected.

According to the present aspect, it is possible to print and reproduce a favorable image on the printing medium with the printing plate for which correction of the relief pattern data and determination of the relief are performed in consideration of deformation of the printing plate in accordance with distribution of printing pressure.

It is preferable that the relief is formed on the printing plate by exposure processing with respect to the printing plate, and exposure characteristics related to a thickness direction of the printing plate are derived on the basis of the distribution data of plate thickness so that the relief is formed on the printing plate by the exposure processing in consideration of the exposure characteristics.

According to the present aspect, since the relief is formed by the exposure processing in consideration of "the exposure characteristics related to the thickness direction of the printing plate" derived on the basis of the distribution data of plate thickness, it is possible to form the relief in accordance with the exposure characteristics, with high accuracy. Thus, even if plate thickness of the printing plate is not uniform, it is possible to accurately form the relief capable of reproducing a desired image on the printing plate.

The term, "exposure characteristics", means characteristics that may vary in the thickness direction of the printing plate, and may include various factors such as exposure conditions that may affect the exposure processing. For example, "a diameter of an exposure beam" used in the exposure processing, and the like, may be adopted as the exposure characteristics.

Another aspect of the present invention relates to a platemaking device that forms relief based on relief pattern data in a printing plate to be pressed on a printing medium, and the platemaking device includes: a setting printing pressure acquisition unit that acquires setting printing pressure; a relief calculation unit that calculates relief pattern data on the basis of image data; a printing pressure distribution estimation unit that estimates distribution of printing pressure of the printing plate pressed on the printing medium on the basis of the image data; a correction amount calculation unit that calculates an amount of correction of the relief pattern data on the basis of the distribution of printing pressure and the setting printing pressure; and a data correction unit that corrects the relief pattern data on the basis of the amount of correction.

Yet another aspect of the present invention relates to a printing press that includes the platemaking device described above, and a printing unit that presses the printing plate in which relief is formed by the platemaking device on the printing medium.

Yet another aspect of the present invention relates to a printing plate in which relief is formed, and the relief is formed by the steps of: calculating relief pattern data on the basis of image data; acquiring setting printing pressure; estimating distribution of printing pressure of the printing plate pressed on a printing medium on the basis of the image data; calculating an amount of correction of the relief pattern data on the basis of the distribution of printing pressure and the setting printing pressure; correcting the relief pattern data on the basis of the amount of correction; and forming the relief on the basis of the relief pattern data corrected.

It is preferable that the relief includes an image relief based on the image data, and a printing pressure management relief for printing a management index of the printing pressure between the printing plate and the printing medium, and that the printing pressure management relief is formed in the printing plate on the basis of the setting printing pressure.

According to the present invention, image contents are analyzed to estimate distribution of printing pressure so that data correction is performed so as to correct deformation of a printing plate estimated from the distribution of printing pressure and setting printing pressure, whereby relief can be formed in consideration of the distribution of printing pressure and the setting printing pressure. Accordingly, it is possible to obtain a stably favorable image printed matter as targeted regardless of image contents even if the setting printing pressure is changeable.

In addition, in the present invention, "the printing pressure management relief for printing a management index of printing pressure" is formed in the printing plate to enable printing pressure during printing to be properly managed, whereby it is possible to simply perform printing with target printing pressure that is printing pressure suitable for a shape of an image relief formed in the printing plate.

BRIEF DESCRIPTION OF THE DRAWINGS

FIG. 21 is a table (conversion table) showing an example of an exposure table to achieve shape correction.

FIG. 23 is a table showing an example of exposure amount data (exposure table) assigned to a plurality of setting printing pressures.

FIG. 35 is a table showing an exposure conversion table to achieve shape correction corresponding to a laser beam diameter.

FIG. 36 is a table showing an exposure conversion table to achieve a printing pressure management relief corresponding to a laser beam diameter.

DETAILED DESCRIPTION OF THE EMBODIMENTS

Embodiments of the present invention will be described with reference to the accompanying drawings. Hereinafter, an example in which the present invention is applied to "flexographic printing" will be described, but the present invention is not limited to this. The present invention is widely applicable to a printing technique using a printing plate on which a relief is formed.

First Embodiment

Figure 1:
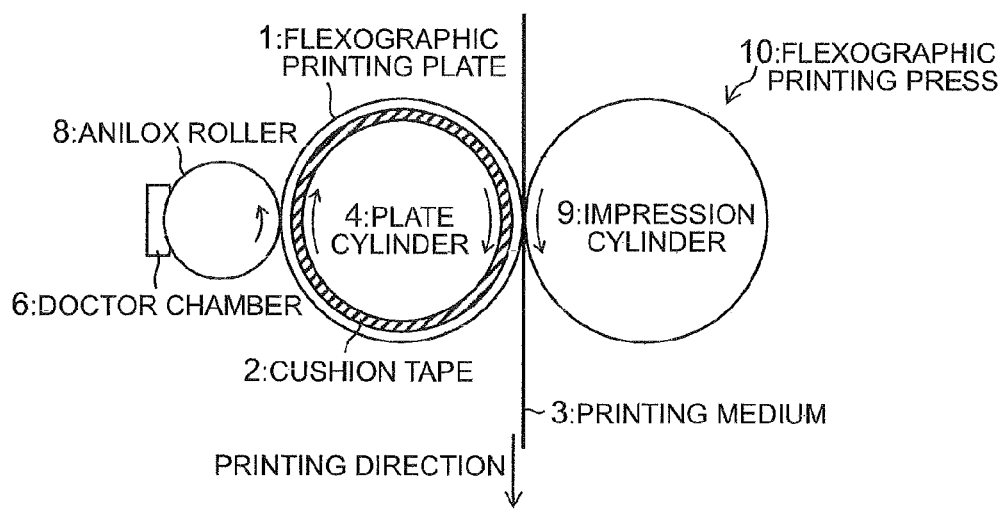
FIG. 1 shows an example of a configuration of a main section of a flexographic printing press.
Figure 2:
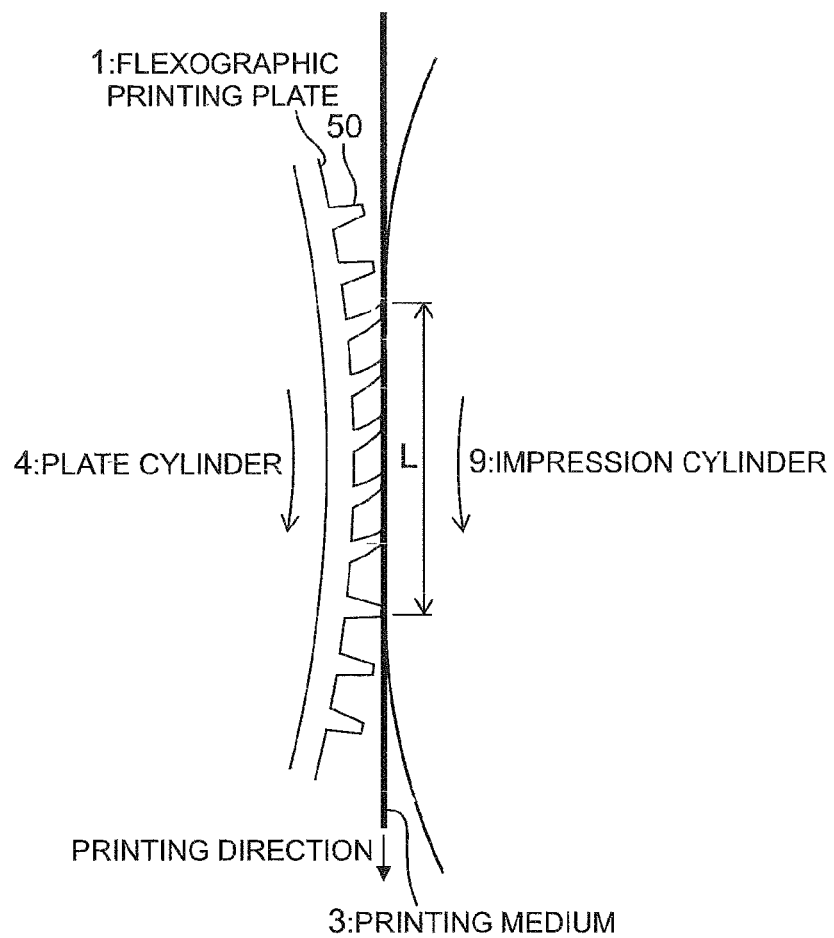
FIG. 2 is an enlarged view of a contact portion between a flexographic printing plate and a printing medium during printing.

FIG. 1 shows an example of a configuration of a main section of a flexographic printing press 10. FIG. 2 is an enlarged view of a contact portion between a flexographic printing plate 1 and a printing medium 3 during printing.

The flexographic printing press (printing unit) 10 includes the flexographic printing plate 1, a plate cylinder 4 to which the flexographic printing plate 1 is attached through a cushion tape 2 such as a double-sided tape, an anilox roller 8 to which ink is supplied by a doctor chamber 6, and an impression cylinder 9 that is provided so as to face the plate cylinder 4.

Ink is transferred from the anilox roller 8 to an apex (printing face) of a relief 50 of the flexographic printing plate 1. Then, while the printing medium 3 passes through a nip between the plate cylinder 4 to which the flexographic printing plate 1 is attached and the impression cylinder 9, the flexographic printing plate 1 (the apex of the relief 50) is pressed on the printing medium 3 to allow ink attached to the apex of the relief of the flexographic printing plate 1 to be transferred to the printing medium 3, so that a desired image is printed and formed on the printing medium 3.

Figure 3:
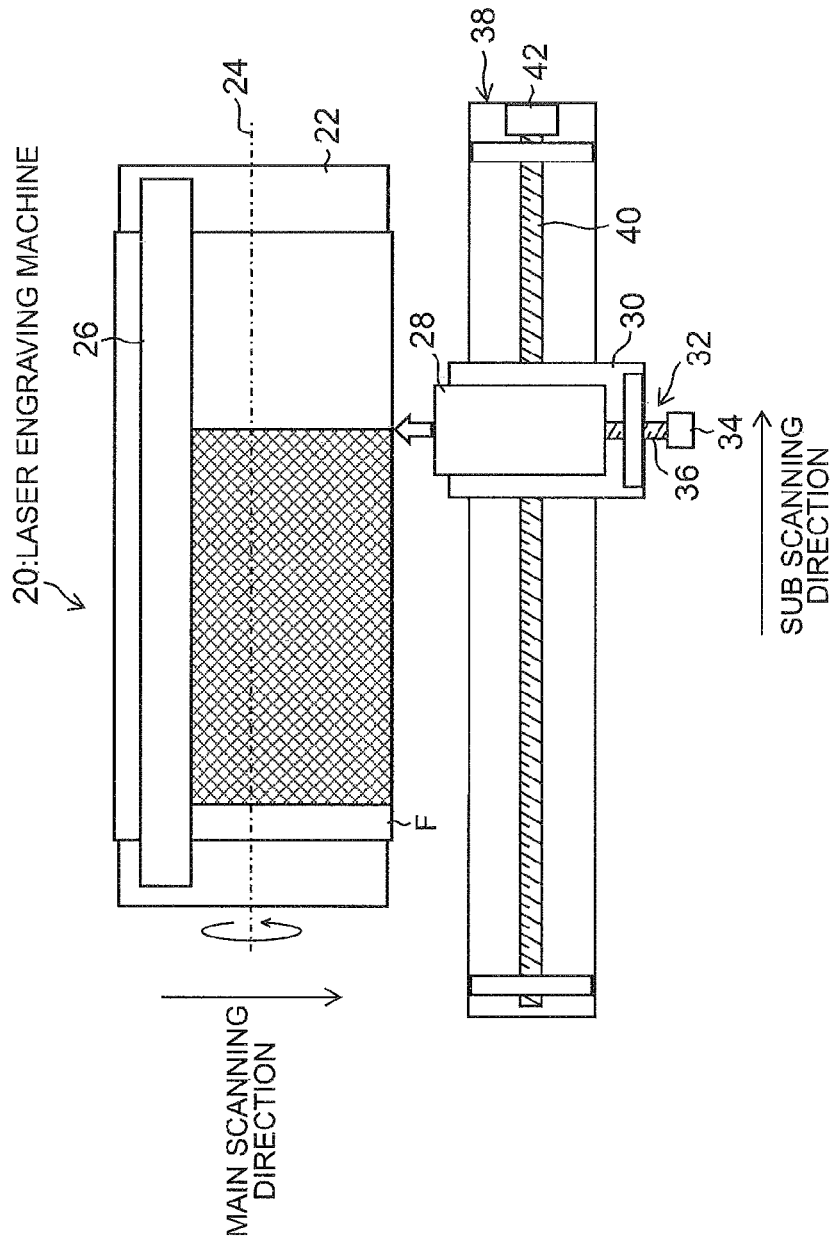
FIG. 3 is a plan view showing an example of a laser engraving machine that forms a relief on a flexographic printing plate.

FIG. 3 is a plan view showing an example of a laser engraving machine 20 that forms the relief 50 on the flexographic printing plate 1.

The laser engraving machine 20 includes a drum 22, and an exposure head 28 for applying exposure engraving to a flexographic plate (printing plate) F held on the drum 22. The exposure head 28 is mounted on a stage 30 to be movable by a focus position change mechanism 32 and an intermittent feed mechanism 38.

The focus position change mechanism 32 includes a motor 34 and a ball screw 36 for allowing the exposure head 28 to move back and forth with respect to the drum 22 to which the flexographic plate F is attached. The motor 34 and the ball screw 36 control movement of the exposure head 28 in a main scanning direction to adjust a focus position in exposure engraving processing.

The intermittent feed mechanism 38 includes a ball screw 40, and a sub-scanning motor 42 that rotates the ball screw 40. The ball screw 40 and the sub-scanning motor 42 control movement of the exposure head 28 (stage 30) in a sub-scanning direction, so that the exposure head 28 is intermittently fed in a direction of an axis 24 of the drum 22 (the sub-scanning direction). The flexographic plate F attached on the drum 22 is held by a chuck member 26 to fix a holding position of the flexographic plate F on the drum 22. The position at which the flexographic plate F is held by the chuck member 26 is within an area where the exposure head 28 does not perform exposure.

The flexographic plate F is irradiated with a laser beam from the exposure head 28 while the drum 22 is rotated, so that the relief 50 desired is formed on a surface of the flexographic plate F. When the chuck member 26 passes through in front of the exposure head 28 with rotation of the drum 22, the exposure head 28 (stage 30) is intermittently fed in the sub-scanning direction, and then laser engraving is applied to a subsequent line.

Such "feeding of the flexographic plate F in the main scanning direction with rotation of the drum 22" and "intermittent feeding of the exposure head 28 in the sub-scanning direction" are combined with each other to control an exposure scan position. In addition, intensity of a laser beam based on exposure data (depth data) for each exposure scan position and ON/OFF of the laser beam are controlled so that the relief 50 in a desired shape is formed on the flexographic plate F by the laser engraving. As a result, the flexographic printing plate 1 to be used in flexographic printing (refer to FIGS. 1 and 2) is formed.

(Relationship between Distribution of Printing Pressure and Printing Result)

The flexographic printing plate 1 (particularly the relief 50) is formed of a soft member rich in elasticity to be deformed in accordance with printing pressure. Thus, an amount of deformation of the relief 50 varies depending on the amplitude of printing pressure applied, so that a printed image formed on the printing medium 3 also varies. The printing pressure applied to the flexographic printing plate 1 varies with not only a kind of the relief 50 (such as a white space, a dot, a protruded thin line, a solid fill) at a position of interest, but also by a kind of the relief 50 in the periphery of the position of interest.

Figure 4:
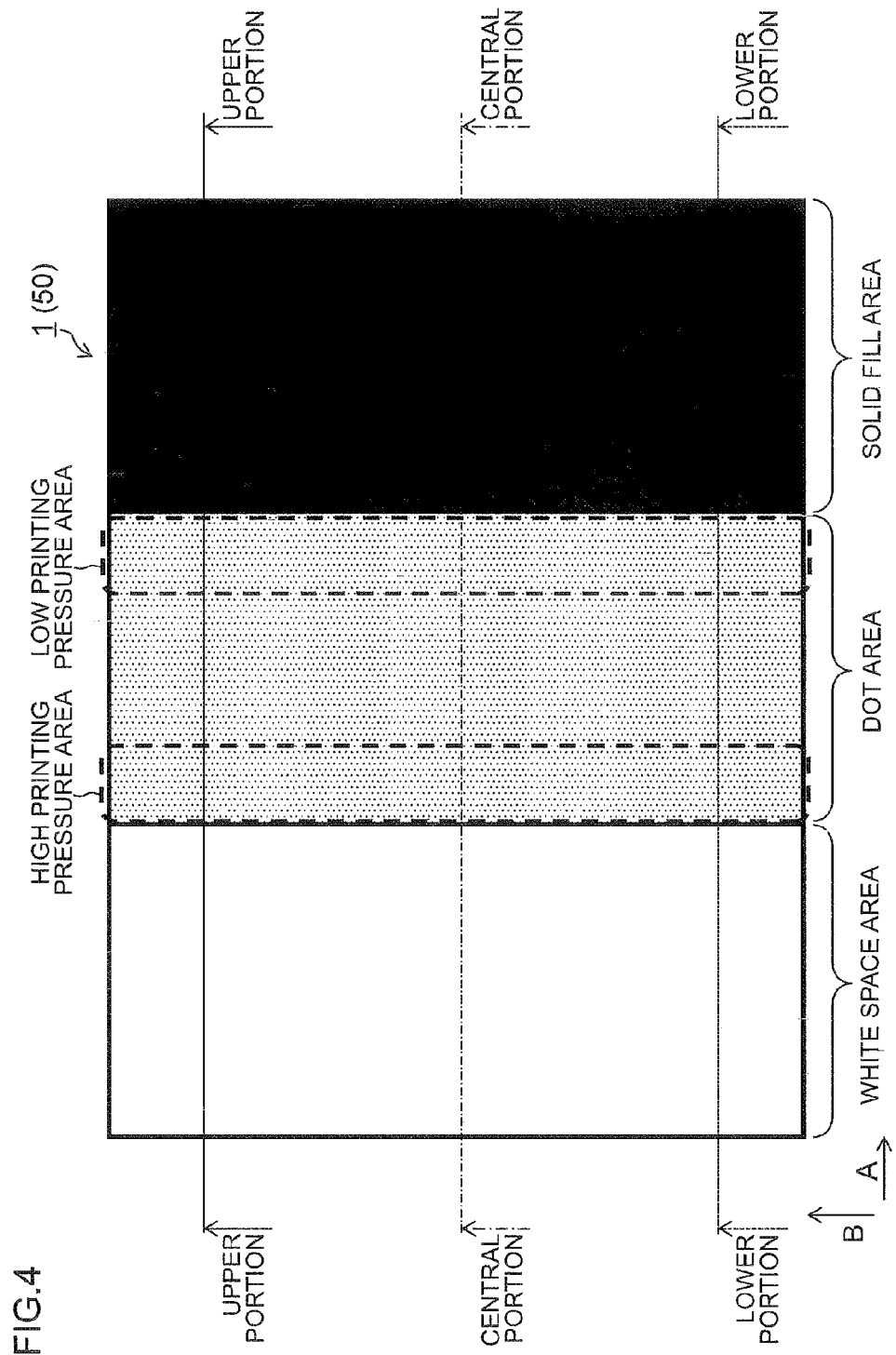
FIG. 4 is a plan view showing an example of a relief formed in a part of a flexographic printing plate.

FIG. 4 is a plan view showing an example of a relief formed in a part of the flexographic printing plate 1. The relief 50 of the flexographic printing plate 1 shown in FIG. 4 is based on 1-bit image data.

In the flexographic printing plate 1 shown in FIG. 4, there are a "white space area" for printing a white space (a left side of FIG. 4) and a "solid fill area" for printing a solid fill (a right side of FIG. 4), across a "dot area" where the relief 50 for printing dots with uniform dot density (area ratio) is formed. In a case where the flexographic printing plate 1 includes such plurality of kinds of area (relief 50), printing pressure applied to each of the areas during printing varies depending on a kind of adjacent area. That is, relatively high printing pressure is to be received on a side adjacent to the white space area (refer to a "high printing pressure area" of FIG. 4), in the dot area, and on the other hand, relatively low printing pressure is received on a side adjacent to the solid fill area (refer to a "low printing pressure area" of FIG. 4), in the dot area.

Figure 5:
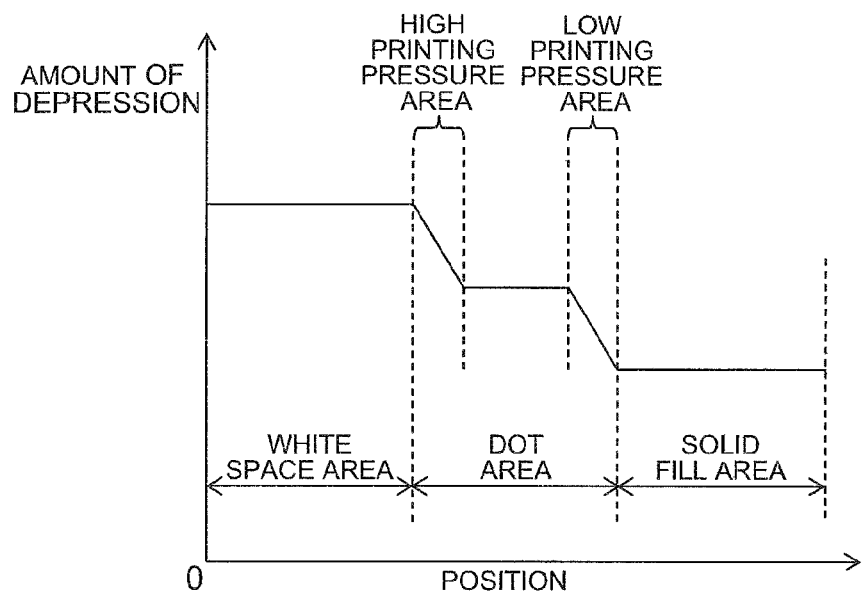
FIG. 5 shows an example of a relationship between areas of the flexographic printing plate shown in FIG. 4 and an amount of depression during printing.
Figure 6:
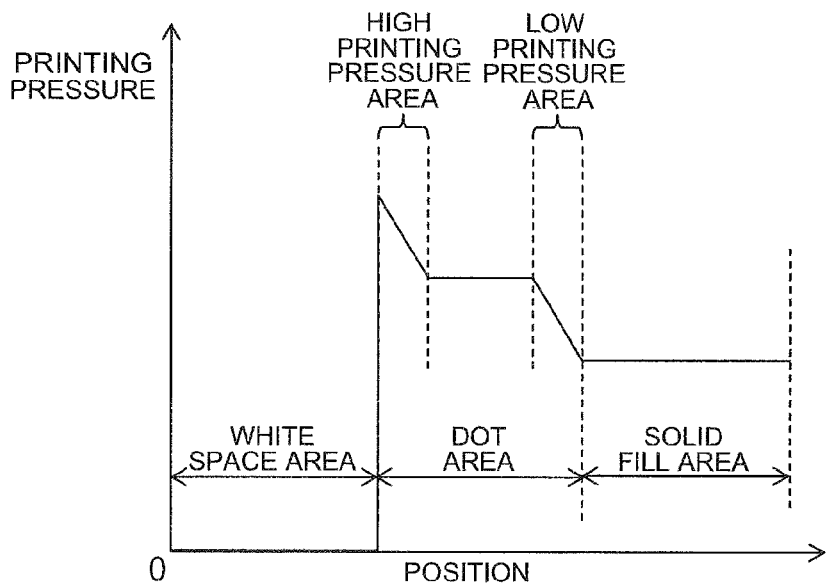
FIG. 6 shows an example of a relationship between the areas of the flexographic printing plate shown in FIG. 4 and printing pressure during printing.

FIG. 5 shows an example of a relationship between areas (positions in the direction of an arrow A of FIG. 4) of the flexographic printing plate 1 shown in FIG. 4 and an amount of depression during printing. FIG. 6 shows an example of a relationship between the areas (positions in the direction of an arrow A of FIG. 4) of the flexographic printing plate 1 shown in FIG. 4 and printing pressure during printing. In addition, FIGS. 5 and 6 show the relationship in a case where the same load is uniformly applied to each of the "white space area", the "dot area", and the "solid fill area" of the flexographic printing plate 1 shown in FIG. 4.

In the flexographic printing plate 1, in the "white space area" that is not brought into contact with a printing medium, movement of the plate in a depression direction is not obstructed during printing. As a result, the amount of depression during printing tends to increase as compared with the "dot area" and the "solid fill area", which are brought into contact with the printing medium, so that the movement of the plate in the depression direction is obstructed (refer to FIG. 5). In addition, since the "white space area" is not brought into contact with the printing medium, printing pressure occurring between the "white space area" and the printing medium basically becomes zero (refer to FIG. 6).

Meanwhile, the "solid fill area" in the flexographic printing plate 1 is generally brought into contact with the printing medium, so that depression movement of the plate is obstructed during printing. As a result, the amount of depression itself during printing decreases as compared with the "white space area" and the "dot area" (refer to FIG. 5). In addition, as a ratio of contact area with the printing medium increases, pressure per unit area decreases. Thus, if the same load is applied, printing pressure in the "solid fill area" of the flexographic printing plate 1 whose whole area is brought into contact with the printing medium is lower than that in the "dot area" that is partially brought into contact with the printing medium (refer to FIG. 6).

Further, the "dot area" in the flexographic printing plate 1 is partially brought into contact with the printing medium, so that the depression movement of the plate is obstructed during printing. As a result, the amount of depression during printing decreases as compared with the "white space area", but increases as compared with the "solid fill area" (refer to FIG. 5). The printing pressure in the "dot area" of the flexographic printing plate 1 during printing is more than that in the "white space area" that is not brought into contact with the printing medium, as well as is more than that in the "solid fill area" with a high contact area ratio with the printing medium.

As above, the amount of depression and the printing pressure of the flexographic printing plate 1 during printing are affected by characteristics of each of the areas themselves (the relief 50 and contact area), and are further affected by kinds and characteristics of adjacent area.

For example, on a side of the "dot area" near the "white space area" in the example shown in FIG. 4, relatively high printing pressure is applied due to an effect of the amount of depression in the white space area, so that the amount of depression is also relatively increased on the side (refer to the "high printing pressure area" of FIGS. 5 and 6). Meanwhile, on a side of the "dot area" near the "solid fill area", relatively low printing pressure is applied due to an effect of the amount of depression in the "solid fill area", so that the amount of depression is also relatively reduced on the side (refer to the "low printing pressure area" of FIGS. 5 and 6). As above, a relief (small dot) in the dot area where a level of deformation varies with printing pressure is affected by a kind of relief in the periphery of the dot area, so that a printing condition may change depending on a position.

Figure 7:
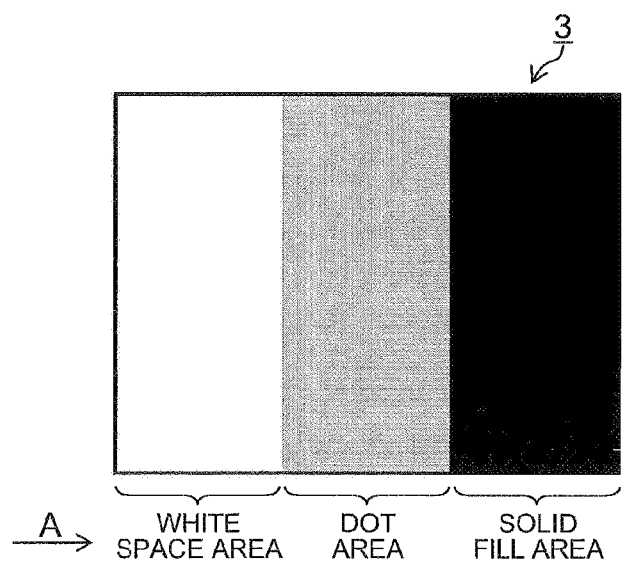
FIG. 7 is a plan view of a printing medium showing an ideal printed image targeted when ideal printing is performed with the flexographic printing plate shown in FIG. 4.
Figure 8:
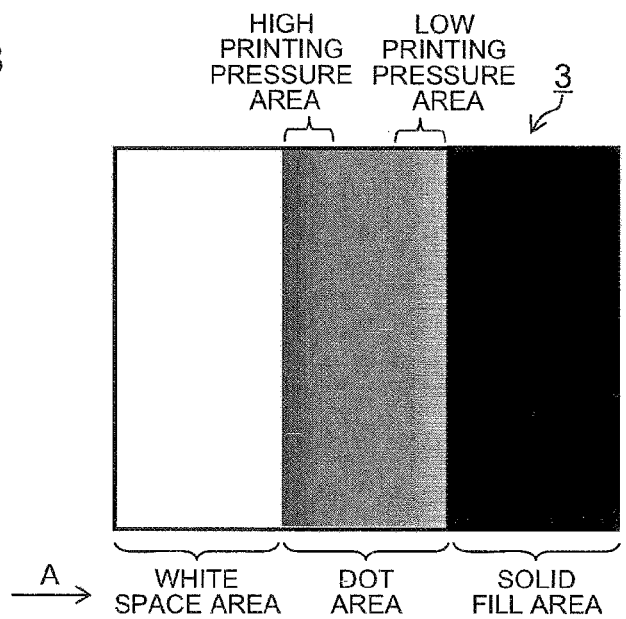
FIG. 8 is a plan view of a printing medium that shows an actual printed image in a case where normal printing is performed with the flexographic printing plate shown in FIG. 4, and that particularly shows a printed image obtained on the assumption that plate thickness is uniform throughout the flexographic printing plate.

FIG. 7 is a plan view of the printing medium 3 showing an ideal printed image targeted when ideal printing is performed with the flexographic printing plate 1 shown in FIG. 4. FIG. 8 is a plan view of the printing medium 3 showing an actual printed image when normal printing is performed with the flexographic printing plate 1 shown in FIG. 4. The flexographic printing plate 1 of FIG. 8 to be used in printing has uniform plate thickness throughout it, and a printing result on the printing medium 3 of FIG. 8 is acquired by assuming that there is no deviation in plate thickness of the flexographic printing plate 1.

As shown in FIG. 7, in a case where printing is performed in ideal conditions, printing is performed so that the relief 50 of the flexographic printing plate 1 is properly reflected. As a result, a boundary among the "white space area", the "dot area", and the "solid fill area" is also made clear, so that a printing condition in each of the areas becomes uniform.

Unfortunately, in actual printing, deviation of printing pressure occurs due to an effect of a kind of relief in peripheral areas (refer to FIG. 6), so that a printing condition on the printing medium 3 is affected by such deviation of the printing pressure. Thus, in actual printing with the flexographic printing plate 1 shown in FIG. 4, as shown in FIG. 8, an uneven printing condition occurs in the "high printing pressure area" in the dot area adjacent to the white space area, and the "low printing pressure area" therein adjacent to the solid fill area. As above, since a printing condition of an area of interest depends on distribution of engraving shape (a kind of relief) in peripheral areas, a printing result intended by a user may not be obtained in flexographic printing by a normal method.

In addition, also in a case where setting printing pressure during printing is changed on a user side, a desired image may not be accurately printed due to variation in printing pressure. Particularly, there is also a possibility that actual printing may be performed under printing pressure different from the setting printing pressure due to a combination of a variety of factors, such as a manufacturing error of the flexographic printing plate 1 (relief 50) itself, and an engraving error of a printing plate manufacturing apparatus 62.

The inventor of the present invention has focused attention on this kind of relationship among distribution of printing pressure and setting printing pressure, and a printing condition, and has newly found out a technique capable of favorably reproducing an image on a printing medium (printing matter) by determining a relief (engraving shape) of a printing plate in consideration of deformation of a printing plate in accordance with distribution of printing pressure and setting printing pressure. In addition, the inventor of the present invention has newly found out a technique capable of simply checking whether or not actual printing has been performed under desired setting printing pressure. That is, image data to be printed is analyzed so that distribution of printing pressure to be applied to the flexographic printing plate 1 is estimated, and then an engraving shape is determined (corrected) in consideration of deformation of the flexographic printing plate 1 based on the "distribution of printing pressure" estimated and "desired printing pressure (setting printing pressure) set by a user". As a result, it is possible to accurately print and reproduce a desired image on a printing medium.

Hereinafter, an example of a printing press that corrects an engraving shape on the basis of such distribution of printing pressure will be described.

(Example of Configuration of Printing Press)

Figure 9:
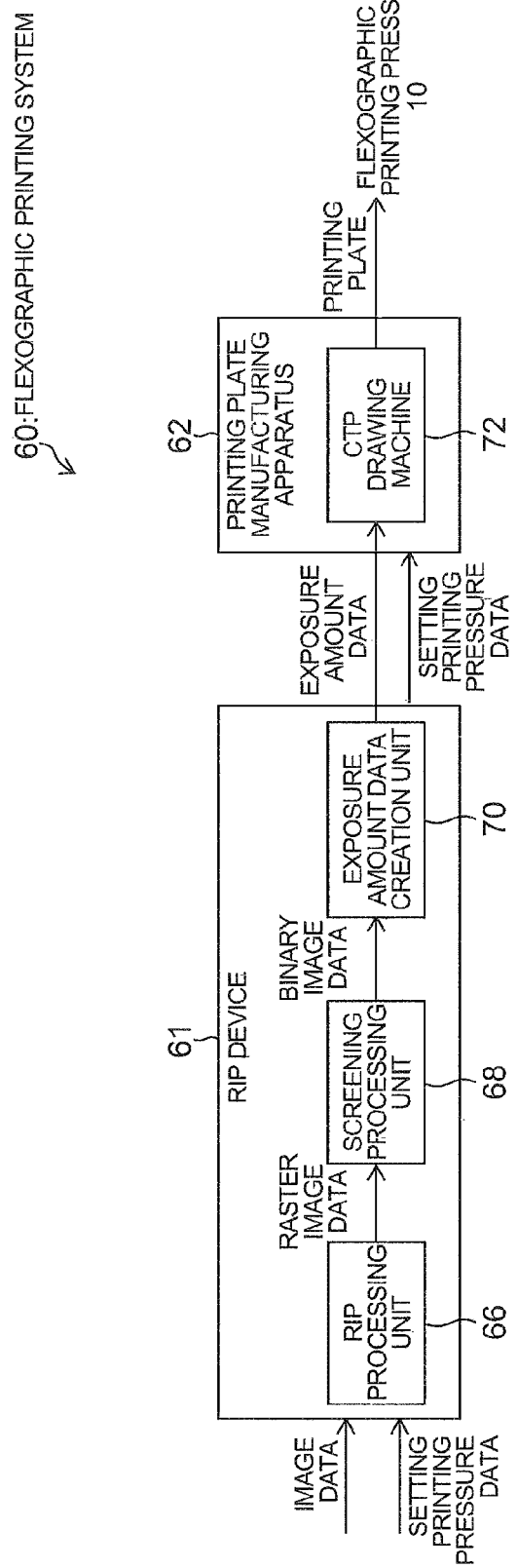
FIG. 9 is a block diagram showing a configuration of a flexographic printing system in accordance with one embodiment of the present invention.

FIG. 9 is a block diagram showing a configuration of a flexographic printing system (printing letterpress creation system) 60 in accordance with one embodiment of the present invention.

The flexographic printing system 60 includes a raster image processor (RIP) device 61 and the printing plate manufacturing apparatus 62, and the RIP device 61 and the printing plate manufacturing apparatus 62 constitute a platemaking device (platemaking method) that forms a relief 50 (relief pattern) based on image data (relief pattern data) on the flexographic plate F (flexographic printing plate 1).

The RIP device 61 includes an RIP processing unit 66, a screening processing unit (binary image data creation unit) 68, and an exposure amount data creation unit 70.

The RIP processing unit 66 expands page description language data, such as portable document format (PDF) data and PostScript (PS; a registered trademark) data, expressing a vector image of a camera-ready copy edited by using a computer or the like, into raster image data.

Each pixel data constituting the raster image data can have 8-bit for each channel in four channels of CMYK, or 256 (0 to 255) gradations, as a gradation value. This kind of gradation can be converted into a corresponding dot area ratio (dot density). For example, in a case where each pixel data has values of from 0 to 100, if image data has a value of 100, a solid portion may be formed, and if the image data has a value of 0, a dot protrusion (a dot printing protrusion, or simply a protrusion) may not be formed.

The screening processing unit 68 performs a screening of the raster image data under a condition such as a predesignated dot (such an AM-dot, and an FM-dot), an angle, and a screen ruling to convert the raster image data into binary image data. For example, if a screen ruling is set at 175 lines per inch, and gradation that can be expressed by one dot is set at 256(=16×16) gradations, the screening processing unit 68 can create binary bitmap data with a resolution of 2800 (=175×16) dpi.

The exposure amount data creation unit 70 converts the binary image data into exposure amount data that can be expressed by 16-bit (65536 gradations) or the like. Details of the exposure amount data creation unit 70 will be described later (refer to FIG. 10).

Meanwhile, the printing plate manufacturing apparatus 62 includes a computer-to-plate (CTP) drawing machine 72 of an engraving type, and the CTP drawing machine 72 includes the laser engraving machine 20 (refer to FIG. 3). In the printing plate manufacturing apparatus 62, laser engraving processing by the CTP drawing machine 72 is applied to a flexographic plate (elastic material such as synthetic resin, and rubber) on the basis of exposure amount data supplied from the RIP device 61 (exposure amount data creation unit 70), so that the flexographic printing plate 1 on which the relief 50 reflecting an image to be printed is formed is engraved and manufactured.

The flexographic printing plate 1 manufactured as above is used in the flexographic printing press 10 (refer to FIGS. 1 and 2) provided in a subsequent stage to be used for printing a desired image on the printing medium 3 by transfer printing.

The flexographic printing system 60 of the present example receives "data on desired printing pressure (setting printing pressure) during printing" set by a user, and then the RIP device 61 and the printing plate manufacturing apparatus 62 (such as the RIP processing unit 66, and the setting printing pressure acquisition unit) acquire the setting printing pressure. The user can input the setting printing pressure by an arbitrary method, and for example, the predetermined normal setting printing pressure is set as a default setting value so that the user may designate "a shift amount from the normal setting printing pressure" if necessary. In addition, the setting printing pressure received by the flexographic printing system 60 may be transmitted to each unit of the RIP device 61 and the printing plate manufacturing apparatus 62 along with image data and the like, or may be transmitted to each unit requiring the setting printing pressure data separately from the image data and the like.

Figure 10:
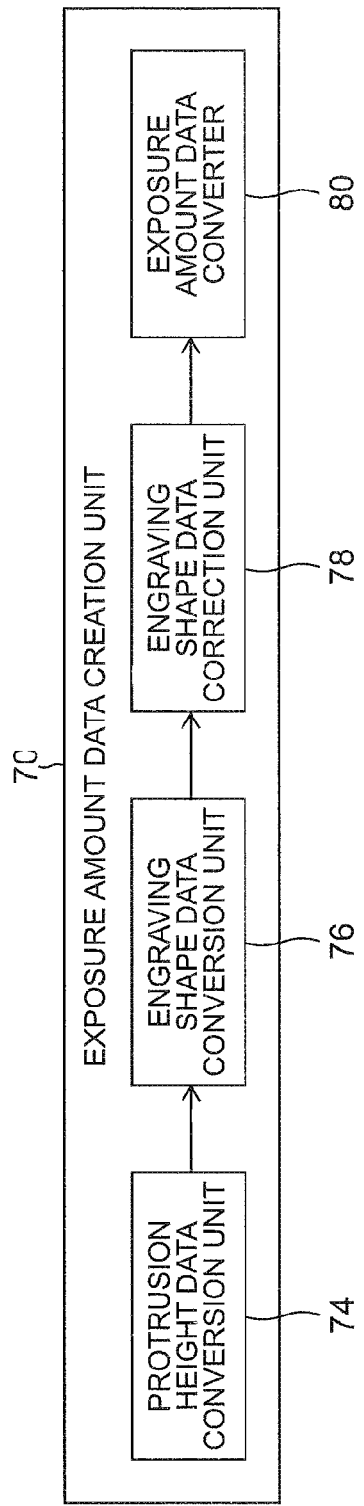
FIG. 10 is a functional block diagram showing an example of a configuration of an exposure amount data creation unit in accordance with a first embodiment.

FIG. 10 is a functional block diagram showing an example of a configuration of the exposure amount data creation unit 70 of FIG. 9.

The exposure amount data creation unit 70 includes a protrusion height data conversion unit 74, an engraving shape data conversion unit 76, an engraving shape data correction unit 78, and an exposure amount data converter 80.

The protrusion height data conversion unit 74 converts binary image data from the screening processing unit 68 into protrusion height data indicating two-dimensional distribution of height of the relief 50 (height of a protrusion).

The engraving shape data conversion unit 76 converts the protrusion height data supplied from the protrusion height data conversion unit 74 into engraving shape data (relief pattern data) with higher resolution. The engraving shape data is acquired by applying two-dimensional interpolation to the protrusion height data to reproduce a three-dimensional shape of a protrusion, and may be set as depth data indicating a distance in a depth direction of the flexographic plate F.

As above, in the present example, the protrusion height data conversion unit 74 and the engraving shape data conversion unit 76 constitute "a relief calculation unit that calculates relief pattern data on the basis of image data".

The engraving shape data correction unit 78 corrects the engraving shape data (relief pattern data) on the basis of distribution of printing pressure of the flexographic printing plate 1. Details of the engraving shape data correction unit 78 will be described later (refer to FIG. 11).

The exposure amount data converter 80 converts the engraving shape data (relief pattern data) corrected by the engraving shape data correction unit 78 into exposure amount data corresponding to an amount of exposure with respect to the flexographic plate F. In the present example, the exposure amount data converter 80 (exposure amount data creation unit 70) is provided as a part of the RIP device 61 (refer to FIG. 9), but may be provided on a printing plate manufacturing apparatus 62 side.

In this way, the exposure amount data is calculated from correction engraving shape data (relief pattern data), and the printing plate manufacturing apparatus 62 (refer to FIG. 9) forms the relief 50 on the flexographic plate F (flexographic printing plate 1) on the basis of the exposure amount data calculated.

Data correction based on distribution of printing pressure of the flexographic printing plate 1 may be performed by a variety of methods, and an amount of data correction calculated on the basis of the distribution of printing pressure may be reflected in the engraving shape data or the exposure amount data. If the amount of data correction is reflected in the engraving shape data, the engraving shape data including the amount of correction is converted into the exposure amount data, whereby exposure processing is performed by using the exposure amount data converted. On the other hand, if the amount of data correction is reflected in the exposure amount data, "the exposure amount data based on the engraving shape data (the amount of data correction is not reflected)" and "the exposure amount data based on the amount of data correction itself" are calculated, whereby "the exposure amount data reflecting the amount of data correction" is calculated from both data pieces. In an example shown in FIG. 11 below, a case where the amount of data correction is reflected in the engraving shape data will be described.

Figure 11:
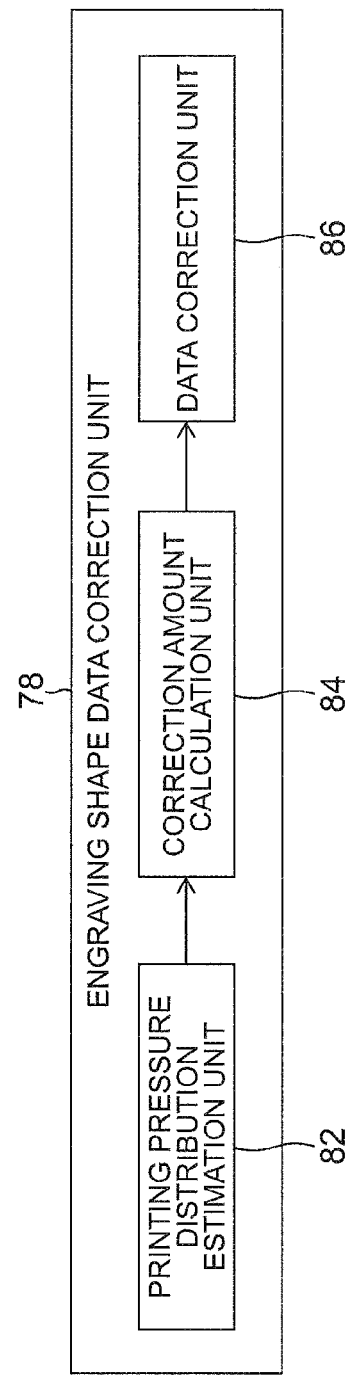
FIG. 11 is a functional block diagram showing an example of a configuration of an engraving shape data correction unit of FIG. 10.

FIG. 11 is a functional block diagram showing an example of a configuration of the engraving shape data correction unit 78 of FIG. 10.

The engraving shape data correction unit 78 includes a printing pressure distribution estimation unit 82, a correction amount calculation unit 84, and a data correction unit 86.

The printing pressure distribution estimation unit 82 estimates distribution of printing pressure of the flexographic printing plate 1 pressed on the printing medium 3 during printing, on the basis of the engraving shape data (image data). In addition, the printing pressure distribution estimation unit 82 may estimate the distribution of printing pressure on the basis of not only image data before being converted into the engraving shape data, but also the engraving shape data. In a case where the distribution of printing pressure is calculated more accurately or a relief shape cannot be formed by engraving as shown by a 1-bit image due to characteristics of an engraving device (printing plate manufacturing apparatus 62), it is preferable that the distribution of printing pressure is estimated on the basis of engraving shape data showing a shape to be actually engraved.

The correction amount calculation unit 84 calculates the amount of correction of the engraving shape data (relief pattern data) on the basis of "the distribution of printing pressure estimated by the printing pressure distribution estimation unit 82" and "the desired printing pressure (setting printing pressure) set by a user". A specific example of the calculation of the amount of correction will be described later (refer to FIG. 18).

The data correction unit 86 corrects the engraving shape data (relief pattern data) acquired by the engraving shape data conversion unit 76, on the basis of the amount of correction calculated by the correction amount calculation unit 84.

As described above, the engraving shape data and the exposure amount data, reflecting the amount of data correction, are calculated, and the relief 50 is formed on the flexographic plate F on the basis of the exposure amount data. In the present example, the relief 50 formed on the flexographic plate F includes "an image relief based on image data", and "a printing pressure management relief for printing a printing pressure management chart that is a management index of the printing pressure between the flexographic printing plate 1 and the printing medium 3".

Figure 12:
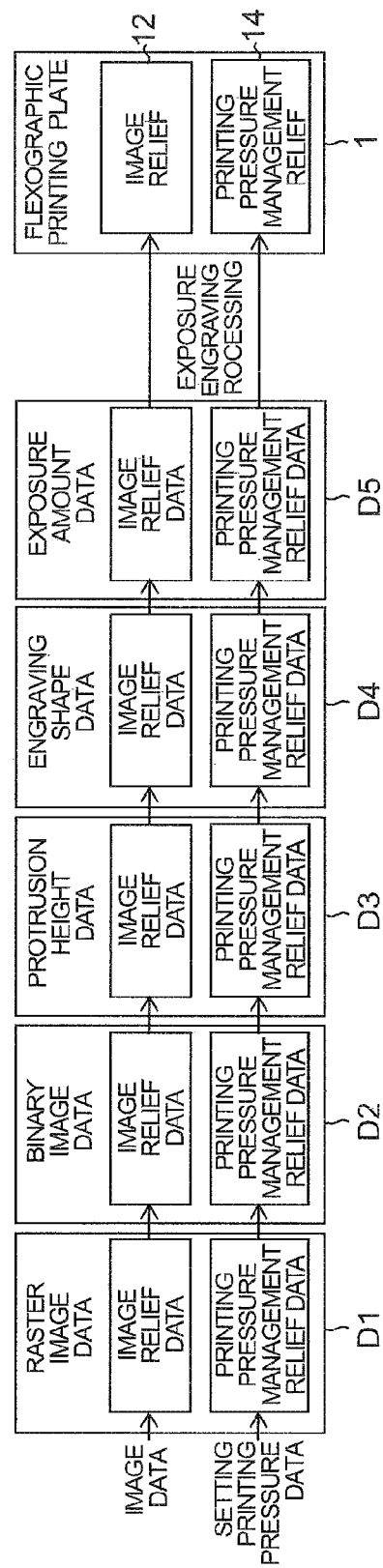
FIG. 12 shows an example of a flow of data in the flexographic printing system.
Figure 13:
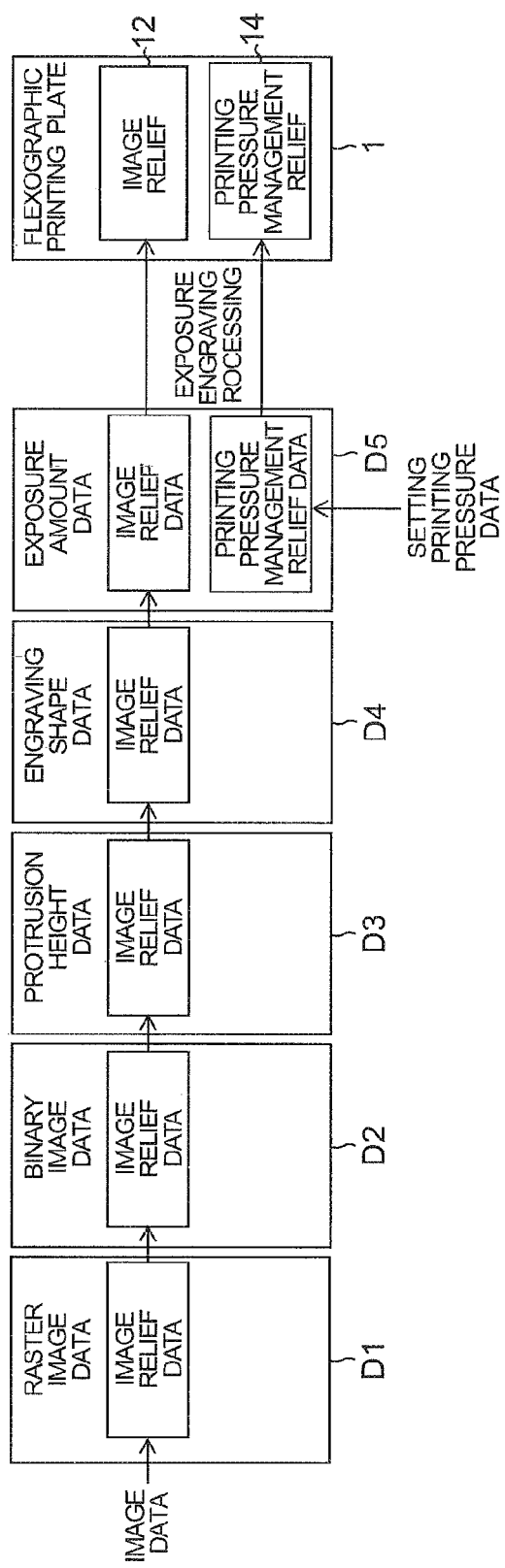
FIG. 13 shows another example of a flow of data in the flexographic printing system.

Each of FIGS. 12 and 13 shows an example of a flow of data in the flexographic printing system 60. As described above, in the flexographic printing system 60 (refer to FIG. 9), input image data is sequentially converted into data types (image relief data) as follows: raster image data D1; binary image data D2; protrusion height data D3; engraving shape data D4; and exposure amount data D5. Then, a relief (image relief 12) for printing and reproducing the input image data is formed on the flexographic plate F (flexographic printing plate 1) by exposure engraving with the CTP drawing machine 72 on the basis of the image relief data (exposure amount data D5).

In addition, in the flexographic printing system 60 of the present example, "printing pressure management relief data" is created on the basis of the setting printing pressure received, and then a printing pressure management relief 14 (refer to FIG. 14 described later) is formed on the flexographic printing plate 1 by the exposure engraving with the CTP drawing machine 72 on the basis of the printing pressure management relief data.

The printing pressure management relief data (exposure amount data D5) can be acquired by an arbitrary method. For example, as shown in FIG. 12, the printing pressure management relief data (exposure amount data D5) may be acquired through image processing as with the image relief data after converted into various data types along with the image relief data based on image data. In addition, as shown in FIG. 13, the printing pressure management relief data (exposure amount data D5) may be acquired directly from received data on the setting printing pressure. In this case, the exposure amount data converter 80 (refer to FIG. 10) acquires printing pressure management relief data corresponding to the setting printing pressure received, and synthesizes the image relief data calculated from image data and the printing pressure management relief data to transmit the synthesized data to the printing plate manufacturing apparatus 62 (CTP drawing machine 72) in a subsequent stage.

The printing plate manufacturing apparatus 62 (CTP drawing machine 72) performs exposure engraving processing on the basis of the image relief data received and the exposure amount data in the printing pressure management relief data to create the printing pressure management relief 14 in which the image relief 12 and the printing pressure management relief 14 are formed.

Figure 14:
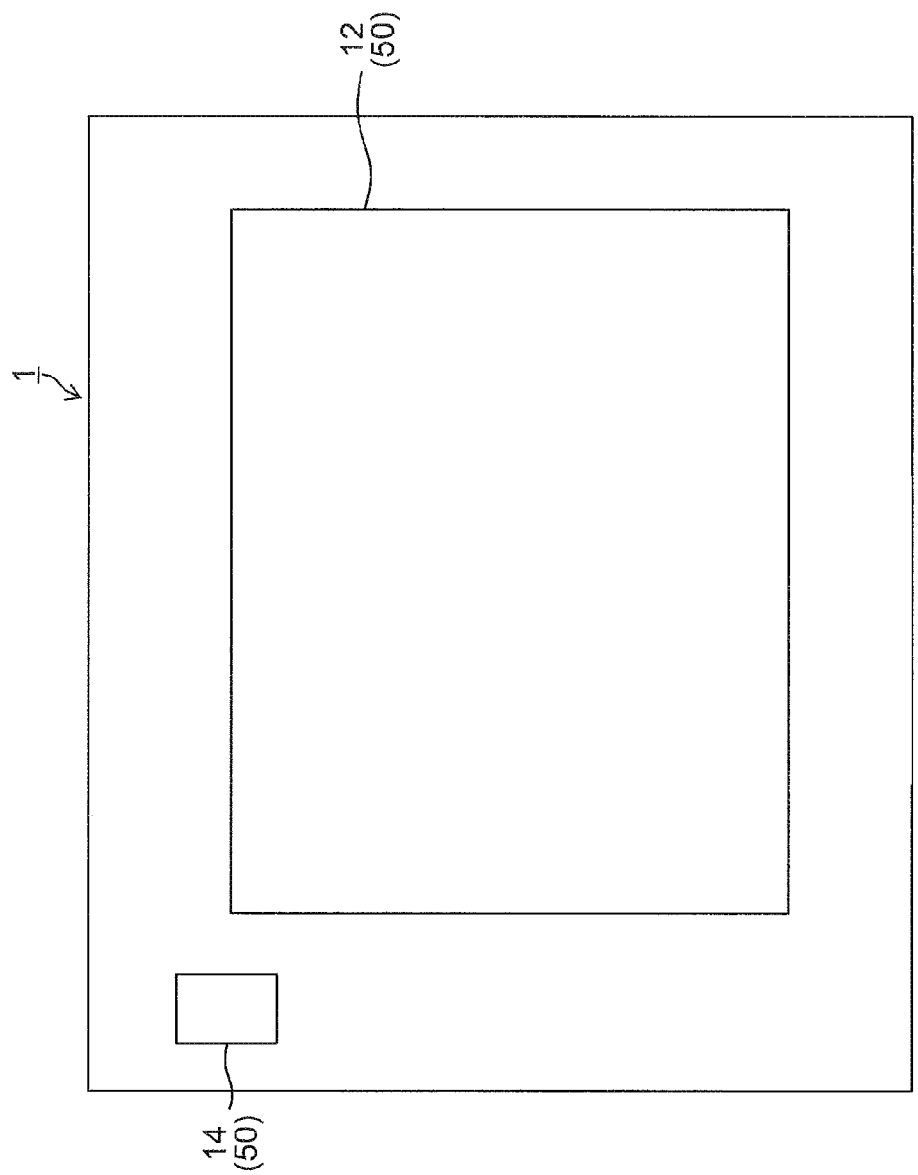
FIG. 14 is a plan view of a flexographic printing plate, and shows an example of an arrangement relationship between an image relief and a printing pressure management relief.

FIG. 14 is a plan view of the flexographic printing plate 1, and shows an example of an arrangement relationship between the image relief 12 and the printing pressure management relief 14.

As with the example shown in FIG. 14, the image relief 12 may be provided near a central portion of the flexographic printing plate 1, and the printing pressure management relief 14 may be provided at an edge (corner) of the flexographic printing plate 1. In this case, also in an image printed and reproduced on the printing medium 3 with the flexographic printing plate 1, an image (image area) by the image relief 12 is printed near a central portion of the printing medium 3, and an image (printing pressure management chart) by the printing pressure management relief 14 is printed at an edge (corner) of the printing medium 3.

Figure 15:
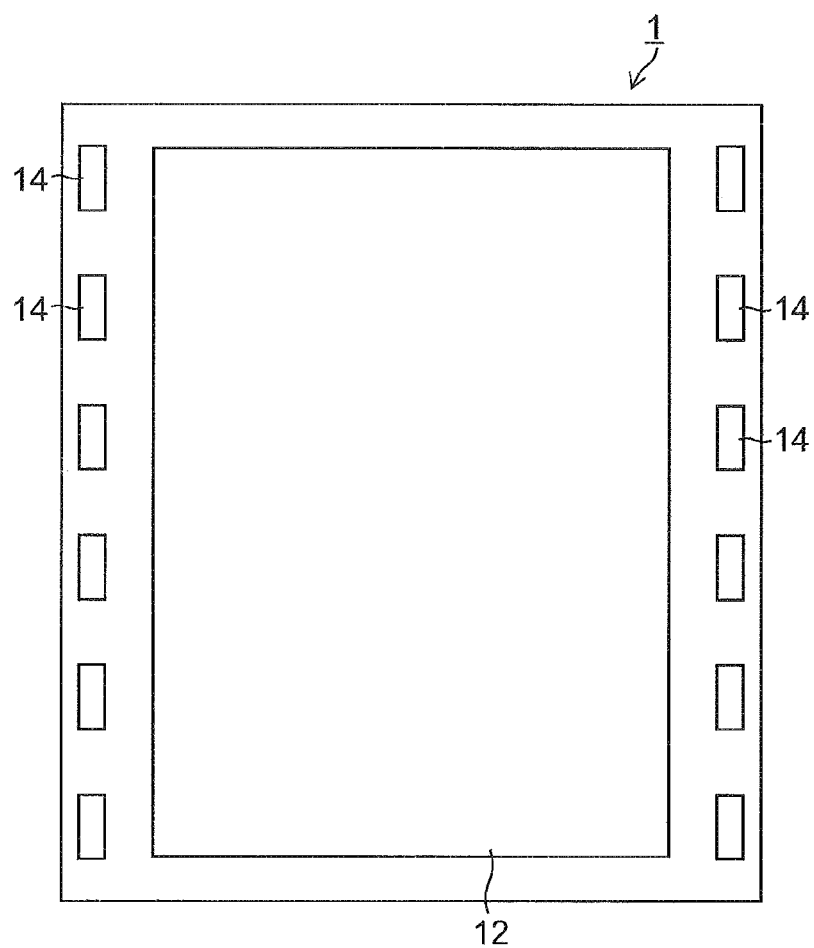
FIG. 15 is a plan view of a flexographic printing plate, and shows another example of an arrangement relationship between an image relief and a printing pressure management relief.

The arrangement relationship between the image relief 12 and the printing pressure management relief 14 is not particularly limited. For example, as shown in FIG. 15, the printing pressure management reliefs 14 may be formed at both edges of the flexographic printing plate 1 so as to be across the image relief 12, and the plurality of printing pressure management reliefs 14 may be formed in a peripheral portion of the image relief 12 so as to be continuously juxtaposed to each other.

The image relief 12 has a shape (such as a dot, a protruded thin line, a solid fill, and a white space) so that a desired image corresponding to input image data is printed on the printing medium 3 by transfer printing.

Meanwhile, the printing pressure management relief 14 may have any shape if a printing pressure management chart capable of managing printing pressure during printing can be properly printed on the printing medium 3. Thus, it is preferable that the printing pressure management relief 14 prints a printing pressure management chart capable of allowing a user to easily grasp whether or not actual printing is performed under the setting printing pressure.

Thus, for example, the printing pressure management relief 14 may be formed with a recessed part with a predetermined depth. In this case, it is preferable that the printing pressure management relief 14 (recessed portion) is formed at a depth that allows ink attached in a recessed portion of the printing pressure management relief 14 to be transferred and printed on the printing medium 3 when the printing pressure management relief 14 is pressed on the printing medium 3 with the setting printing pressure. Accordingly, a user can estimate actual printing pressure during printing depending on whether or not the printing pressure management chart is printed on the printing medium 3 along with an image (image area).

In addition, the printing pressure management relief 14 may be composed of a plurality of relief portions, and printing pressure with which ink is transferred and attached (printed) on the printing medium 3 may be changed for each of the relief portions. For example, if the plurality of relief portions is composed of recessed portions, a depth of each the recessed portions may be changed among the relief portions. In this case, it is preferable that the printing pressure management relief 14 includes not only "a relief portion where ink is transferred on the printing medium 3 if setting printing pressure is applied thereto" but also "a relief portion where ink is transferred on the printing medium 3 if printing pressure more than the setting printing pressure is applied thereto" and/or "a relief portion where ink is transferred on the printing medium 3 if printing pressure less than the setting printing pressure is applied thereto". Accordingly, a user visually identifies a printing condition of the printing pressure management chart on the printing medium 3 to be able to estimate whether printing pressure actually applied to the flexographic printing plate 1 during printing is the "setting printing pressure or not" as well as is "more or less than the setting printing pressure".

If the printing pressure management relief 14 includes a plurality of relief portions, the relief portions may be separated from each other, or connected to each other.

For example, if the printing pressure management relief 14 includes "the relief portion where ink is transferred on the printing medium 3 if setting printing pressure is applied thereto", "the relief portion where ink is transferred on the printing medium 3 if printing pressure more than the setting printing pressure is applied thereto", and "the relief portion where ink is transferred on the printing medium 3 if printing pressure less than the setting printing pressure is applied thereto", which are separated from each other, the printing pressure can be evaluated as follows: if the printing pressure management chart transferred and printed on the printing medium 3 is composed of one portion, it is possible to determine that "the printing pressure is less than the setting printing pressure"; if the printing pressure management chart is composed of two portions, it is possible to determine that "the printing pressure is the setting printing pressure"; and if the printing pressure management chart is composed of three portions, it is possible to determine that "the printing pressure is more than the setting printing pressure". In addition, also if the printing pressure management relief 14 is composed of relief portions connected to each other, it is possible to estimate the amplitude of the printing pressure from a printing condition of the printing pressure management chart.

As above, it is preferable to print a printing pressure management chart showing whether or not acting printing pressure is suitable by significantly increasing density of the printing pressure management chart printed on the printing medium 3, and so on, if printing pressure equivalent to the setting printing pressure is applied, with the printing pressure management relief 14.

Figure 16:
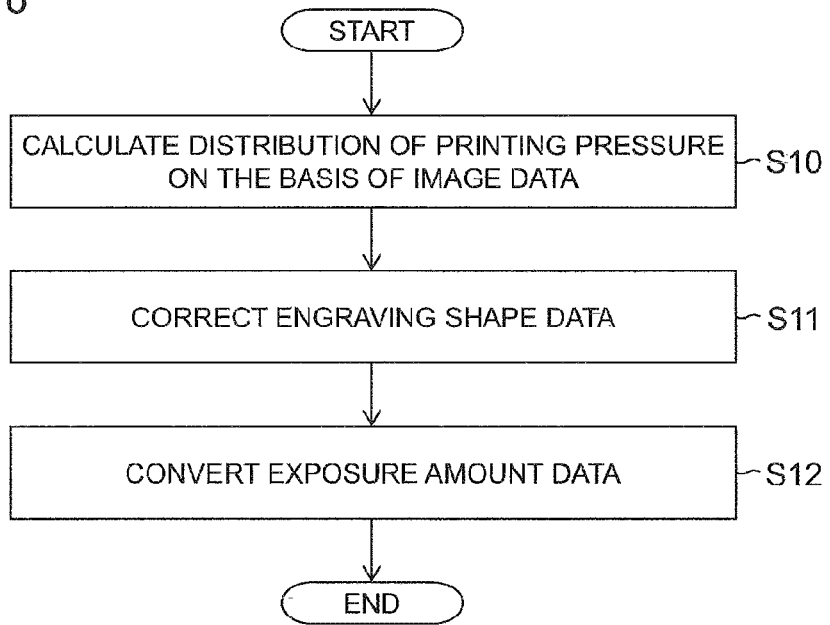
FIG. 16 is a flow chart that shows an outline of a flow of processing in the engraving shape data correction unit and an exposure amount data converter, and that shows an example of estimating distribution of printing pressure on the basis of image data before being converted into engraving shape data.

FIG. 16 is a flow chart that shows an outline of a flow of processing in the engraving shape data correction unit 78 and the exposure amount data converter 80, and that shows an example of estimating distribution of printing pressure on the basis of image data before being converted into engraving shape data.

In the present example, the printing pressure distribution estimation unit 82 (refer to FIG. 11) calculates distribution of printing pressure of the flexographic printing plate 1 (S10 of FIG. 16) on the basis of image data before being converted into engraving shape data (refer to an example of 1-bit image data shown in FIG. 38 described later).

Then, the correction amount calculation unit 84 calculates an amount of correction of the engraving shape data from a calculation result of the distribution of printing pressure and the setting printing pressure, and then the data correction unit 86 corrects the engraving shape data on the basis of the amount of correction calculated (S11).

Subsequently, the exposure amount data converter 80 converts the engraving shape data corrected in consideration of the distribution of printing pressure and the setting printing pressure into exposure amount data (S12), and then the exposure amount data is transmitted to the printing plate manufacturing apparatus 62 (refer to FIG. 9).

By a series of the processes (S10 to S12) described above, it is possible to calculate the exposure amount data for accurately forming the relief 50 with an engraving shape in consideration of the distribution of printing pressure, on the flexographic printing plate 1. In a case where the same image processing is applied to image relief data and printing pressure management relief data (refer to FIG. 12), it is possible to properly calculate exposure amount data of the image relief data and the printing pressure management relief data by the series of processes (S10 to S12) described above. Meanwhile, in a case where exposure amount data on a printing pressure management relief is calculated directly from input data on the setting printing pressure (refer to FIG. 13), "image relief data" that is acquired by the series of processes (S10 to S12) described above, and "printing pressure management relief data" that is separately acquired from the input data on the setting printing pressure, are synthesized so that "the exposure amount data of the image relief data and the printing pressure management relief data" is calculated.

Figure 17:
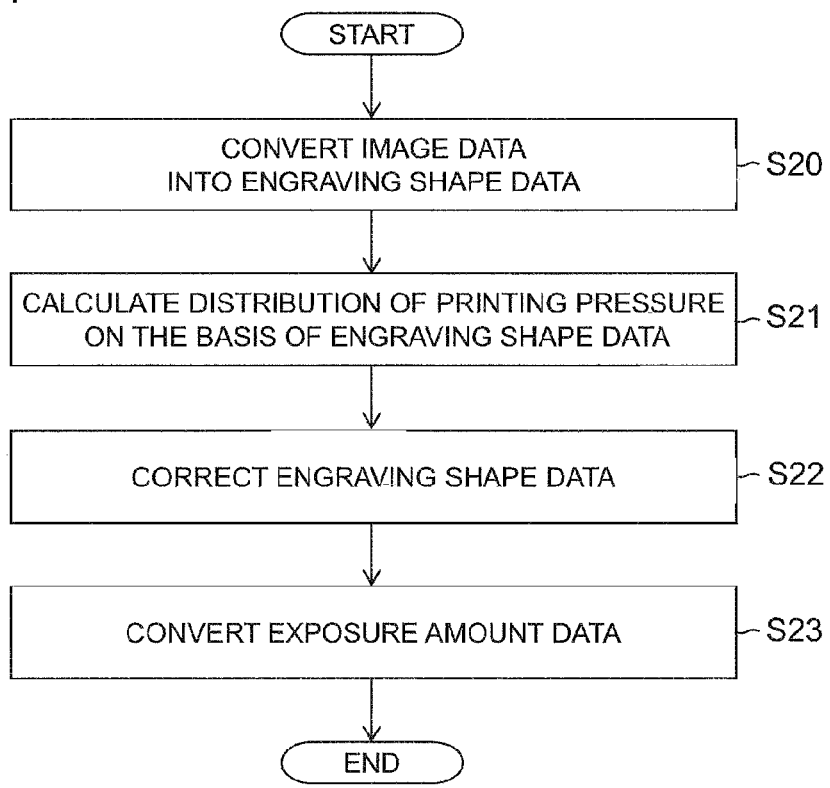
FIG. 17 is a flow chart that shows an outline of a flow of processing in an engraving shape data conversion unit, the engraving shape data correction unit, and the exposure amount data converter, and that shows an example of estimating distribution of printing pressure on the basis of engraving shape data.

FIG. 17 is a flow chart that shows an outline of a flow of processing in the engraving shape data conversion unit 76, the engraving shape data correction unit 78, and the exposure amount data converter 80, and that shows an example of estimating distribution of printing pressure on the basis of engraving shape data.

When the protrusion height data conversion unit 74 (refer to FIG. 10) acquires protrusion height data (relief pattern data), the engraving shape data conversion unit 76 calculates engraving shape data by converting the protrusion height data (image data) (S20 of FIG. 13).

Then, the printing pressure distribution estimation unit 82 calculates distribution of printing pressure of the flexographic printing plate 1 on the basis of the engraving shape data acquired (S21). Subsequently, the correction amount calculation unit 84 and the data correction unit 86 calculate the amount of correction of the engraving shape data and correct the engraving shape data on the basis of the distribution of printing pressure and the setting printing pressure (S22), and then the exposure amount data converter 80 (refer to FIG. 10) converts the engraving shape data corrected into exposure amount data (S23).

Next, an example of calculation of an amount of correction of engraving shape data, based on distribution of printing pressure of the flexographic printing plate 1, will be described.

Figure 18:
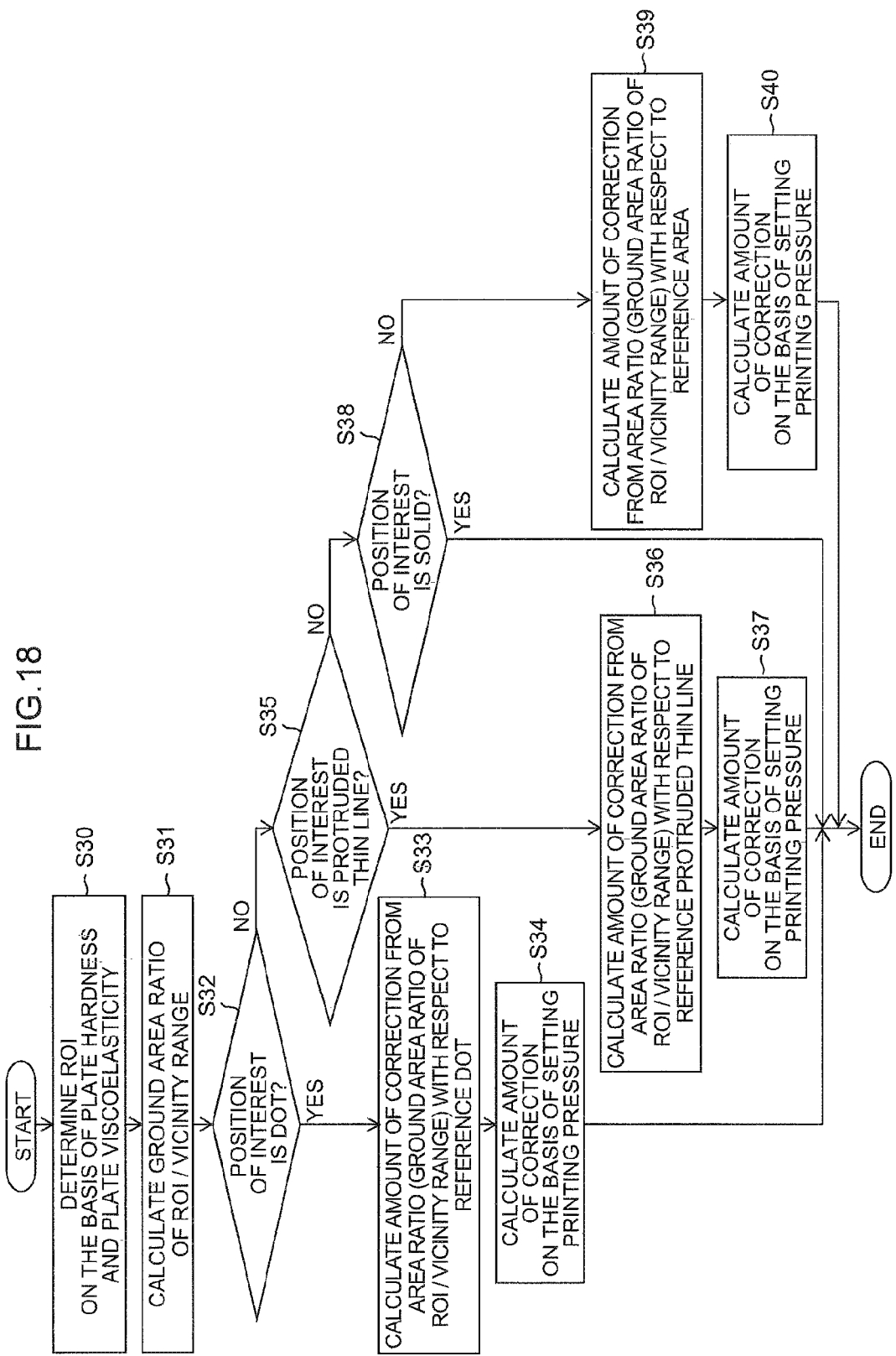
FIG. 18 is a flow chart that describes an example of a process of calculating distribution of printing pressure on the basis of image data (engraving shape data) to calculate an amount of correction based on the distribution of printing pressure.

FIG. 18 is a flow chart that describes an example of a process of calculating distribution of printing pressure on the basis of image data (engraving shape data) to calculate an amount of correction based on the distribution of printing pressure. Although each processing in the flow of FIG. 18 is mainly performed by the correction amount calculation unit 84 of the engraving shape data correction unit 78 (refer to FIG. 11), another unit may perform a part of the processing if necessary.

Range affected by distribution of printing pressure of the flexographic printing plate 1 varies with "plate hardness (Shore A) of the flexographic printing plate 1" and "viscoelasticity of the flexographic printing plate 1". Thus, it is desirable that a size of a region of interest (ROI) that is a "range of distribution of printing pressure (predetermined range) serving as a basis of calculation of the amount of correction of engraving shape data" is determined on the basis of the palate hardness and the viscoelasticity of the flexographic printing plate 1. Accordingly, first, the ROI (range of distribution of printing pressure) is determined on the basis of the plate hardness and the viscoelasticity of the flexographic printing plate 1 that are previously acquired and stored in a memory and the like (S30 of FIG. 18).

Figure 19:
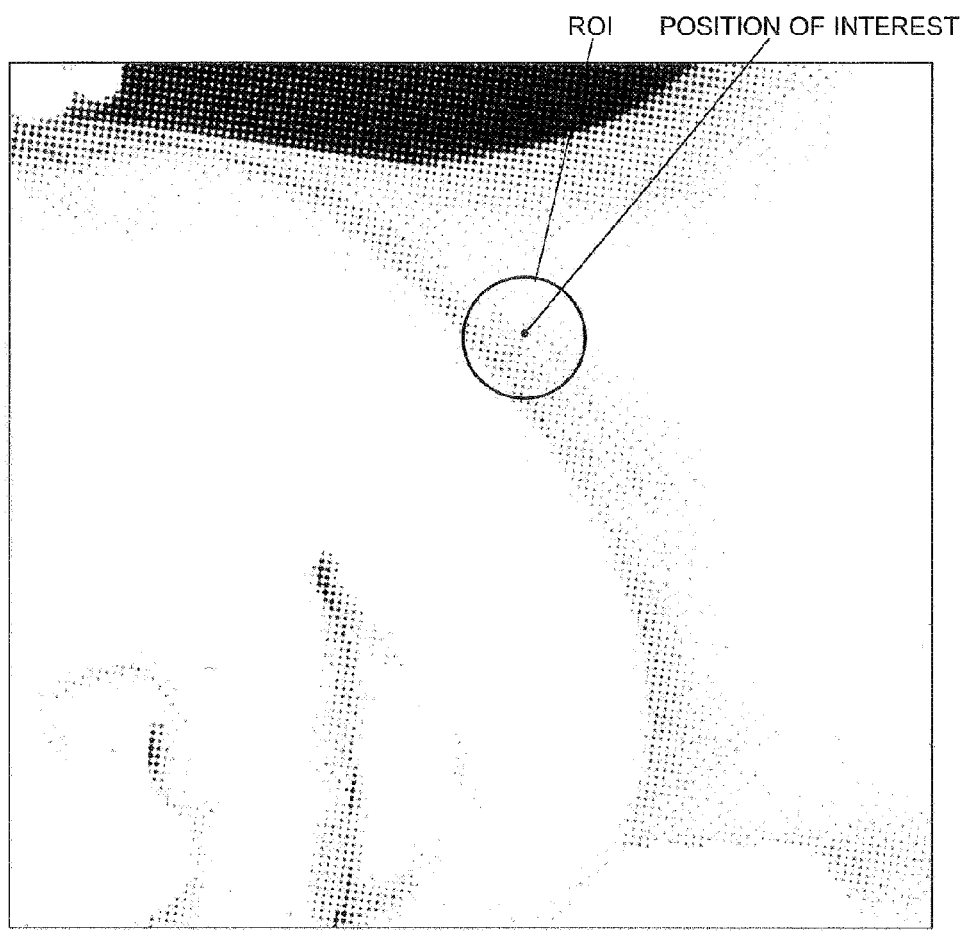
FIG. 19 shows an example of an image to describe a region of interest (ROI).

FIG. 19 shows an example of an image to describe the ROI. The ROI is composed of an area of the predetermined range by centering a position of interest (a pixel of interest) in an image, and an amount of correction of relief engraving (engraving shape data) at the position of interest is calculated on the basis of distribution of printing pressure in the ROI. Thus, the ROI is set for each position in the image, and while the position of interest is sequentially changed in the image, "calculation of the amount of correction of relief engraving at the position of interest based on distribution of printing pressure in the ROI" describe later is performed. For example, in a case where the plate hardness (Shore A) of the flexographic printing plate 1 is 79° and the viscoelasticity is approximately 15 MPa as well as a circular ROI such as shown in FIG. 19 is applied, a size (diameter) of the ROI may be set at a range of from 500 µm to 3000 µm. Although a circular ROI by centering a position of interest is set in the example shown in FIG. 19, a size and a shape of the ROI is not particularly limited.

Next, a ground area ratio (contact area ratio) of the flexographic printing plate 1 with respect to the printing medium 3 in a range of the ROI is calculated (S31 of FIG. 18).

That is, a ratio (a ground area ratio in an ROI) S1 of "area (contact area) of a relief portion that is to be brought into contact with the printing medium 3 in the ROI during printing, and that corresponds to a support of the flexographic printing plate 1 against the printing medium 3" with respect to "the entire area of the ROI" is calculated. For example, if the entire range in the ROI is a white space area, the flexographic printing plate 1 (relief 50) and the printing medium 3 are not brought into contact with each other, whereby the S1 is zero (S1=0). Meanwhile, if the entire range in the ROI is a solid fill area, the flexographic printing plate 1 (relief 50) is brought into contact with the printing medium 3 in the entire range of the ROI, whereby the S1 is 1 (S1=1).

In addition, although not shown, in addition to the ROI, a ratio (ground area ratio in vicinity of a pixel of interest) S2 of "area of a relief portion that is brought into contact with the printing medium 3 in a range of the vicinity (hereinafter referred to as also a "vicinity range") during printing" with respect to "area (vicinity area) of the whole of a vicinity range of a pixel of interest (corresponding to a pitch between lines)" is calculated. The vicinity range is set so as to be smaller than the range of the ROI.

Then, a ratio S (S=S2/S1) of the "ground area ratio S1 in an ROI" and the "ground area ratio S2 in vicinity of a pixel of interest", described above, is calculated.

For example, if distribution of printing pressure (contact ratio) in the ROI is uniform, the "ground area ratio S1 in an ROI" equals the "ground area ratio S2 in vicinity of a pixel of interest" (S1=S2), whereby the ratio S is 1 (S=S2/S1=1).

Meanwhile, as a white space area increases in the ROI (particularly "in the ROI and out of the vicinity range"), the "ground area ratio S1 in an ROI" becomes less than 1 to be close to 0 (S1<<1), whereby the ratio S becomes more than 1 (S=(S2/S1)>>1). In addition, as a solid fill area (dot area ratio) increases in the ROI (particularly "in the ROI and out of the vicinity range"), the "ground area ratio S1 in an ROI" becomes close to 1 (S1≈1), and the "ground area ratio S2 in vicinity of a pixel of interest" becomes equal to or less than 1 (S2≤1), whereby the ratio S becomes equal to or less than 1 to be close to 0 (S=(S2/S1)≤1).

Next, a kind of relief at a position of interest (a pixel of interest) is determined, and first, it is determined whether or not the position of interest is an area corresponding to dots (S32 of FIG. 18). The determination is performed for each of positions of interest (pixels of interest) on the basis of image data (engraving shape data).

If the position of interest is the area corresponding to dots (YES at S32), the amount of correction of the engraving shape data is acquired from a ratio of a "ground area ratio of the position of interest" with respect to a "ground area ratio of a reference dot", or the ratio S (S=S2/S1) of the "ground area ratio S1 in an ROI" and the "ground area ratio S2 in vicinity of a pixel of interest", described above (S33).

The ratio S above is an index showing a difference in the "ground area ratio S2 of vicinity of a position of interest" with respect to the "ground area ratio S1 in an ROI". Thus, in a case where the "ground area ratio S1 in an ROI" serves as a "ground area ratio of a reference dot", the ratio S shows extent of difference in a "ground area ratio of a position of interest" as compared with the "ground area ratio of a reference dot" (or a ground area ratio of a periphery of a position of interest). In addition, a reference value of "S=1" shows that a "ground area ratio of a position of interest" equals the "ground area ratio of a periphery thereof (in an ROI)", and indirectly shows that a position of interest has the same ground area ratio (the same relief shape) as that of the periphery thereof.

Figure 20:
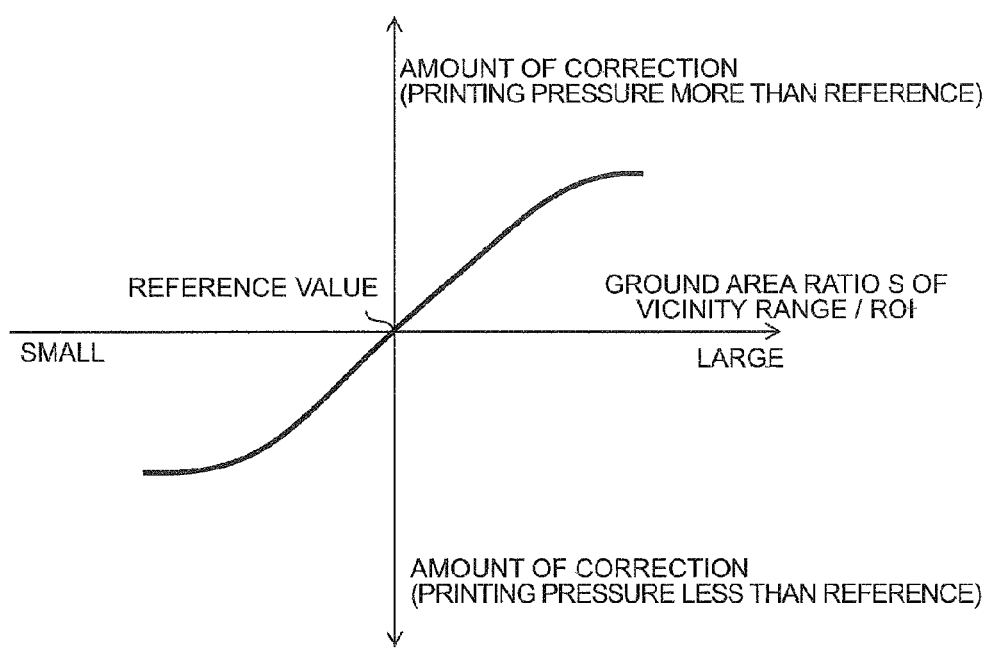
FIG. 20 shows an example of a relationship between a ratio of a "ground area ratio in an ROI" and a "ground area ratio in vicinity of a pixel of interest", and "the amount of correction of engraving shape data for dots".

FIG. 20 shows an example of a relationship between the ratio S of the "ground area ratio S1 in an ROI" and the "ground area ratio S2 in vicinity of a pixel of interest", and "the amount of correction of engraving shape data for dots". In FIG. 20, a horizontal axis shows the "ratio S" (a ground area ratio of a vicinity range/an ROI) described above, and a vertical axis shows "the amount of correction of engraving shape data". In addition, an intersection of the horizontal axis and the vertical axis shows a reference value, and shows a case where the ground area ratio S of a vicinity range/an ROI is 1 (S=1).

As described above, the ratio S of the "ground area ratio S1 in an ROI" and the "ground area ratio S2 in vicinity of a pixel of interest" is 1 if the ground area ratio in an ROI is uniform (refer to the "reference value" in FIG. 20). Meanwhile, as the "ground area ratio S2 in vicinity of a pixel of interest" becomes more than the "ground area ratio S1 in an ROI", a value of the ratio S becomes more than 1, and as the "ground area ratio S2 in vicinity of a pixel of interest" becomes less than the "ground area ratio S1 in an ROI", the value of the ratio S becomes less than 1. Thus, according to the example of FIG. 20, as a contact area ratio of a position of interest (a pixel of interest) becomes more than that of a periphery thereof (in an ROI) (as the periphery becomes close to a white space area), the ratio S becomes more than the reference value, and as the ratio S becomes more than the reference value, "the amount of correction of engraving shape data" in consideration of "application of printing pressure more than a reference value" increases, whereby ground area and relief height decrease, for example. Meanwhile, as the contact area ratio of a position of interest (a pixel of interest) becomes less than that of the periphery thereof (in an ROI) (as the periphery becomes close to a solid fill area), the ratio S becomes less than the reference value, and as the ratio S becomes less than the reference value, "the amount of correction of engraving shape data" in consideration of "application of printing pressure less than a reference value" increases, whereby ground area and relief height increase, for example.

Data showing "the amount of correction of engraving shape data" such as shown in FIG. 20 is determined according to a system (the flexographic printing system 60) to be used. Thus, data on "the amount of correction of engraving shape data" with respect to the ratio S of the "ground area ratio S1 in an ROI" and the "ground area ratio S2 in vicinity of a pixel of interest", the data being acquired for each of kinds of relief in advance according to a use system, is stored in a predetermined memory (not shown) or the like to be appropriately read out and used when "the amount of correction of engraving shape data" is calculated.

In addition, if a position of interest is a dot, it is desirable that characteristics of "a relative ratio of a ground area ratio against the amount of correction of engraving shape data", such as shown in FIG. 20, are changed and determined in accordance with a dot area ratio (dot density:dot percent). It is because that if a dot has a high dot percent (particularly, a dot with a dot area ratio of 50 percent or more), deformation of the relief 50 of the flexographic printing plate 1 during printing is relatively small, and if a dot has a low dot percent, the deformation of the relief 50 of the flexographic printing plate 1 during printing is relatively large.

Then, after the amount of correction of engraving shape data is acquired on the basis of the ratio S of ground area as described above, the amount of correction of engraving shape data is further acquired on the basis of setting printing pressure (S34 of FIG. 18).

As the simplest example, if "setting printing pressure is more than a standard value", the amount of correction is increased, and if "the setting printing pressure is less than the standard value", the amount of correction is reduced. It is because that as printing pressure increases, distortion of the relief 50 increases, whereby it is preferable that the amount of correction of engraving shape data is also increased. The standard value here is a predetermined printing pressure value, and an arbitrary printing pressure value (default setting value) determined by a manufacturer at the time of shipment of the flexographic printing system 60 (FIG. 9) may be set as the standard value, or an arbitrary printing pressure value (default setting value) determined by a user may be set as the standard value. "The amount of correction based on the ground area ratio S" described above is calculated by assuming that printing pressure is the standard value (S33).

As another example, it is also possible to combine "calculation of the amount of correction based on the ground area ratio S (S33)" and "calculation of the amount of correction of engraving shape data based on the setting printing pressure (S34)", described above. For example, in a case where characteristics data (table) on "a relative ratio of a ground area ratio against the amount of correction of engraving shape data", such as shown in FIG. 20, is used at the time of the calculation of the amount of correction based on the ground area ratio S (S33), a "reference value" of the characteristics data may be determined on the basis of the setting printing pressure. That is, the characteristics data (table) on "a relative ratio of a ground area ratio against the amount of correction of engraving shape data" is corrected on the basis of the setting printing pressure, and the amount of correction of engraving shape data is acquired on the basis of the characteristics data corrected. In this case, the "reference value" of the characteristics data corresponds to the setting printing pressure, and the amount of correction related to a pressed amount (printing pressure) of the engraving shape data is changed for each setting printing pressure, whereby it is possible to calculate the amount of correction of engraving shape data from the characteristics data in consideration of both of the "ground area ratio S" and the "setting printing pressure".

In this way, "the amount of correction of engraving shape data" in a case where a position of interest is a dot is calculated. Meanwhile, also in a case where a position of interest is a protruded thin line, "the amount of correction of engraving shape data" is calculated in like manner.

That is, in a case where it is determined that a position of interest is not a dot (No at S32 of FIG. 18) but an area corresponding to a protruded thin line (YES at S35), the amount of correction of engraving shape data is acquired from a ratio of "a ground area ratio of the position of interest" with respect to "a ground area ratio of a reference protruded thin line", or the ratio S (S=S2/S1) of the "ground area ratio S1 in an ROI" and the "ground area ratio S2 in vicinity of a pixel of interest", described above (S36). In addition, the amount of correction of engraving shape data is acquired on the basis of the setting printing pressure (S37).

For characteristics of "a relative ratio of a ground area ratio against the amount of correction of engraving shape data" to be a basis of calculation of the amount of correction of engraving shape data in this case, characteristics in a case where a position of interest is a protruded thin line are used, and are different from characteristics in a case where a position of interest is a dot (refer to FIG. 20).

Meanwhile, in a case where it is determined that a position of interest is not a protruded thin line (NO at S35), but an area corresponding to a solid fill (YES at S38), the amount of correction is not calculated, and also correction of the engraving shape data by the data correction unit 86 (refer to FIG. 11) is not performed and is skipped. It is because that in a solid fill area, the flexographic printing plate 1 and the printing medium 3 are brought into contact with each other throughout the area so that correction of the engraving shape data is unnecessary.

Then, in a case where it is determined that a position of interest is not any of a dot, a protruded thin line, and a solid fill (No at S38), the amount of correction of engraving shape data is acquired from a ratio of "a ground area ratio of the position of interest" with respect to "a ground area ratio of another reference area", or the ratio S (S=S2/S1) of the "ground area ratio S1 in an ROI" and the "ground area ratio S2 in vicinity of a pixel of interest", described above (S39). In addition, the amount of correction of engraving shape data is acquired on the basis of the setting printing pressure (S40).

Characteristics of "a relative ratio of a ground area ratio against the amount of correction of engraving shape data" to be a basis of calculation of the amount of correction of engraving shape data in this case are different from characteristics in a case where a position of interest is a dot (refer to FIG. 20) and characteristics in a case where a position of interest is a protruded thin line.

As with an ROI size, it is desirable that characteristics of "a relative ratio of a ground area ratio against the amount of correction of engraving shape data" to be used at the time of calculation of the amount of correction of engraving shape data described above (refer to S33, S36, and S39 of FIG. 18) are determined in accordance with plate hardness and viscoelasticity of the flexographic printing plate 1 (flexographic plate F) to be used, in any of cases where a position of interest is a dot, a protruded thin line, and other than those.

When the amount of correction of engraving shape data is determined as described above, the data correction unit 86 of the engraving shape data correction unit 78 (refer to FIG. 11) corrects the engraving shape data on the basis of the amount of correction determined.

In addition, the data correction unit 86 may be provided integrally with the exposure amount data converter 80, "the amount of data correction" acquired on the basis of distribution of printing pressure and setting printing pressure may not be directly reflected in engraving shape data, but indirectly reflected in exposure amount data.

FIG. 21 is a table (conversion table) showing an example of an exposure table to achieve shape correction, in which the "exposure table (an "exposure table 1" to an "exposure table 5" in a "dot", a "protruded thin line", and "other than those")" is associated with "the amount of correction of engraving shape data ("the amount of correction 1" to "the amount of correction 5")" and "a kind of relief of a position of interest (a pixel of interest)".

In a case where the data correction unit 86 is provided integrally with the exposure amount data converter 80, as shown in FIG. 21, for example, exposure amount data corresponding to each "the amount of correction of engraving shape data" determined (refer to "the amount of correction 1" to "the amount of correction 5" of FIG. 21) may be predetermined for each of cases of a "dot", a "protruded thin line", and "other than those" (the "exposure table 1" to the "exposure table 5"). In this case, the exposure amount data converter 80 is able to calculate exposure amount data reflecting the amount of correction for each of cases where a position of interest is a dot, a protruded thin line, a solid fill, and other than those, on the basis of a conversion table such as shown in FIG. 21. Then, the printing plate manufacturing apparatus 62 is able to form an appropriate relief of the flexographic printing plate 1 by engraving on the basis of "the exposure amount data reflecting the amount of correction" calculated in this way. In a conversion calculation process of exposure amount data based on an engraving algorithm corresponding to an engraving device (the printing plate manufacturing apparatus 62), the "exposure amount data reflecting the amount of correction" may be calculated by multiplying exposure amount data before correction (exposure amount data derived from engraving shape data before correction) by a numeric value stored in a conversion table such as shown in FIG. 21 (a correction reflecting value in an exposure table).

In addition, in a case where "exposure amount data based on setting printing pressure" is acquired separately from "exposure amount data based on image data", the exposure amount data creation unit 70 determines a printing pressure management relief (printing pressure management chart) on the basis of the setting printing pressure (S50 of FIG. 22) to convert the printing pressure management relief (printing pressure management chart) determined into exposure amount data (S51).

In this case, corresponding exposure amount data may be predetermined for each setting printing pressure corresponding to form the printing pressure management relief 14 on the flexographic printing plate 1 by reading out exposure amount data corresponding in accordance with setting printing pressure inputted. As shown in FIG. 23, for example, exposure amount data (a "printing pressure management chart exposure table 1" to a "printing pressure management chart exposure table 5") may be assigned to each of a plurality of setting printing pressures (a "setting printing pressure 1" to a "setting printing pressure 5") to allow exposure amount data corresponding to setting printing pressure inputted to be read out and used.

The printing pressure management relief is determined (S50 of FIG. 22) by creating engraving shape data, and "exposure amount data based on image data" and "exposure amount data based on setting printing pressure" may be separately created to be synthesized, or "engraving shape data based on image data" and "engraving shape data based on setting printing pressure" may be synthesized to be converted into exposure amount data.

Second Embodiment

A configuration identical with or similar to that of the first embodiment described above is designated by the same reference numeral as that in the first embodiment, and a detailed description of the configuration is omitted.

(Relationship Between Distribution of Printing Pressure and Printing Result)

As described above, printing pressure applied to the flexographic printing plate 1 depends on a kind of the relief 50 at a position of interest (such as a white space, a dot, a protruded thin line, and a solid fill) and a kind of the relief 50 of the periphery of the position, and also is affected by plate thickness of the flexographic printing plate 1. That is, an amount of depression and printing pressure of the flexographic printing plate 1 during image printing is also affected by plate thickness that the flexographic printing plate 1 originally has, whereby "the amount of depression" and the "printing pressure" in a portion with a large plate thickness become larger than those in a portion with a small plate thickness.

Figure 24:
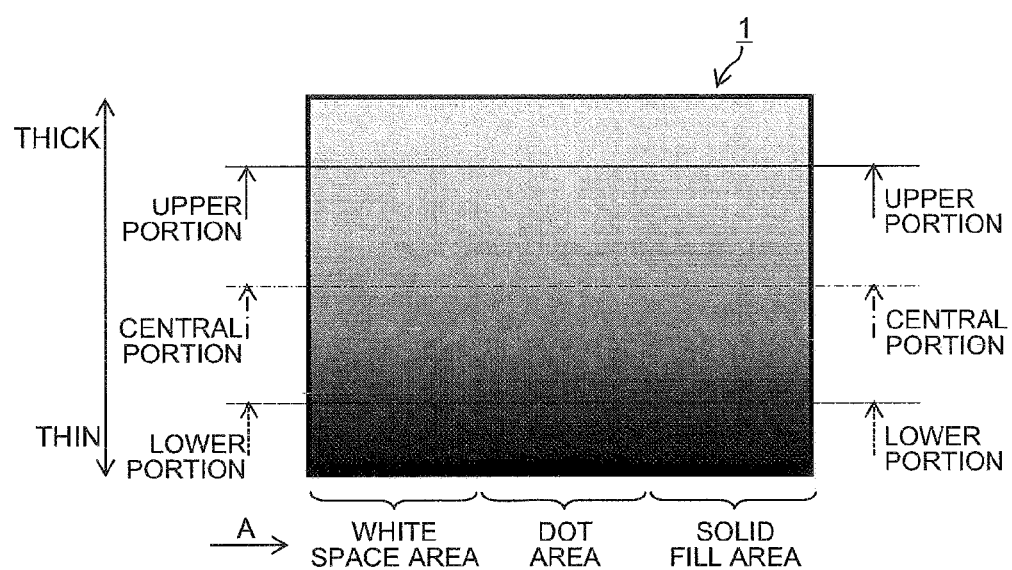
FIG. 24 shows an example of distribution of plate thickness of a flexographic printing plate.

FIG. 24 shows an example of distribution of plate thickness of the flexographic printing plate 1. In FIG. 24, a deeper portion shows a smaller plate thickness, and a portion closer to white (blank) shows a larger thickness. In the present example, the plate thickness decreases in the order of an "upper portion", a "central portion", and a "lower portion", and a value of each of "the amount of depression" and the "printing pressure" decreases in the order of the "upper portion", the "central portion", and the "lower portion".

Figure 25:
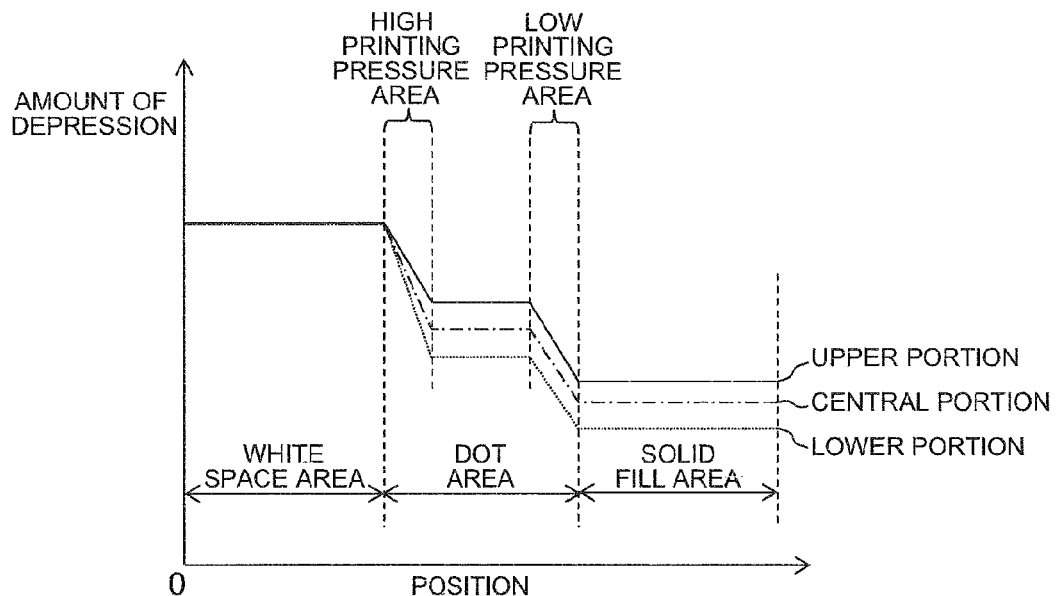
FIG. 25 shows an example of a relationship between each area of a flexographic printing plate with distribution of plate thickness and an amount of depression during printing.
Figure 26:
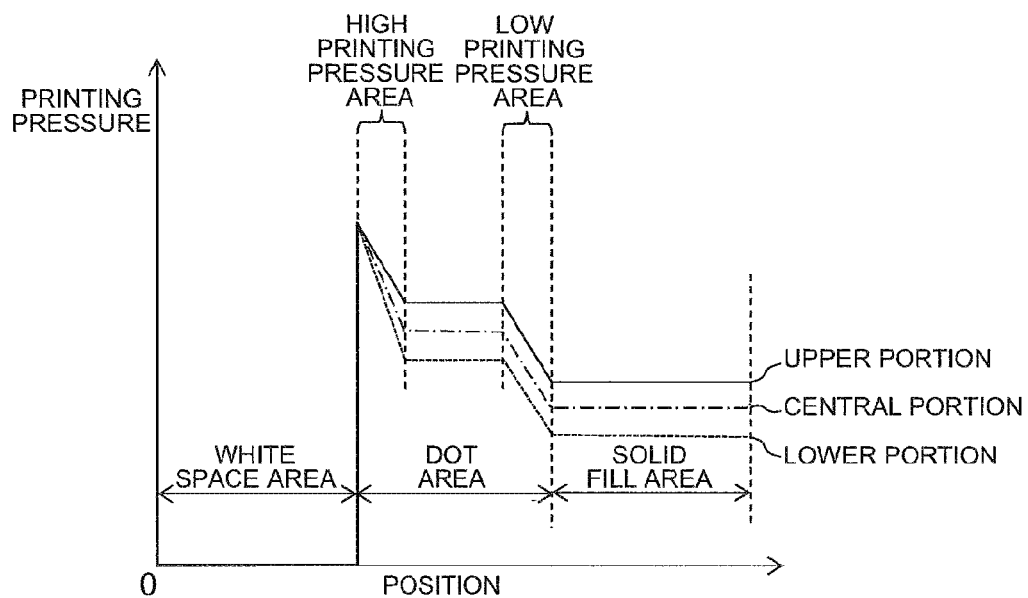
FIG. 26 shows an example of a relationship between each area of the flexographic printing plate with the distribution of plate thickness and printing pressure during printing.

FIG. 25 shows an example of a relationship between areas (positions in the direction of the arrow A) of the flexographic printing plate 1 shown in FIGS. 4 and 24, and an amount of depression during printing. FIG. 26 shows an example of a relationship between areas (positions in the direction of the arrow A) of the flexographic printing plate 1 shown in FIGS. 4 and 24, and printing pressure during printing. In addition, FIGS. 25 and 26 show the relationship in a case where the same load is uniformly applied to each of the "white space area", the "dot area", and the "solid fill area" of the flexographic printing plate 1 shown in FIG. 4. In addition, FIGS. 25 and 26 respectively show changes in "the amount of depression" and the "printing pressure", along a section line shown in each of displays of the "upper portion", the "central portion", and the "lower portion", of FIGS. 4 and 24.

In the flexographic printing plate 1 with the distribution of plate thickness of FIG. 24, a plate thickness of the upper portion of the plate is relatively large, and a plate thickness of the lower portion of the plate is relatively small. As a result, as shown in FIGS. 25 and 26, the amount of depression and printing pressure of the upper portion of the plate become relatively large, and the amount of depression and printing pressure of the lower portion of the plate become relatively small. In this way, the plate thickness affects the amount of depression and the amplitude of the printing pressure, whereby in a dot area and a protruded thin line area, a printed image of a portion with a large plate thickness (refer to the "upper portion" of each of FIGS. 4 and 24) becomes dark (thick), and a printed image of a portion with a small plate thickness (refer to the "lower portion" of each of FIGS. 4 and 24) becomes light (thin).

Figure 27:
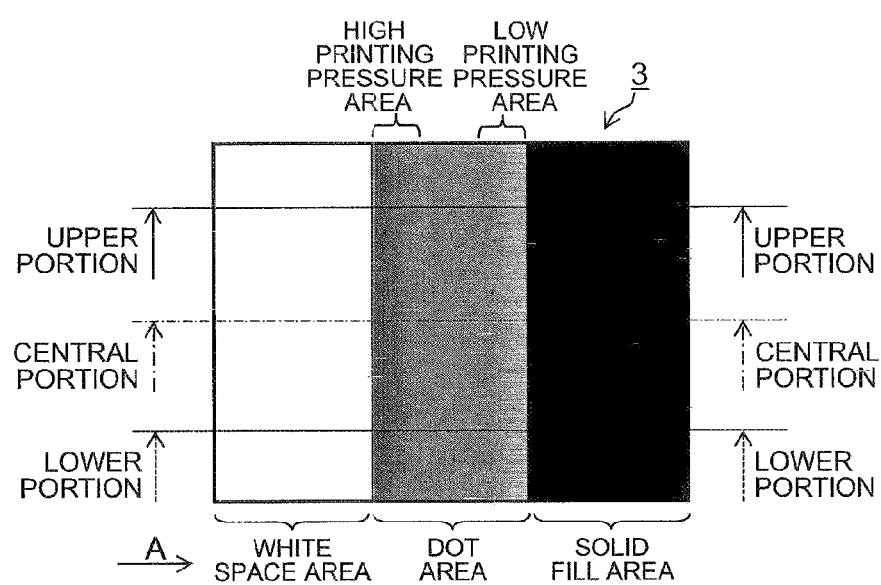
FIG. 27 is a plan view of a printing medium that shows an actual printed image in a case where normal printing is performed with the flexographic printing plate shown in FIG. 4, and that particularly shows a printed image obtained on the assumption that plate thickness is not uniform throughout the flexographic printing plate.

FIG. 27 is a plan view of the printing medium 3 showing an actual printed image when normal printing is performed with the flexographic printing plate 1 shown in FIGS. 4 and 24. Unlike printing under ideal conditions (refer to FIG. 7), actual printing is affected by a kind of relief in a peripheral area and distribution of plate thickness (distribution of plate height) of the flexographic printing plate 1, as shown in FIG. 27. That is, since extent of deformation of a small dot in a dot area varies depending on a kind of relief in a peripheral area and height of a plate surface varies with a variation in plate thickness, printing conditions on the printing medium 3 is affected by deviation of printing pressure.

In addition, in a case where setting printing pressure during printing is changed on a user side, the change in the setting printing pressure also affects printing pressure and the amount of depression of the flexographic printing plate 1. As above, since a printing condition of an area of interest depends on distribution of engraving shape (a kind of relief) in peripheral areas and distribution of plate thickness, a printing result intended by a user may not be obtained in flexographic printing by a normal method.

The inventor of the present invention has focused attention on this kind of relationship among distribution of printing pressure and setting printing pressure, and a printing condition, and has newly found out a technique capable of favorably reproducing an image on a printing medium (printing matter) by determining a relief (engraving shape) of a printing plate in consideration of deformation of a printing plate in accordance with distribution of printing pressure and setting printing pressure. That is, image data to be printed and distribution of plate thickness are analyzed so that distribution of printing pressure to be applied to the flexographic printing plate 1 is estimated, and then an engraving shape is determined (corrected) in consideration of deformation of the flexographic printing plate 1 based on the "distribution of printing pressure" estimated and "desired printing pressure (setting printing pressure) set by a user". As a result, it is possible to accurately print and reproduce a desired image on a printing medium.

Hereinafter, an example of a printing press that corrects an engraving shape on the basis of such distribution of printing pressure will be described.

(Example of Configuration of Printing Press)

Figure 28:
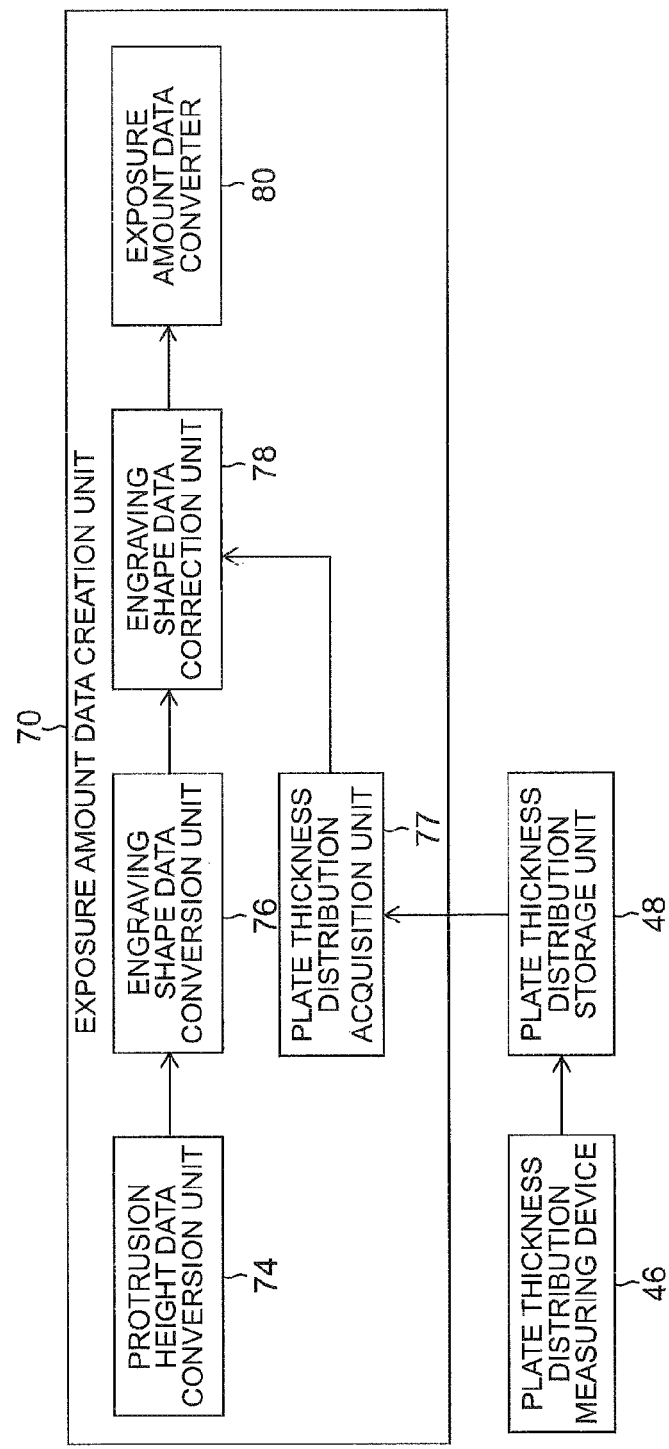
FIG. 28 is a functional block diagram showing an example of a configuration of the exposure amount data creation unit in accordance with a second embodiment.

FIG. 28 is a functional block diagram showing an example of a configuration of the exposure amount data creation unit 70 in accordance with the second embodiment.

The exposure amount data creation unit 70 includes the protrusion height data conversion unit 74, the engraving shape data conversion unit 76, a plate thickness distribution acquisition unit 77, the engraving shape data correction unit 78, and the exposure amount data converter 80.

The plate thickness distribution acquisition unit 77 acquires distribution data of plate thickness showing distribution of plate thickness of the flexographic plate F (flexographic printing plate 1). In the example shown in FIG. 28, a plate thickness distribution measuring device 46 provided separately from the exposure amount data creation unit 70 (RIP device 61) measures thickness (distribution of plate thickness) of the flexographic plate F of an object of relief engraving, and then a plate thickness distribution storage unit 48 stores a result of the measurement. The plate thickness distribution acquisition unit 77 reads out thickness measurements (the distribution data of plate thickness) of the flexographic plate F, stored in the plate thickness distribution storage unit 48, and supplies the thickness measurements to the engraving shape data correction unit 78.

The engraving shape data correction unit 78 corrects engraving shape data (relief pattern data) on the basis of distribution of printing pressure of the flexographic printing plate 1 (the engraving shape data, and the distribution data of plate thickness) and setting printing pressure.

The protrusion height data conversion unit 74, the engraving shape data conversion unit 76, and the exposure amount data converter 80 have the same configuration and action as those of the first embodiment (refer to FIG. 10) described above. In addition, as with the first embodiment described above, the engraving shape data correction unit 78 is composed of the printing pressure distribution estimation unit 82, the correction amount calculation unit 84, and the data correction unit 86 (refer to FIG. 11).

The printing pressure distribution estimation unit 82 (refer to FIG. 11) estimates distribution of printing pressure of the flexographic printing plate 1 pressed on the printing medium 3 during printing, on the basis of the engraving shape data (image data) and the distribution data of plate thickness. In addition, the printing pressure distribution estimation unit 82 may estimate the distribution of printing pressure on the basis of not only image data before being converted into the engraving shape data, but also the engraving shape data. In a case where the distribution of printing pressure is calculated more accurately or a relief shape cannot be formed as a 1-bit image shows by engraving due to characteristics of an engraving device (printing plate manufacturing apparatus 62), it is preferable that the distribution of printing pressure is estimated on the basis of the engraving shape data showing a shape to be actually engraved.

The correction amount calculation unit 84 calculates the amount of correction of the engraving shape data (relief pattern data) on the basis of "the distribution of printing pressure estimated by the printing pressure distribution estimation unit 82" and "the desired printing pressure (setting printing pressure) set by a user". The data correction unit 86 corrects the engraving shape data (relief pattern data) acquired by the engraving shape data conversion unit 76, on the basis of the amount of correction calculated by the correction amount calculation unit 84.

Figure 29:
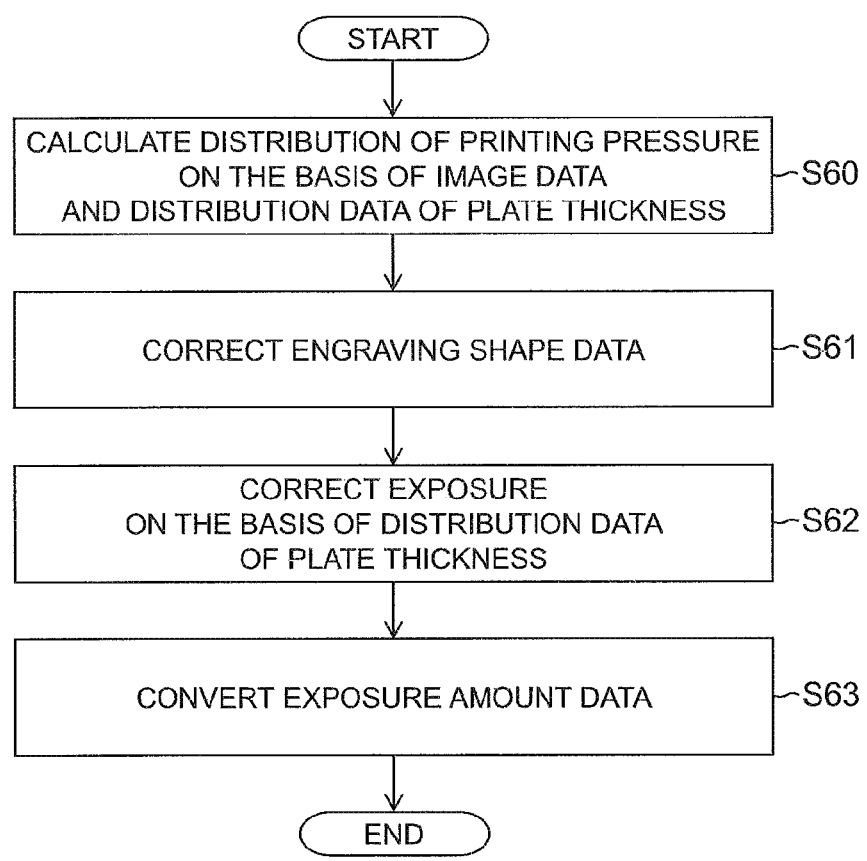
FIG. 29 is a flow chart that shows an outline of a flow of processing in the engraving shape data correction unit and the exposure amount data converter, and that shows an example of estimating distribution of printing pressure on the basis of image data before being converted into engraving shape data.

FIG. 29 is a flow chart that shows an outline of a flow of processing in the engraving shape data correction unit 78 and the exposure amount data converter 80, and that shows an example of estimating distribution of printing pressure on the basis of image data before being converted into the engraving shape data and the distribution data of plate thickness. In the example shown in FIG. 29, the distribution of printing pressure is calculated on the basis of an image and distribution of plate height, and an engraving shape is corrected in accordance with the distribution of printing pressure and setting printing pressure. Further, since an exposure beam diameter is different depending on plate height, exposure correction and exposure conversion are performed so as to be able to acquire an engraving shape targeted, whereby it is possible to manufacture the relief 50 in an engraving shape by previously considering the distribution of printing pressure.

In the present example, the printing pressure distribution estimation unit 82 (refer to FIG. 11) calculates the distribution of printing pressure of the flexographic printing plate 1 (S60 of FIG. 29) on the basis of the image data before being converted into the engraving shape data (refer to an example of 1-bit image data shown in FIG. 38 described later) and the distribution data of plate thickness.

Then, the correction amount calculation unit 84 calculates an amount of correction of the engraving shape data from a calculation result of the distribution of printing pressure and the setting printing pressure, and then the data correction unit 86 corrects the engraving shape data on the basis of the amount of correction calculated (S61). Subsequently, the exposure amount data converter 80 applies exposure correction based on the distribution data of plate thickness to the engraving shape data (S62), and further converts the engraving shape data after the exposure correction into exposure amount data (S63).

The amount of data correction based on the distribution of printing pressure may be reflected in either of data before being converted into the exposure amount data or of data after conversion. In addition, as described above, the engraving shape data before being converted into the exposure amount data may be corrected on the basis of an amount of calculation correction, or the exposure amount data after the conversion may be corrected on the basis of the amount of calculation correction.

Figure 30:
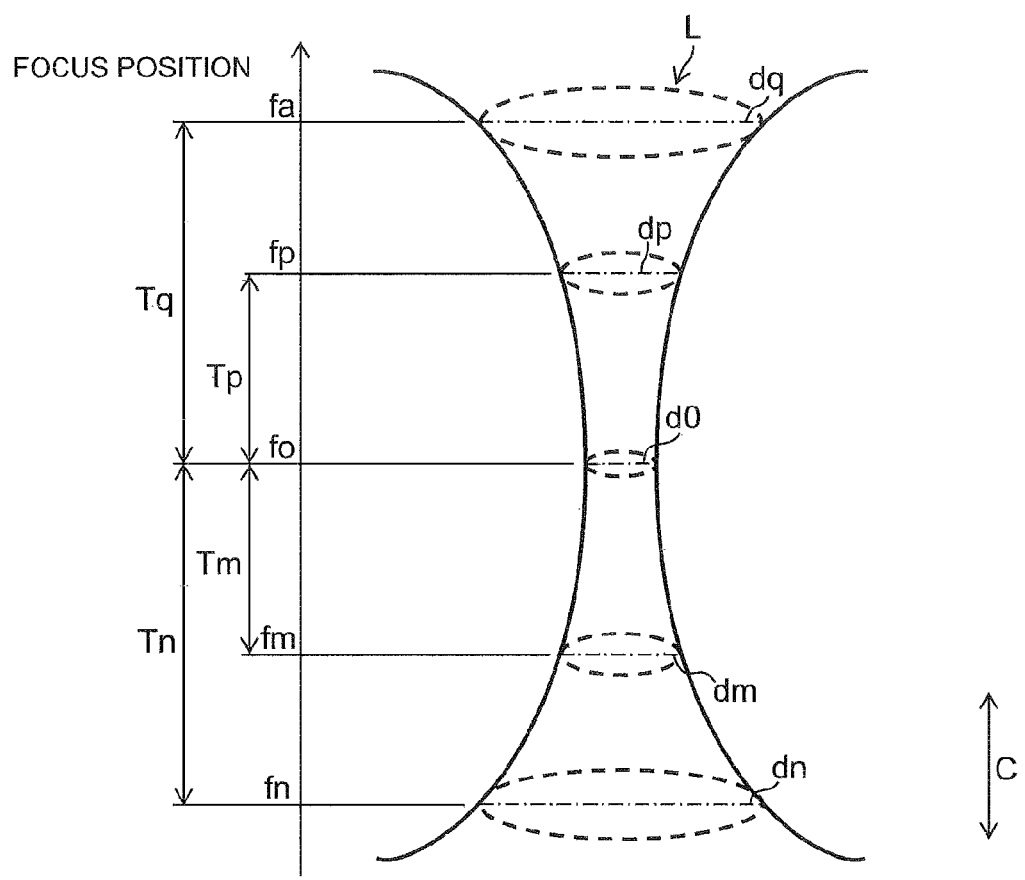
FIG. 30 shows change in a diameter of a laser (exposure beam) used in the laser engraving machine.

FIG. 30 shows a laser diameter at the time of laser exposure of the laser engraving machine 20. A laser L to be used in exposure processing of forming the relief 50 on the flexographic plate F (flexographic printing plate 1) changes in a beam diameter depending on its direction of travel (plate thickness direction) C.

That is, the laser L has a beam diameter $d_0$ at a focus position $f_0$ that becomes minimum, and with respect to the focus position $f_0$, a beam diameter increases in accordance with a distance from the focus position $f_0$ (relative height). For example, in an example shown in FIG. 30, in the plate thickness direction C, "a beam diameter $d_p$ at a focus position $f_p$ (a distance from the reference focus position $f_0$ is designated as $T_p$)" and "a beam diameter $d_q$ at the focus position $f_q$ (a distance from the reference focus position $f_0$ is designated as $T_q$)" have a relationship of "$d_q > d_p$" is a case of "$T_q > T_p$". In addition, the beam diameter of the laser L has symmetry with respect to the focus position $f_0$ in the direction of travel (plate thickness direction) C. Thus, with respect to focus positions $f_m$ and $f_n$ positioned on an opposite side to the focus positions $f_p$ and $f_q$ described above across the reference focus position $f_0$, if a distance $T_m$ from the reference focus position $f_0$ to the focus position $f_m$ satisfies a relationship of "$T_m = T_p$", a beam diameter $d_m$ at the focus position $f_m$ satisfies a relationship of "$d_m = d_p$". Likewise, if a distance $T_n$ from the reference focus position $f_0$ to the focus position $f_n$ satisfies a relationship of "$T_n > T_m$", a beam diameter $d_n$ at the focus position $f_n$ satisfies a relationship of "$d_p > d_m$".

Since a beam diameter of the laser L is an element that affects an irradiation range and irradiation intensity of the laser L, exposure processing using the laser L has specific exposure characteristics (such as a beam diameter, and irradiation intensity) in a thickness direction of the flexographic plate F (flexographic printing plate 1). Thus, it is preferable to consider this kind of exposure characteristics of the laser L in the exposure processing. Particularly, if thickness of the flexographic plate F (flexographic printing plate 1) is not uniform, it is possible to improve engraving accuracy of the relief 50 by considering exposure characteristics of the laser L in the plate thickness direction. As a result, the exposure amount data converter 80 derives the exposure characteristics of the laser L in the plate thickness direction from the distribution data of plate thickness, and the exposure characteristics are reflected in the engraving shape data and the exposure amount data (S62 of FIG. 29).

The engraving shape data to which the "correction of distribution of printing pressure" (S61) and the "exposure correction" (S62) are applied as described above is converted into the exposure amount data by the exposure amount data converter 80 (S63), and then the exposure amount data is transmitted to the printing plate manufacturing apparatus 62 (refer to FIG. 10). The "exposure correction based on the distribution data of plate thickness (S62)" described above may be performed along with "conversion of the exposure amount data (S63)". That is, correction in which exposure characteristics are considered so that a manufacturing error based on the exposure characteristics that vary with plate thickness of the flexographic plate F is canceled may be applied in a stage of engraving shape data, or in a stage of exposure amount data.

By a series of the processes (S60 to S63) described above, it is possible to calculate the exposure amount data for accurately forming the relief 50 with an engraving shape, in consideration of the distribution of printing pressure and the setting printing pressure, on the flexographic plate F (flexographic printing plate 1) by the exposure processing in consideration of the exposure characteristics.

Figure 31:
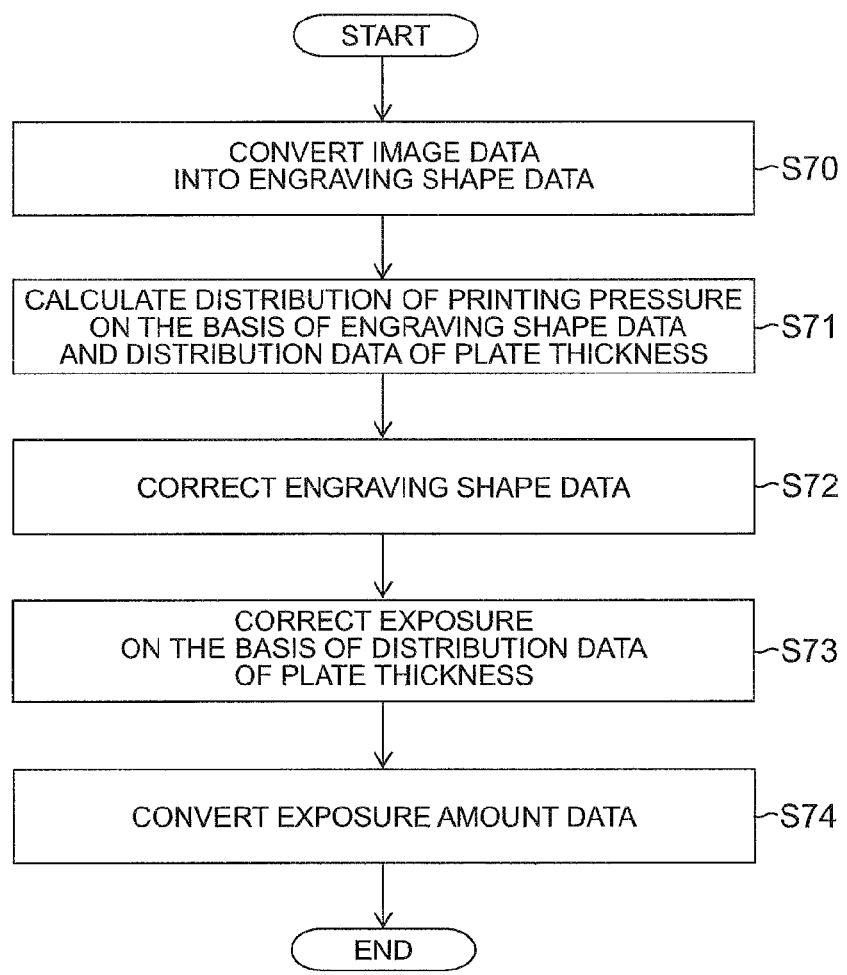
FIG. 31 is a flow chart that shows an outline of a flow of processing in the engraving shape data conversion unit, the engraving shape data correction unit, and the exposure amount data converter, and that shows an example of estimating distribution of printing pressure on the basis of engraving shape data.

FIG. 31 is a flow chart that shows an outline of a flow of processing in the engraving shape data conversion unit 76, the engraving shape data correction unit 78, and the exposure amount data converter 80, and that shows an example of estimating distribution of printing pressure on the basis of engraving shape data and distribution data of plate thickness. A description of a portion common to that of FIG. 29 will be omitted.

When the protrusion height data conversion unit 74 (refer to FIG. 28) acquires protrusion height data (relief pattern data), the engraving shape data conversion unit 76 calculates engraving shape data by converting the protrusion height data (image data) (S70 of FIG. 31).

Then, the printing pressure distribution estimation unit 82 calculates distribution of printing pressure of the flexographic printing plate 1 on the basis of the engraving shape data acquired and the distribution data of plate thickness (S71). Subsequently, the correction amount calculation unit 84 and the data correction unit 86 calculate the amount of correction of the engraving shape data and correct the engraving shape data on the basis of the distribution of printing pressure and the setting printing pressure (S72), and then the exposure amount data converter 80 (refer to FIG. 28) performs exposure correction based on the distribution data of plate thickness (S73) and conversion into exposure amount data (S74).

Next, an example of calculation of the amount of correction of engraving shape data, based on distribution of printing pressure of the flexographic printing plate 1, will be described.

Figure 32:
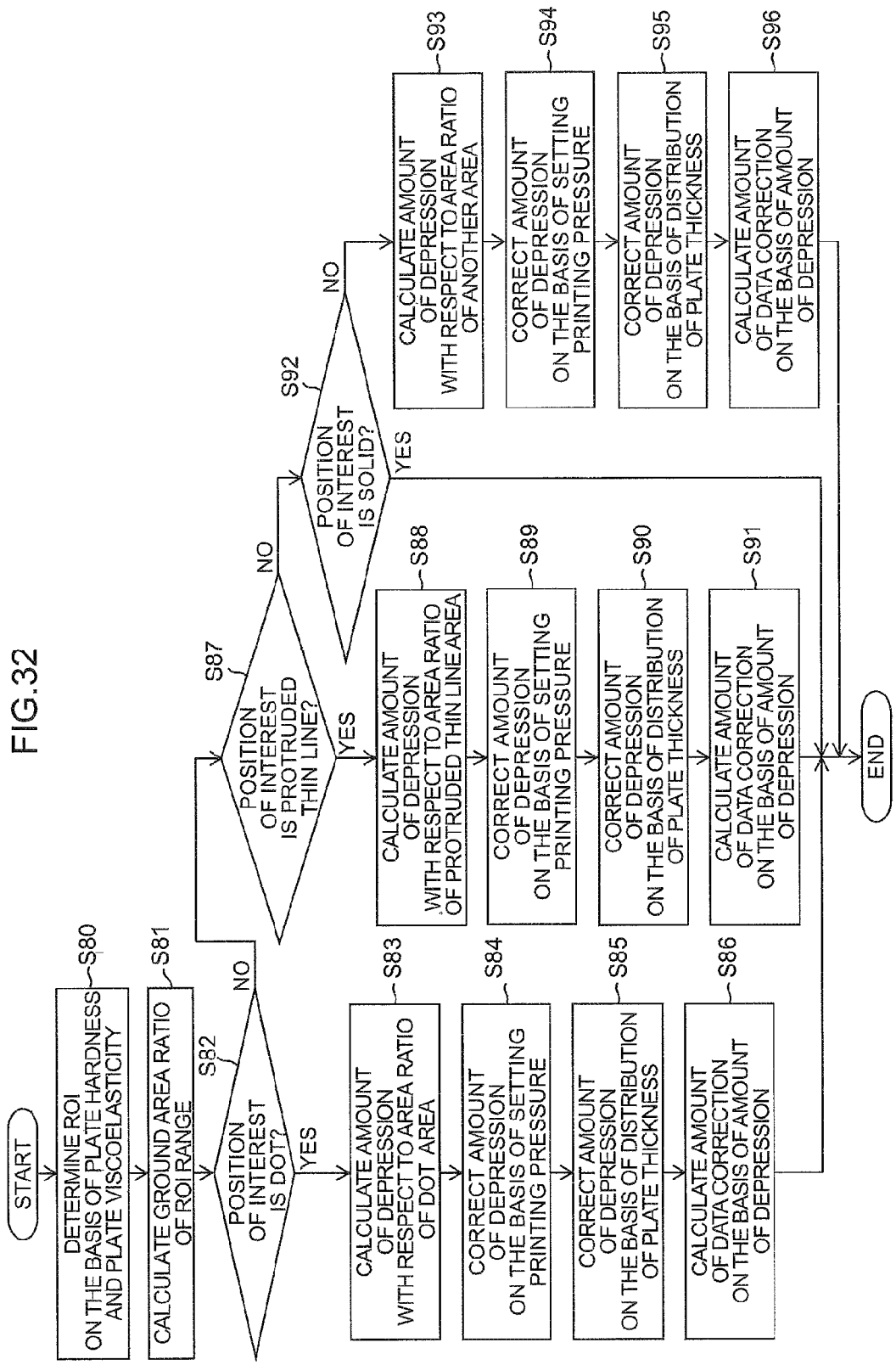
FIG. 32 is a flow chart that describes an example of a process of calculating a pressed amount (distribution of printing pressure) on the basis of image data (engraving shape data) and distribution of plate thickness to calculate an amount of correction based on the pressed amount (distribution of printing pressure).

FIG. 32 is a flow chart that describes an example of a process of calculating a pressed amount (distribution of printing pressure) on the basis of image data (engraving shape data) and plate thickness distribution to calculate the amount of correction based on the pressed amount (distribution of printing pressure). Although each processing in the flow of FIG. 32 is mainly performed by the correction amount calculation unit 84 of the engraving shape data correction unit 78 (refer to FIG. 11), another unit may perform a part of the processing if necessary.

Range affected by distribution of printing pressure of the flexographic printing plate 1 varies with "plate hardness (Shore A) of the flexographic printing plate 1" and "viscoelasticity of the flexographic printing plate 1". Thus, it is desirable that a size of a region of interest (ROI) that is a "range of distribution of printing pressure (predetermined range) serving as a basis of calculation of the amount of correction of engraving shape data" is determined on the basis of the plate hardness and the viscoelasticity of the flexographic printing plate 1. Accordingly, first, the ROI (range of distribution of printing pressure, refer to FIG. 18) is determined on the basis of the plate hardness and the viscoelasticity of the flexographic printing plate 1 that are previously acquired and stored in a memory and the like (S80 of FIG. 32).

Next, a ground area ratio (contact area ratio) of the flexographic printing plate 1 with respect to the printing medium 3 in a range of the ROI is calculated (S81 of FIG. 32).

That is, a ratio (a ground area ratio in the ROI) R of "area (contact area) of a relief portion that is to be brought into contact with the printing medium 3 in the ROI during printing, and that corresponds to a support of the flexographic printing plate 1 against the printing medium 3" with respect to "the entire area of the ROI" is calculated. For example, if the entire range in the ROI is a white space area, the flexographic printing plate 1 (relief 50) and the printing medium 3 are not brought into contact with each other, whereby the area ratio is 0% and the R is zero (R=0). Meanwhile, if the entire range in the ROI is a solid fill area, the flexographic printing plate 1 (relief 50) is brought into contact with the printing medium 3 in the entire range of the ROI, whereby the area ratio is 100% and the R is 1 (R=1). Thus, as the white space area increases in the ROI, the R becomes close to zero, and as the solid fill area increases in the ROI, the R becomes close to 1.

Next, a kind of relief at a position of interest (a pixel of interest) is determined, and first, it is determined whether or not the position of interest is an area corresponding to dots (S82 of FIG. 32). The determination is performed for each of positions of interest (pixels of interest) on the basis of image data (engraving shape data).

If the position of interest is the area corresponding to dots (YES at S82), a pressed amount at the position of interest corresponding to an area ratio of a dot area (ground area ratio, dot area ratio, and dot density) R is acquired (S83).

Figure 33:
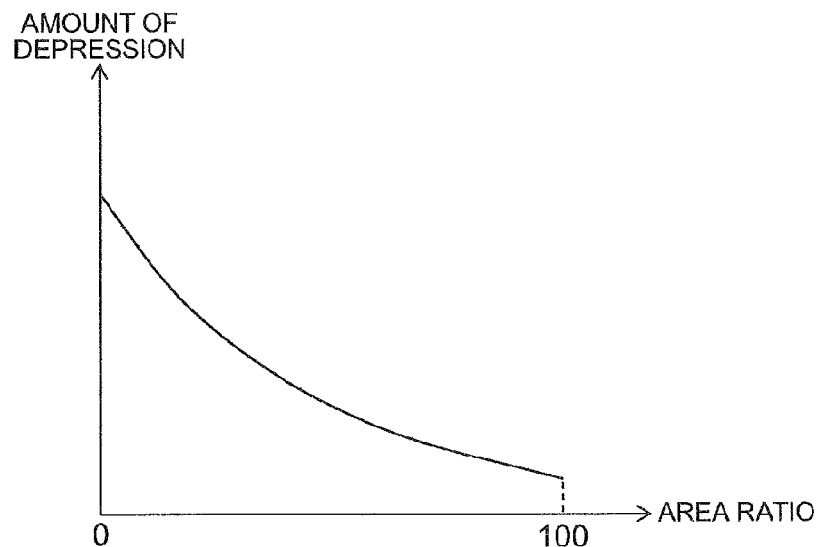
FIG. 33 shows an example of a correspondence relation between a ground area ratio in an ROI and a pressed amount.

FIG. 33 shows an example of a correspondence relation between a ground area ratio in an ROI and a pressed amount.

As shown in FIG. 33, in a case where the same load is applied, as the ground area ratio in the ROI increases, the pressed amount decreases, and as the ground area ratio in the ROI decreases, the pressed amount increases. It is because that as contact area decreases, force applied per unit area (printing pressure) increases, whereby the pressed amount also increases with the increase in printing pressure. This kind of "correspondence relation between a ground area ratio in an ROI and a pressed amount" is previously measured and stored in a memory (not shown) and the like to be appropriately read out if necessary. Then, a pressed amount at the position of interest, corresponding to the ground area ratio R of the dot area, is acquired on the basis of the "correspondence relation between a ground area ratio in an ROI and a pressed amount" read out.

In this way, in the present example, a "pressed amount" associated with "distribution of printing pressure" is used as a parameter, and the parameter of a "pressed amount" is used to (indirectly) estimate distribution of printing pressure of a printing plate pressed on a printing medium on the basis of image data. Although "printing pressure (distribution of printing pressure)" may be used as a usage parameter, it is better to use the "pressed amount" as a parameter to facilitate calculation processing from a point of view of performing correction based on distribution data of plate thickness described later.

The pressed amount at a position of interest acquired in this way is corrected by data correction on the basis of setting printing pressure (S84 of FIG. 32).

As the simplest example, if "setting printing pressure is more than a standard value", correction of increasing the pressed amount is performed, and if "the setting printing pressure is less than the standard value", correction of reducing the pressed amount is performed. It is because that as printing pressure increases, distortion of the relief 50 increases, whereby if the setting printing pressure is more than the standard value, the pressed amount becomes more than normal. The standard value here is a predetermined printing pressure value, and an arbitrary printing pressure value (default setting value) determined by a manufacturer at the time of shipment of the flexographic printing system 60 (FIG. 9) may be set as the standard value, or an arbitrary printing pressure value (default setting value) determined by a user may be set as the standard value. "The pressed amount based on the ground area ratio R" described above is calculated by assuming that printing pressure is the standard value (S83).

Then, the pressed amount at a position of interest, corrected on the basis of the setting printing pressure, is corrected by data correction on the basis of height distribution (distribution of plate thickness) of the flexographic plate F (flexographic printing plate 1) (S85). That is, the pressed amount at a position of interest is corrected so that a variation in printing pressure, caused by a variation in plate thickness of the flexographic plate F, is canceled. The distribution of plate thickness can be set with respect to height of the lowest position in a solid fill area (reference height), or a contact position of the lightest portion in the solid fill area, on the basis of correspondence with an image. As a result, data on a pressed amount at a position of interest is corrected so that the pressed amount at the position of interest increases if a relief tip position (relief contact position) at the position of interest (a pixel of interest) is relatively high with respect to the reference height, and so that the pressed amount at the position of interest decreases if the relief tip position at the position of interest is relatively low with respect to the reference height.

Then, the amount of correction of engraving shape data is acquired on the basis of "data on a pressed amount at a position of interest" corrected (S86).

Figure 34:
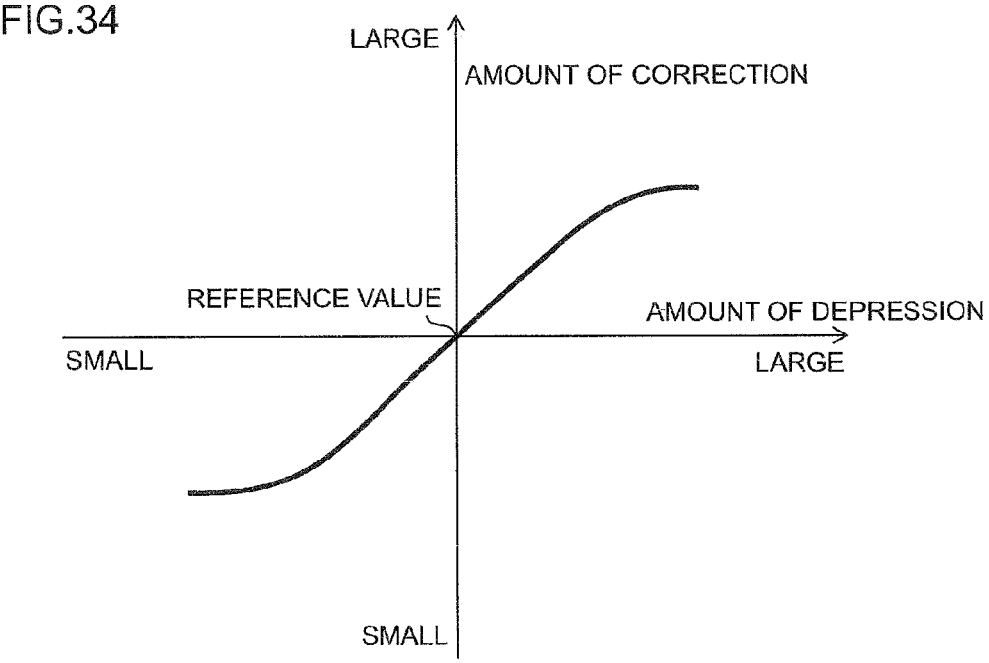
FIG. 34 shows an example of a correspondence relation between "a pressed amount at a position of interest (a pixel of interest)" and "the amount of correction of engraving shape data at the position of interest".

FIG. 34 shows an example of a correspondence relation between "a pressed amount at a position of interest (a pixel of interest)" and "the amount of correction of engraving shape data at the position of interest". In FIG. 34, a "reference value" is equivalent to a pressed amount corresponding to a predetermined normal printing pressure.

As shown in FIG. 34, as the pressed amount increases, the amount of correction increases, and as the pressed amount decreases, the amount of correction decreases. It is because that as the pressed amount increases, force applied per unit area (printing pressure) also increases to cause also an amount of deviation from an original printed image to tend to increase with the increase in printing pressure. This kind of "correspondence relation between a pressed amount and an amount of data correction" is previously measured and stored in a memory (not shown) and the like to be appropriately read out if necessary. Then, there is acquired the amount of correction of engraving shape data corresponding to the "data on a pressed amount at a position of interest" corrected on the basis of the "correspondence relation between a pressed amount and an amount of data correction" read out.

In this way, although the pressed amount and the amount of data correction are calculated on the basis of image data, distribution data of plate thickness, and setting printing pressure, that way equivalent to a way in which distribution of printing pressure is estimated on the basis of the image data and the distribution data of plate thickness, and the amount of correction of relief pattern data is calculated on the basis of the distribution of printing pressure and the setting printing pressure.

Since data showing "the correspondence relation between a ground area ratio in an ROI and a pressed amount" shown in FIG. 33, and data showing "the correspondence relation between a pressed amount at a position of interest (a pixel of interest) and the amount of data correction" shown in FIG. 34, vary depending on characteristics of the flexographic plate F, and engraving characteristics (relief forming characteristics) of the laser engraving machine 20, each data is determined according to a system to be used (the flexographic printing system 60). Thus, data on "a correspondence relation between a ground area ratio in an ROI and a pressed amount" and data on "a correspondence relation between a pressed amount at a position of interest (a pixel of interest) and the amount of data correction", previously acquired for each of kinds of relief according to a usage system, are stored in a predetermined memory (not shown) or the like to be appropriately read out and used when "the amount of correction of engraving shape data" is calculated.

In addition, if a position of interest is a dot, it is desirable that characteristics of "a correspondence relation between a ground area ratio in an ROI and a pressed amount" (refer to FIG. 33) and characteristics of "a correspondence relation between a pressed amount at a position of interest (a pixel of interest) and the amount of data correction" (refer to FIG. 34) are changed and determined in accordance with a dot area ratio (dot density:dot percent). It is because that if a dot has a high dot percent (particularly, a dot with a dot area ratio of 50 percent or more), deformation of the relief 50 of the flexographic printing plate 1 during printing is relatively small, and if a dot has a low dot percent, the deformation of the relief 50 of the flexographic printing plate 1 during printing is relatively large.

In this way, "the amount of correction of engraving shape data" in a case where a position of interest is a dot is calculated. Meanwhile, also in a case where a position of interest is a protruded thin line, "the amount of correction of engraving shape data" is calculated in like manner.

That is, if it is determined that a position of interest is not a dot (NO at S82 of FIG. 32) but an area corresponding to a protruded thin line (YES at S87), a pressed amount at a position of interest corresponding to the area ratio (ground area ratio) R of a protruded thin line area is acquired (S88, and refer to FIG. 33). Then, data on a pressed amount at the position of interest is corrected on the basis of the setting printing pressure and distribution data of plate thickness of the flexographic plate F (S89 and S90), and the amount of correction of engraving shape data is acquired on the basis of the "data on a pressed amount at the position of interest" corrected (S91, and refer to FIG. 34).

In this case, for the characteristics of "a correspondence relation between a ground area ratio in an ROI and a pressed amount" as well as the characteristics of "a correspondence relation between a pressed amount at a position of interest (a pixel of interest) and the amount of data correction", to be a basis of calculation of the amount of correction of engraving shape data, characteristics in a case where a position of interest is a protruded thin line are used, and are different from characteristics in a case where a position of interest is a dot (refer to FIGS. 33 and 34).

Meanwhile, in a case where it is determined that a position of interest is not a protruded thin line (NO at S87), but an area corresponding to a solid fill (YES at S92), the amount of correction is not calculated, and also correction of the engraving shape data by the data correction unit 86 (refer to FIG. 11) is not performed and is skipped. It is because that in a solid fill area, the flexographic printing plate 1 and the printing medium 3 are brought into contact with each other throughout the area so that correction of the engraving shape data is unnecessary.

Then, if it is determined that a position of interest is not any of a dot, a protruded thin line, and a solid fill (NO at S92), a pressed amount at a position of interest corresponding to the area ratio (ground area ratio) R of another area is acquired (S93, and refer to FIG. 33). Subsequently, data on a pressed amount at the position of interest is corrected on the basis of the setting printing pressure and distribution data of plate thickness of the flexographic plate F (S94 and S95), and the amount of correction of engraving shape data is acquired on the basis of the "data on a pressed amount at the position of interest" corrected (S96, and refer to FIG. 34).

In this case, the characteristics of "a correspondence relation between a ground area ratio in an ROI and a pressed amount" as well as the characteristics of "a correspondence relation between a pressed amount at a position of interest (a pixel of interest) and the amount of data correction", to be a basis of calculation of the amount of correction of engraving shape data, are different from characteristics in a case where a position of interest is a dot (refer to FIGS. 33 and 34) and those in a case where a position of interest is a protruded thin line.

As with an ROI size, it is desirable that the characteristics of "a correspondence relation between a ground area ratio in an ROI and a pressed amount" as well as the characteristics of "a correspondence relation between a pressed amount at a position of interest (a pixel of interest) and the amount of data correction", to be used at the time of calculation of the amount of correction of engraving shape data described above (refer to S80 to S96 of FIG. 32), are determined in accordance with plate hardness and viscoelasticity of the flexographic printing plate 1 (flexographic plate F) to be used, in any of cases where a position of interest is a dot, a protruded thin line, and other than those.

When the amount of correction of engraving shape data is determined as described above, the data correction unit 86 of the engraving shape data correction unit 78 (refer to FIG. 11) corrects the engraving shape data on the basis of the amount of correction determined.

In addition, the data correction unit 86 may be provided integrally with the exposure amount data converter 80, "the amount of data correction" acquired on the basis of distribution of printing pressure and setting printing pressure may not be directly reflected in engraving shape data, but indirectly reflected in exposure amount data (refer to FIG. 21).

FIG. 35 is a table showing an exposure conversion table to achieve shape correction corresponding to a laser beam diameter. In FIG. 35, a "focus position $f_0$" shows a position (reference focus position) where a beam diameter becomes minimum (refer to FIG. 30), and "+" and "−" indicate positions on opposite sides across the reference focus position $f_0$, and also height is in terms of micro meter (μm). Thus, a "focus position $f_{+1}$" and a "focus position $f_{+2}$", and a "focus position $f_{-1}$" and a "focus position $f_{-2}$", shown in FIG. 35, are respectively positioned on opposite sides across the reference focus position $f_0$ (refer to "$f_p$" and "$f_q$", and "$f_m$" and "$f_n$", of FIG. 30). In addition, the "focus position $f_{+1}$" and the "focus position $f_{-1}$" have the same distance from the reference focus position $f_0$, and also the "focus position $f_{+2}$" and the "focus position $f_{-2}$" has the same distance therefrom.

As shown in FIG. 35, exposure amount data corresponding to relief height may be stored in a memory (not shown) or the like as an exposure table. The laser engraving machine 20

(refer to FIG. 3) adjusts a focus position of the laser L with an autofocus mechanism so that a predetermined position of the flexographic plate F becomes a focus position ("$f_0$" of FIG. 30). "Height" (focus position) shown in the table of FIG. 35 shows a variation in plate height (plate thickness) with respect to the reference focus position $f_0$ as a distance (relative height) with respect to the focus position $f_0$.

The exposure amount data converter 80 is capable of correcting exposure amount data (exposure correction) on the basis of the amount of correction determined for each of positions of interest, with reference to the exposure conversion table shown in FIG. 35. The exposure table for each of focus positions, such as shown in FIG. 35, is assigned to each of the exposure tables (the "exposure table 1" to the "exposure table 5") determined by the amount of correction ("the amount of correction 1" to "the amount of correction 5") and a kind of relief (such as a "dot", a "protruded thin line", and "other than those"), such as shown in FIG. 21. Thus, the exposure amount data converter 80 determines a corresponding exposure table (FIG. 21) from a kind of relief (such as a "dot", a "protruded thin line", and "other than those") at a position of interest (a pixel of interest) and the amount of data correction ("the amount of correction 1" to "the amount of correction 5") calculated. Meanwhile, the exposure amount data converter 80 calculates a plate height (plate thickness) at a position of interest with respect to the reference focus position $f_0$. Then, the exposure amount data converter 80 determines an exposure table corresponding to the plate height (plate thickness) at the position of interest from among "exposure tables for respective focus positions, such as shown in FIG. 35", assigned to the exposure table (FIG. 21) determined. The exposure amount data is determined on the basis of the exposure table determined in this way.

Then, the printing plate manufacturing apparatus 62 is able to form an appropriate relief of the flexographic printing plate 1 by engraving on the basis of "the exposure amount data reflecting the amount of correction" calculated in this way. In a conversion calculation process of exposure amount data based on an engraving algorithm corresponding to an engraving device (the printing plate manufacturing apparatus 62), the "exposure amount data reflecting the amount of correction" may be calculated by multiplying exposure amount data before correction (exposure amount data derived from engraving shape data before correction) by a numeric value stored in a conversion table such as shown in FIGS. 21 and 35 (a correction reflecting value in an exposure table).

Figure 22:
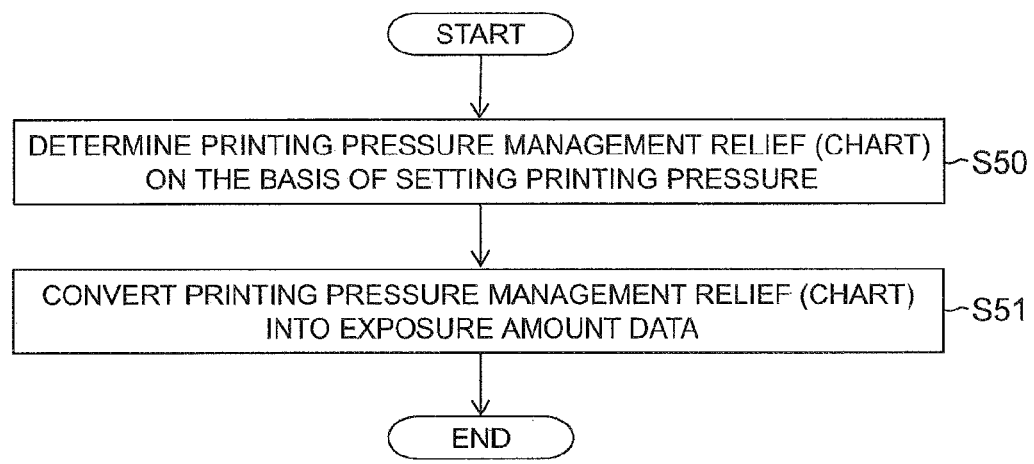
FIG. 22 shows an example of a calculation flow of exposure amount data of a printing pressure management relief.

In addition, the exposure amount data creation unit 70 may determine a printing pressure management relief (printing pressure management chart) on the basis of the setting printing pressure to convert the printing pressure management relief (printing pressure management chart) determined into exposure amount data (refer to FIG. 22). In this case, corresponding exposure amount data may be predetermined for each setting printing pressure to be read out in accordance with setting printing pressure inputted so that the printing pressure management relief 14 is formed on the flexographic printing plate 1 (refer to FIG. 23). In addition, the printing pressure management relief 14 may be formed in consideration of plate thickness of the flexographic plate F (flexographic printing plate 1) at a position where the printing pressure management relief 14 is formed.

FIG. 36 is a table showing an exposure conversion table to achieve a printing pressure management relief corresponding to a laser beam diameter. "Focus positions" shown in FIG. 36 are the same as the "focus positions" shown in FIG. 35.

As shown in FIG. 36, exposure amount data corresponding to printing pressure management relief may be stored in a memory (not shown) or the like as an exposure table. "Height" (focus position) shown in the table of FIG. 36 shows a variation in plate height (plate thickness) with respect to the reference focus position $f_0$ as a distance (relative height) with respect to the focus position $f_0$, and is in terms of micro meter (μm).

The exposure amount data converter 80 is capable of correcting exposure amount data to form the printing pressure management relief (exposure correction) with reference to the exposure conversion table shown in FIG. 36. The exposure table for each of focus positions, such as shown in FIG. 36, is assigned to each of the exposure tables (the "exposure table 1" to the "exposure table 5") for a setting printing pressure management chart (printing pressure management relief), such as shown in FIG. 23.

Figure 37:
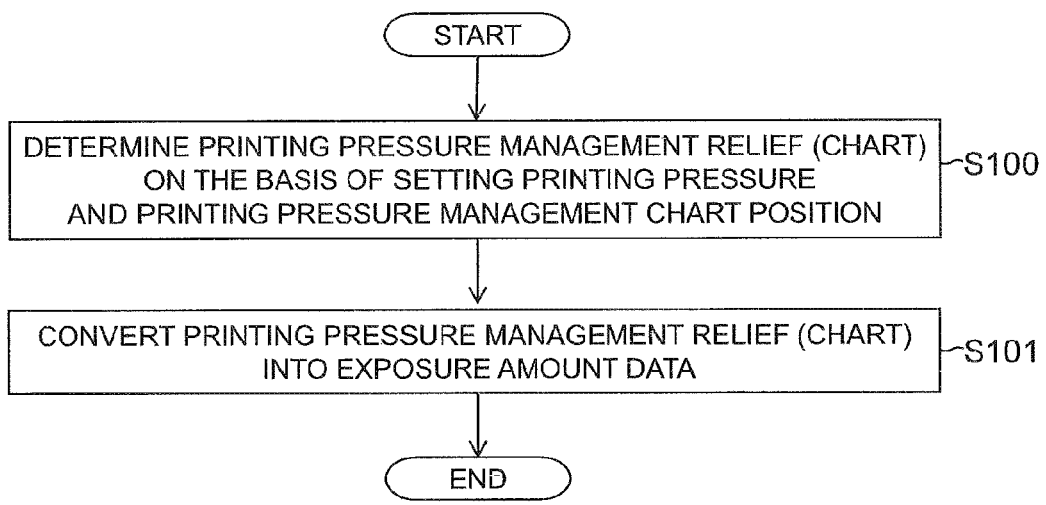
FIG. 37 shows an example of a calculation flow of exposure amount data for a printing pressure management relief in consideration of distribution of plate thickness.

FIG. 37 shows an example of a calculation flow of exposure amount data for the printing pressure management relief 14 in consideration of distribution of plate thickness. In the present example, the exposure amount data converter 80 determines a corresponding exposure table (FIG. 23) from the setting printing pressure (the "setting printing pressure 1" to the "setting printing pressure 5"). Meanwhile, the exposure amount data converter 80 calculates a plate height (plate thickness) at a position (printing pressure management chart position) where the printing pressure management relief 14 is formed. Then, the exposure amount data converter 80 determines an exposure table corresponding to the plate height (plate thickness) at the position where the printing pressure management relief 14 is formed from among "exposure tables for respective focus positions, such as shown in FIG. 36", assigned to the exposure table (FIG. 23) determined. The exposure amount data for forming the printing pressure management relief 14 by exposure forming is determined on the basis of the exposure table determined in this way.

In this case, the exposure amount data converter 80 synthesizes "exposure amount data based on image data" and "exposure amount data based on setting printing pressure".

(Example of Relief Correction)

The engraving shape data and the exposure amount data are corrected as described above to enable relief correction in consideration of distribution of printing pressure (and distribution of plate thickness) and setting printing pressure.

Figure 38:
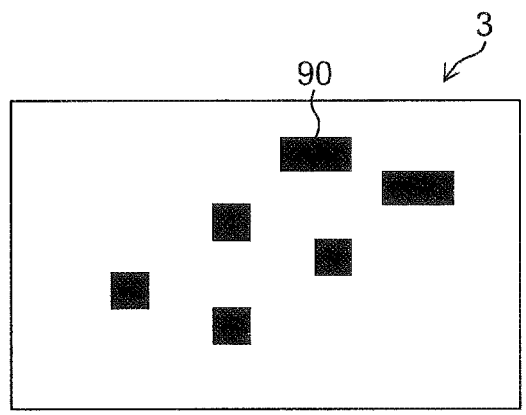
FIG. 38 shows an example of image data (1-bit image data) before being converted into engraving shape data.
Figure 39:
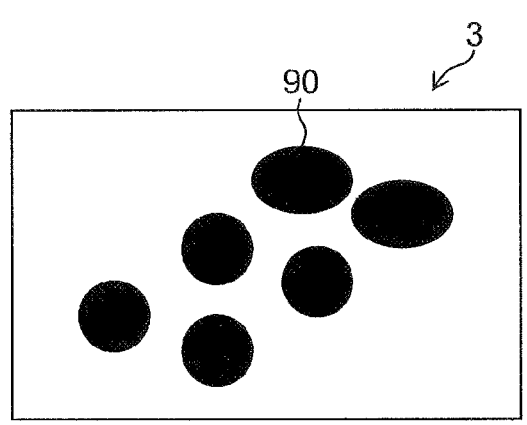
FIG. 39 shows an example of engraving shape data that can be acquired from the image data of FIG. 38.

FIG. 38 shows an example of image data (1-bit image data) before being converted into engraving shape data, and FIG. 39 shows an example of engraving shape data that can be acquired from the image data of FIG. 38. Each of FIGS. 38 and 39 shows a printed image 90 reproduced on the printing medium 3 from image data and engraving shape data.

As described above, although distribution of printing pressure of the flexographic printing plate 1 is estimated on the basis of an area ratio of a portion within a predetermined range of the flexographic printing plate 1, the portion being brought into contact with the printing medium 3, the distribution may be estimated on the basis of "image data before being converted into engraving shape data", such as shown in FIG. 38, or on the basis of "engraving shape data", such as shown in FIG. 39.

Figure 40:
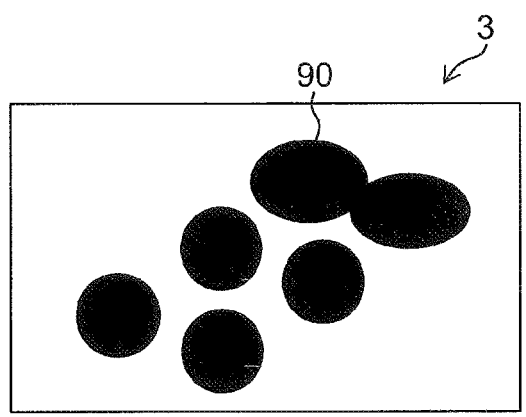
FIG. 40 shows an example of "engraving shape data after correction" that can be acquired by correcting the engraving shape data shown in FIG. 39 on the basis of distribution of printing pressure.
Figure 41:
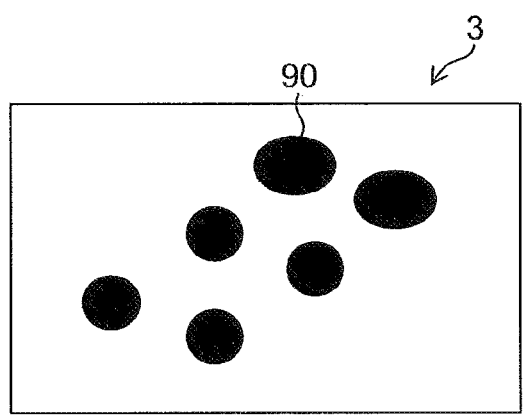
FIG. 41 shows another example of the "engraving shape data after correction" that can be acquired by correcting the engraving shape data shown in FIG. 39 on the basis of distribution of printing pressure.

Each of FIGS. 40 and 41 shows an example of "engraving shape data after correction" that can be acquired by correcting the engraving shape data shown in FIG. 39 on the basis of distribution of printing pressure. In addition, each of FIGS. 40 and 41 shows the printed image 90 reproduced on the printing medium 3 by normal flexographic printing (transfer printing) on the basis of "engraving shape data after correction" by neglecting influence of distribution of printing pressure in the periphery of a position of interest.

As compared with the engraving shape data (before correction) shown in FIG. 39, in the example shown in FIG. 40, "engraving shape data" is corrected so that the printed image 90 is expanded as a whole, and in the example shown in FIG. 41, the "engraving shape data" is corrected so that the printed image 90 is reduced in size as a whole. Thus, for example, if printing pressure applied to a position of interest is smaller than normal depending on a condition of the periphery thereof, engraving shape data is corrected to "engraving shape data that allows the printed image 90 to be expanded", such as shown in FIG. 40, to enable the printed image 90 same as that in a case where normal printing pressure is applied to be reproduced on the printing medium 3 as a result, even if applied printing pressure is smaller than normal. Meanwhile, if printing pressure applied to a position of interest is larger than normal depending on a condition of the periphery thereof, the engraving shape data is corrected to "engraving shape data that allows the printed image 90 to be reduced in size", such as shown in FIG. 41, to enable the printed image 90 same as that in a case where normal printing pressure is applied to be reproduced on the printing medium 3 as a result, even if applied printing pressure is larger than normal.

Figure 42:
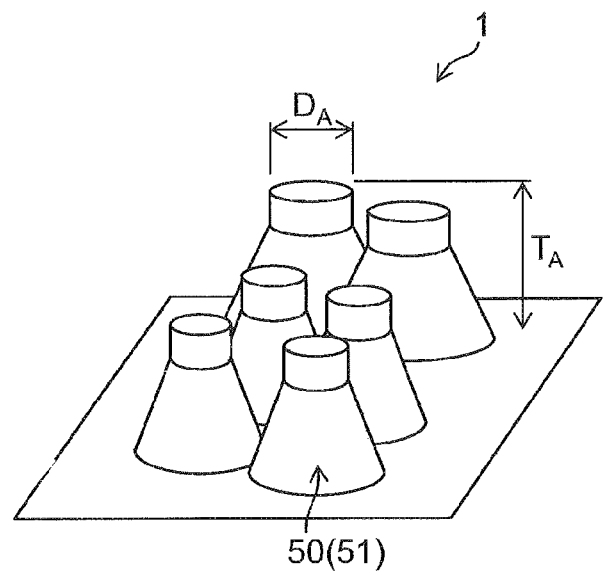
FIG. 42 is a perspective view that shows an appearance of an example of a relief formed in a part of a flexographic printing plate, and that shows an example of the relief (protrusions) created on the flexographic printing plate by engraving on the basis of engraving shape data to which correction in consideration of distribution of printing pressure is not applied.
Figure 43:
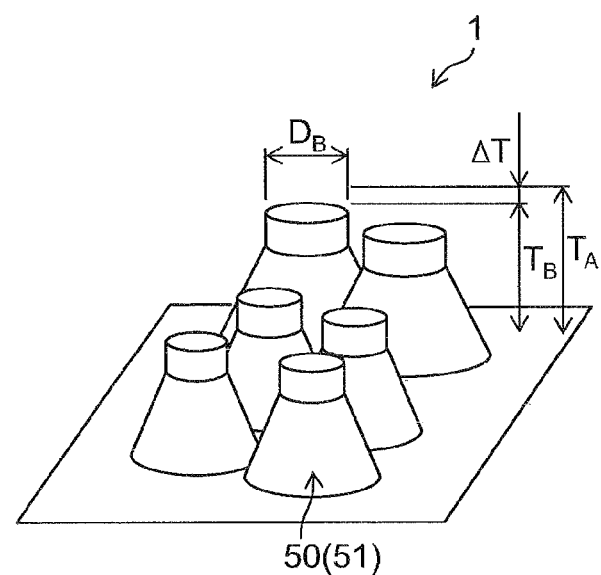
FIG. 43 is a perspective view that shows an appearance of an example of a relief formed in a part of a flexographic printing plate, and that shows an example of the relief (protrusions) created on the flexographic printing plate by engraving on the basis of engraving shape data to which the correction in consideration of distribution of printing pressure is applied.

FIG. 42 is a perspective view that shows an appearance of an example of the relief 50 formed in a part of the flexographic printing plate 1, and that shows an example of the relief 50 (protrusions 51) created on the flexographic printing plate 1 by engraving on the basis of engraving shape data to which correction in consideration of distribution of printing pressure is not applied. FIG. 43 is a perspective view that shows an appearance of an example of the relief 50 formed in a part of the flexographic printing plate 1, and that shows an example of the relief 50 (protrusions 51) created on the flexographic printing plate 1 by engraving on the basis of engraving shape data to which correction in consideration of distribution of printing pressure is applied.

A relief pattern formed on the flexographic printing plate 1 includes the plurality of protrusions 51, each of which has a base, and a tip that is provided on the base to be pressed on the printing medium 3. In flexographic printing, there are listed height (refer to "$T_A$" of FIG. 42) of each of the protrusions 51, and a shape of the tip of each of the protrusions 51, to be brought into contact with the printing medium 3 (refer to a diameter "$D_A$" of FIG. 42), as an element that significantly affects quality of the printed image 90 reproduced on the printing medium 3.

Thus, it is preferable that the engraving shape data includes height data and shape data on the plurality of protrusions 51 included in the relief pattern, and that the amount of correction of engraving shape data based on distribution of printing pressure relates to at least any one of the height data and shape data on the protrusions 51. Particularly, it is preferable that the shape data on the protrusions 51 includes at least shape data on the tip, and that the shape data on the tip includes data on a portion (face) of the tip that is brought into contact with a printing medium during printing. In addition, it is preferable that the height data on the plurality of protrusions relates to at least any one of tip height, base height, entire height of the tip and base, and particularly to the entire height and the tip height.

Thus, it is preferable to adjust height (refer to "$T_B (=T_A - \Delta T)$" of FIG. 43) of the protrusions 51 (relief 50) formed on the flexographic printing plate 1 and a shape of the tip (refer to a diameter "$D_B$" of FIG. 43) by correction based on distribution of printing pressure.

Figure 44:
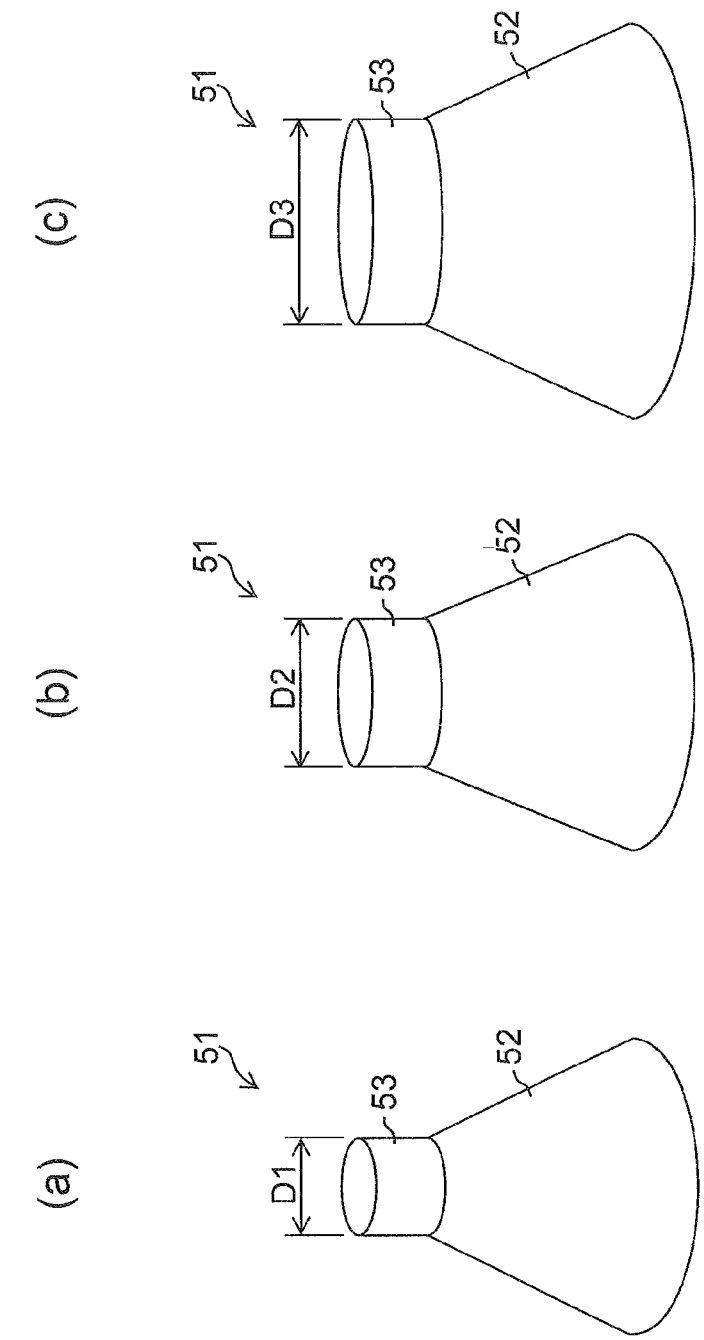
FIG. 44 is an external view of protrusions to describe an example of correcting an engraving shape (tip shape) of a small dot in dots in accordance with distribution of printing pressure, and includes: a portion (a) that shows a protrusion in a case where printing pressure more than normal is applied; a portion (b) that shows a protrusion in a case where normal printing pressure is applied; and a portion (c) that shows a protrusion in a case where printing pressure less than normal is applied.

FIG. 44 is an external view of the protrusions 51 to describe an example of correcting an engraving shape (tip shape) of a small dot in dots in accordance with distribution of printing pressure, and includes: a portion (a) that shows the protrusion 51 in a case where printing pressure more than normal is applied; a portion (b) that shows the protrusion 51 in a case where normal printing pressure is applied; and a portion (c) that shows the protrusion 51 in a case where printing pressure less than normal is applied.

Each of the protrusions 51 includes a base 52 in a truncated conical shape, and a tip 53 in a cylindrical shape provided on the base 52, the tip 53 having a cross-sectional diameter that is the same as that of a top end of the base 52. In the example shown in FIG. 44, the "shape data on the plurality of protrusions 51" in the engraving shape data includes at least the shape data on the tip 53, and the "shape data on the tip 53" includes data on a portion of the tip 53 that is brought into contact with the printing medium 3 during printing, and then the shape (diameter) of the tip 53 of the protrusion 51 is corrected and adjusted in accordance with distribution of printing pressure.

That is, in a case where printing pressure applied at a position of interest is within a normal range to be expected due to less influence from the periphery of the position of interest, a diameter of the "portion (ground portion) that is brought into contact with the printing medium 3" of the tip 53 of the protrusion 51 is also set at a normal size (refer to "D2" in the portion (b) of FIG. 44). Meanwhile, in a case where the printing pressure applied at the position of interest is more than (excessively more than) a normal amplitude to be expected due to influence from the periphery of the position of interest, the diameter of the tip 53 of the protrusion 51 is reduced as compared with that at the time of normal printing pressure (the portion (b) of FIG. 44) to reduce cross-sectional area of the tip (refer to "D1" in the portion (a) of FIG. 44). Accordingly, it is possible to perform prediction correction for reducing "expansion of the ground portion and the printed image 90" that is may be caused by deformation of the protrusion 51 (tip 53). In addition, in a case where the printing pressure applied at the position of interest is less than (excessively less than) the normal amplitude to be expected due to influence from the periphery of the position of interest, the diameter of the tip 53 of the protrusion 51 is increased as compared with that at the time of normal printing pressure (the portion (b) of FIG. 44) to increase the cross-sectional area of the tip (refer to "D3" in the portion (c) of FIG. 44). Accordingly, it is possible to perform prediction correction for reducing influence of "reduction of the ground portion and the printed image 90 in size" that may be caused by lack of deformation of the protrusion 51 (tip 53) due to small amplitude of printing pressure.

Figure 45:
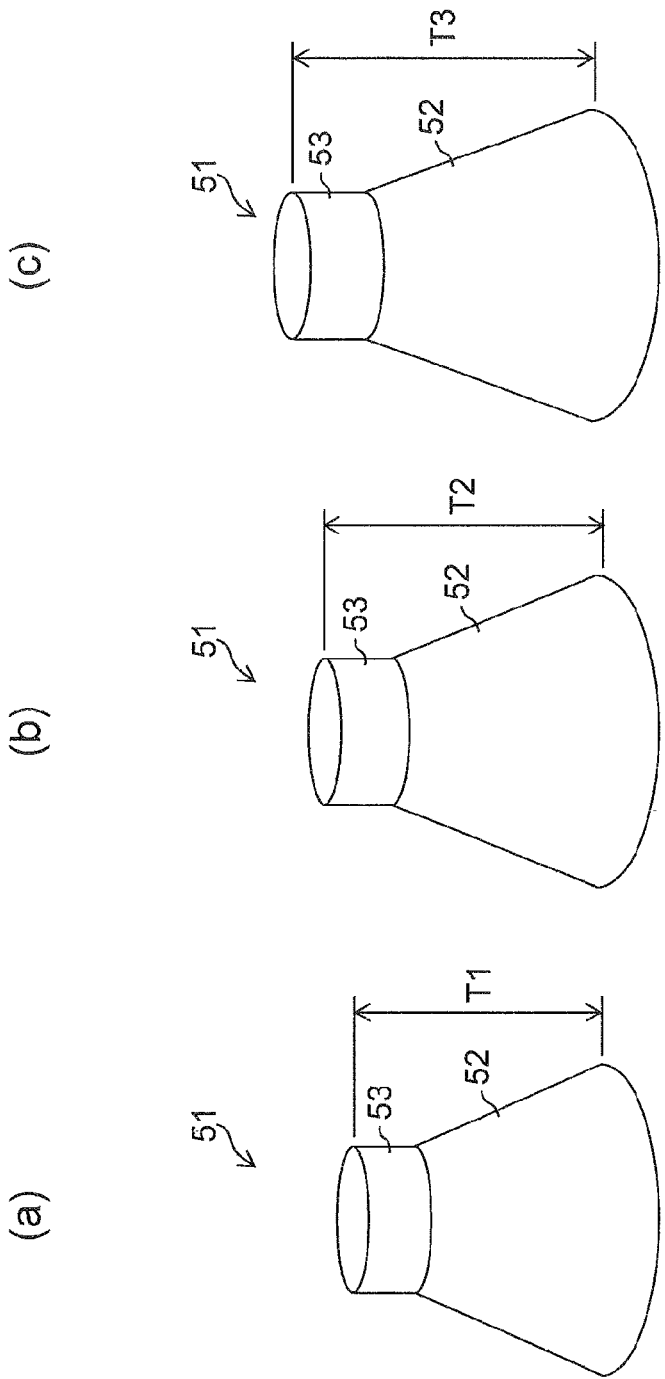
FIG. 45 is an external view of protrusions to describe an example of correcting an engraving shape (protrusion height) of a small dot in dots in accordance with distribution of printing pressure, and includes: a portion (a) that shows a protrusion in a case where printing pressure more than normal is applied; a portion (b) that shows a protrusion in a case where normal printing pressure is applied; and a portion (c) that shows a protrusion in a case where printing pressure less than normal is applied.

FIG. 45 is an external view of the protrusions 51 (relief 50) to describe an example of correcting an engraving shape (protrusion height) of a small dot in dots in accordance with distribution of printing pressure, and includes: a portion (a) that shows the protrusion 51 in a case where printing pressure more than normal is applied; a portion (b) that shows the protrusion 51 in a case where normal printing pressure is applied; and a portion (c) that shows the protrusion 51 in a case where printing pressure less than normal is applied.

In the example shown in FIG. 44, although the "diameter of the tip 53 of the protrusion 51 (relief 50)" is adjusted to perform correction of engraving shape data based on distribution of printing pressure, "height of the protrusion 51" may be adjusted (to be low layer thickness or high layer thickness) to perform such the correction. That is, it is possible to prevent unintended deformation of the protrusion 51 during printing by adjusting height of a ground portion of the tip 53 of the protrusion 51 to adjust the amplitude of printing pressure applied at a position of interest.

The adjustment of the "height of protrusion 51" described here means that relative relief height in a relief forming area of the flexographic printing plate 1 is adjusted, and serves as adjustment of a relative position (relative height) with respect to a position of the apex of relief (height) in an area (refer to the "solid fill area" of FIG. 4) for printing a solid fill portion, for example.

Depending on characteristics of an engraving device, a ground face (minimum ground face) of the relief 50 (protrusions 51) to be used in printing of a dot with a minimum diameter may be limited. Even in such a case, it is possible to reduce a small dot diameter of printing by adjusting the "height of the protrusion 51" to control a relative distance with respect to the printing medium 3.

For example, in a case where printing pressure applied at a position of interest is within a normal range to be expected due to less influence from the periphery of the position of interest, the "height of the protrusion 51" in the tip 53 of the protrusion 51 is also set at a normal height (refer to "T2" in the portion (b) of FIG. 45). Meanwhile, in a case where the printing pressure applied at the position of interest is more than (excessively more than) a normal amplitude to be expected due to influence from the periphery of the position of interest, the "height of the protrusions 51" is reduced (refer to "T1" in the portion (a) of FIG. 45) as compared with that at the time of normal printing pressure (the portion (b) of FIG. 45). Accordingly, it is possible to perform prediction correction for reducing "expansion of the ground portion and the printed image 90" that may be caused by deformation of the protrusion 51 (tip 53). In addition, in a case where the printing pressure applied at the position of interest is less than (excessively less than) the normal amplitude to be expected due to the influence from the periphery of the position of interest, the "height of the protrusions 51" is increased (refer to "T3" in the portion (c) of FIG. 45) as compared with that at the time of normal printing pressure (the portion (b) of FIG. 45). Accordingly, it is possible to perform prediction correction for reducing influence of "reduction of the ground portion and the printed image 90 in size" that may be caused by lack of deformation of the protrusion 51 (tip 53) due to small amplitude of printing pressure.

Figure 46:
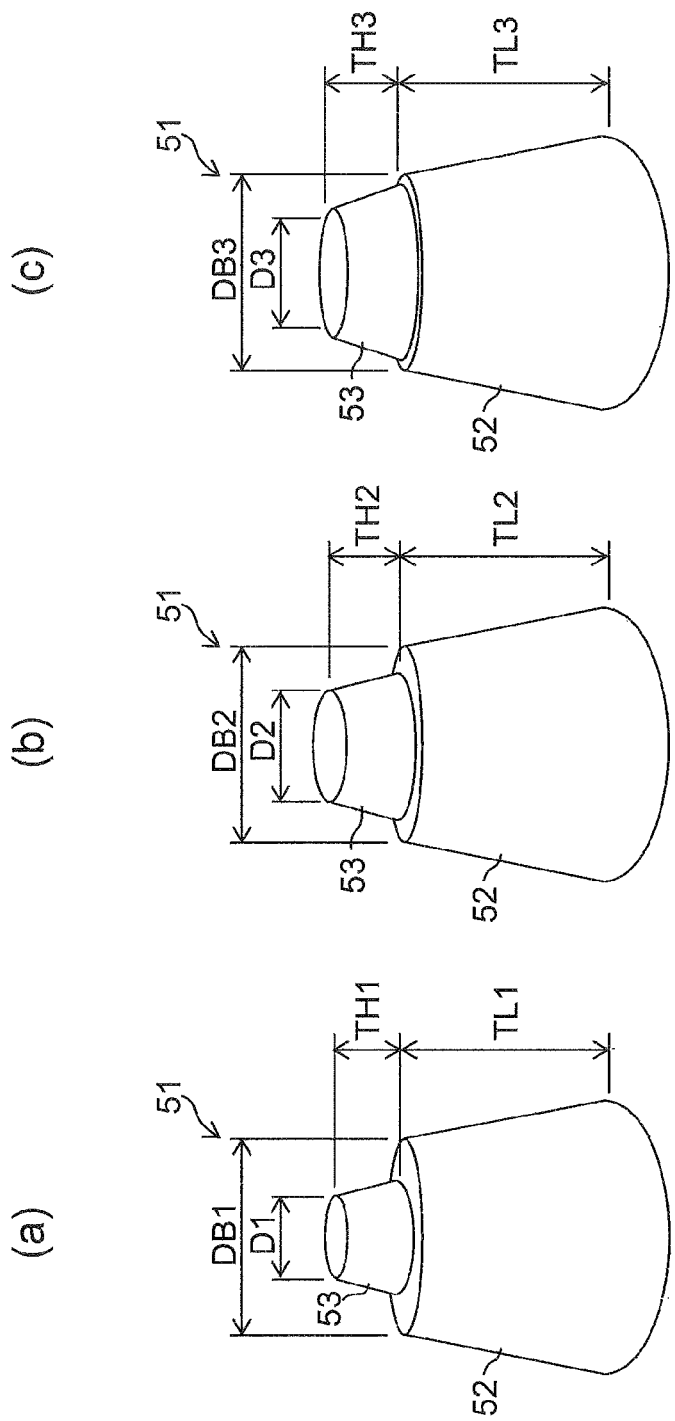
FIG. 46 is an external view of protrusions to describe an example of correcting an engraving shape (protrusion tip volume) of a small dot in dots in accordance with distribution of printing pressure, and includes: a portion (a) that shows a protrusion in a case where printing pressure more than normal is applied; a portion (b) that shows a protrusion in a case where normal printing pressure is applied; and a portion (c) that shows a protrusion in a case where printing pressure less than normal is applied.

FIG. 46 is an external view of the protrusions 51 (relief 50) to describe an example of correcting an engraving shape (protrusion tip volume) of a small dot in dots in accordance with distribution of printing pressure, and includes: a portion (a) that shows the protrusion 51 in a case where printing pressure more than normal is applied; a portion (b) that shows the protrusion 51 in a case where normal printing pressure is applied; and a portion (c) that shows the protrusion 51 in a case where printing pressure less than normal is applied.

In the example shown in each of FIGS. 44 and 45, although a size (tip diameter or protrusions height) of the protrusion 51 (relief 50) in an one-dimensional direction is adjusted to correct engraving shape data on the basis of distribution of printing pressure, the engraving shape data may be corrected on the basis of the distribution of printing pressure from a three-dimensional viewpoint. That is, it is preferable that the engraving shape data directly or indirectly includes volume data on the plurality of protrusions 51 included in a relief pattern, and that the amount of correction of engraving shape data based on distribution of printing pressure relates to the volume data. Accordingly, it is possible to prevent unintended deformation of the protrusion 51 during printing by controlling volume of the protrusion 51 (particularly, volume of the tip 53) to adjust the amplitude of printing pressure applied at a position of interest. In addition, the "volume data on the protrusions 51" described here may be indirect "volume data" shown by data on a cross-sectional shape (such as a cross-sectional diameter) of each of the protrusions 51 (base 52 and tip 53) and height data on each of the protrusions 51.

In the example shown in FIG. 46, each of the protrusions 51 includes the base 52 in a truncated conical shape that is provided integrally with the tip 53 in a truncated conical shape so that a bottom of the tip 53 is positioned at an apex of the base 52, and a cross-sectional diameter of the apex of the base 52 does not coincide with a cross-sectional diameter of the bottom of the tip 53. Then, there is a relationship as follows: "cross-sectional diameter of the apex of the base 52">"cross-sectional diameter of the bottom of the tip 53". In this kind of structure, it is possible to control a small dot diameter of printing by adjusting the "volume of the tip 53 of the protrusion 51".

For example, in a case where printing pressure applied at a position of interest is within a normal range to be expected due to less influence from the periphery of the position of interest, a diameter and height of the tip 53 is determined so that the volume of the tip 53 of the protrusion 51 also becomes a normal size (refer to "D2" and "TH2" in the portion (b) of FIG. 46). Meanwhile, in a case where the printing pressure applied at the position of interest is more than (excessively more than) a normal amplitude to be expected due to influence from the periphery of the position of interest, the diameter and height of the tip 53 is determined so that the volume of the tip 53 of the protrusion 51 is reduced (refer to "D1" and "TH1" in the portion (a) of FIG. 46) as compared with that at the time of normal printing pressure (the portion (b) of FIG. 46). Accordingly, it is possible to perform prediction correction for reducing "expansion of the ground portion and the printed image 90" that may be caused by deformation of the protrusion 51 (tip 53). In addition, in a case where the printing pressure applied at the position of interest is less than (excessively less than) the normal amplitude to be expected due to influence from the periphery of the position of interest, the diameter and height of the tip 53 is determined so that the volume of the tip 53 of the protrusion 51 is increased (refer to "D3" and "TH3" in the portion (c) of FIG. 46) as compared with that at the time of normal printing pressure (the portion (b) of FIG. 46). Accordingly, it is possible to perform prediction correction for reducing influence of "reduction of the ground portion and the printed image 90 in size" that may be caused by lack of deformation of the protrusion 51 (tip 53) due to small amplitude of printing pressure.

Volume of the base 52 may be adjusted in addition to the tip 53 of the protrusion 51 (or instead of the tip 53 of the protrusion 51). That is, in order to reduce the influence from the periphery on printing pressure, a diameter and height of the base 52 may be determined so that the volume of the base 52 decreases if printing pressure more than normal is applied, and so that the volume of the base 52 increases if the printing pressure less than normal is applied (refer to "DB1" to "DB3", and "TH1" to "TH3", in portions (a) to (c) of FIG. 46). However, since the volume of the tip 53 usually exerts more influence on printing pressure than does the volume of the base 52, it is better to control the volume (a diameter and height) of the tip 53 on a priority basis in many cases.

In addition, an engraving shape (engraving shape data) of the relief 50 (protrusions 51) for dots of the flexographic printing plate 1 may be adjusted by a technique other than the above, and in combination with the techniques shown in FIGS. 44 to 46 described above, a diameter and height of the tip 53 of the protrusion 51, a diameter and height of the base 52, a size ratio (volume ratio) between the tip 53 and the base 52, and the like, may be appropriately adjusted.

Although FIGS. 44 to 46 above described correction of an engraving shape for dot printing, another correction of an engraving shape may be also performed in like manner.

Figure 47:
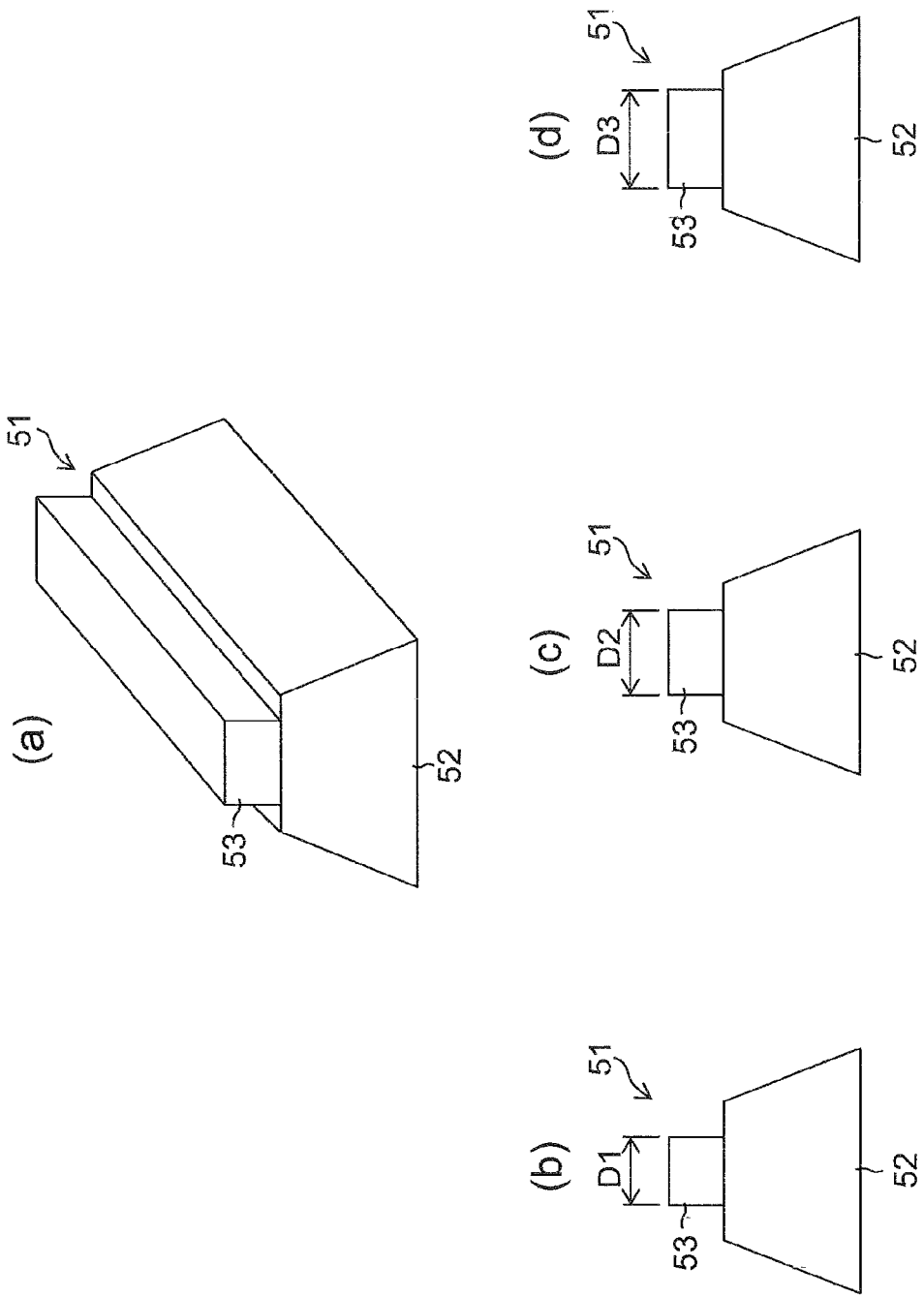
FIG. 47 is an external view of protrusions to describe an example of correcting a relief engraving shape (tip shape) for printing of a protruded thin line in accordance with distribution of printing pressure, and includes: a portion (a) that is a perspective view that shows an appearance of a protrusion for printing of a protruded thin line; a portion (b) that is a cross-sectional view of a protrusion in a case where printing pressure more than normal is applied; a portion (c) that is a cross-sectional view of a protrusion in a case where normal printing pressure is applied; and a portion (d) that is a cross-sectional view of a protrusion in a case where printing pressure less than normal is applied.

FIG. 47 is an external view of the protrusions 51 to describe an example of correcting a relief engraving shape (tip shape) for printing of a protruded thin line in accordance with distribution of printing pressure, and includes: a portion (a) that is a perspective view of the protrusion 51 for printing of a protruded thin line; a portion (b) that is a cross-sectional view of the protrusion 51 in a case where printing pressure more than normal is applied; a portion (c) that is a cross-sectional view of the protrusion 51 in a case where normal printing pressure is applied; and a portion (d) that is a cross-sectional view of the protrusion 51 in a case where printing pressure less than normal is applied.

The protrusion 51 for printing of a protruded thin line of the present example includes the base 52 and the tip 53 provided on a top face of the base 52. The base 52 has a quadrangular prism shape with a side face in a trapezoidal shape, and the tip 53 has a quadrangular prism shape with a side face in a rectangular shape.

For example, in a case where printing pressure applied at a position of interest is within a normal range to be expected due to less influence from the periphery of the position of interest, a size (width) of an "apex (ground portion) that is brought into contact with the printing medium 3" of the tip 53 of the protrusion 51 is also set at a normal size (refer to "D2" in the portion (c) of FIG. 47). Meanwhile, in a case where the printing pressure applied at the position of interest is more than (excessively more than) a normal amplitude to be expected due to influence from the periphery of the position of interest, the size (width) of the tip 53 of the protrusion 51 is reduced as compared with that at the time of normal printing pressure (the portion (c) of FIG. 47) to reduce cross-sectional area of the tip (refer to "D1" in the portion (b) of FIG. 47). Accordingly, it is possible to perform prediction correction for reducing "expansion of the ground portion and the printed image 90" that may be caused by deformation of the protrusion 51 (tip 53). In addition, in a case where the printing pressure applied at the position of interest is less than (excessively less than) the normal amplitude to be expected due to influence from the periphery of the position of interest, the size (width) of the tip 53 of the protrusion 51 is increased as compared with that at the time of normal printing pressure (the portion (c) of FIG. 47) to increase the cross-sectional area of the tip (refer to "D3" in the portion (d) of FIG. 47). Accordingly, it is possible to perform prediction correction for reducing influence of "reduction of the ground portion and the printed image 90 in size" that may be caused by lack of deformation of the protrusion 51 (tip 53) due to small amplitude of printing pressure.

In addition, engraving shape data may be corrected from a three-dimensional viewpoint, so that it is possible to prevent unintended deformation of the protrusion 51 during printing by controlling volume of the protrusion 51 (particularly, volume of the tip 53) to adjust the amplitude of printing pressure applied at a position of interest.

Figure 48:
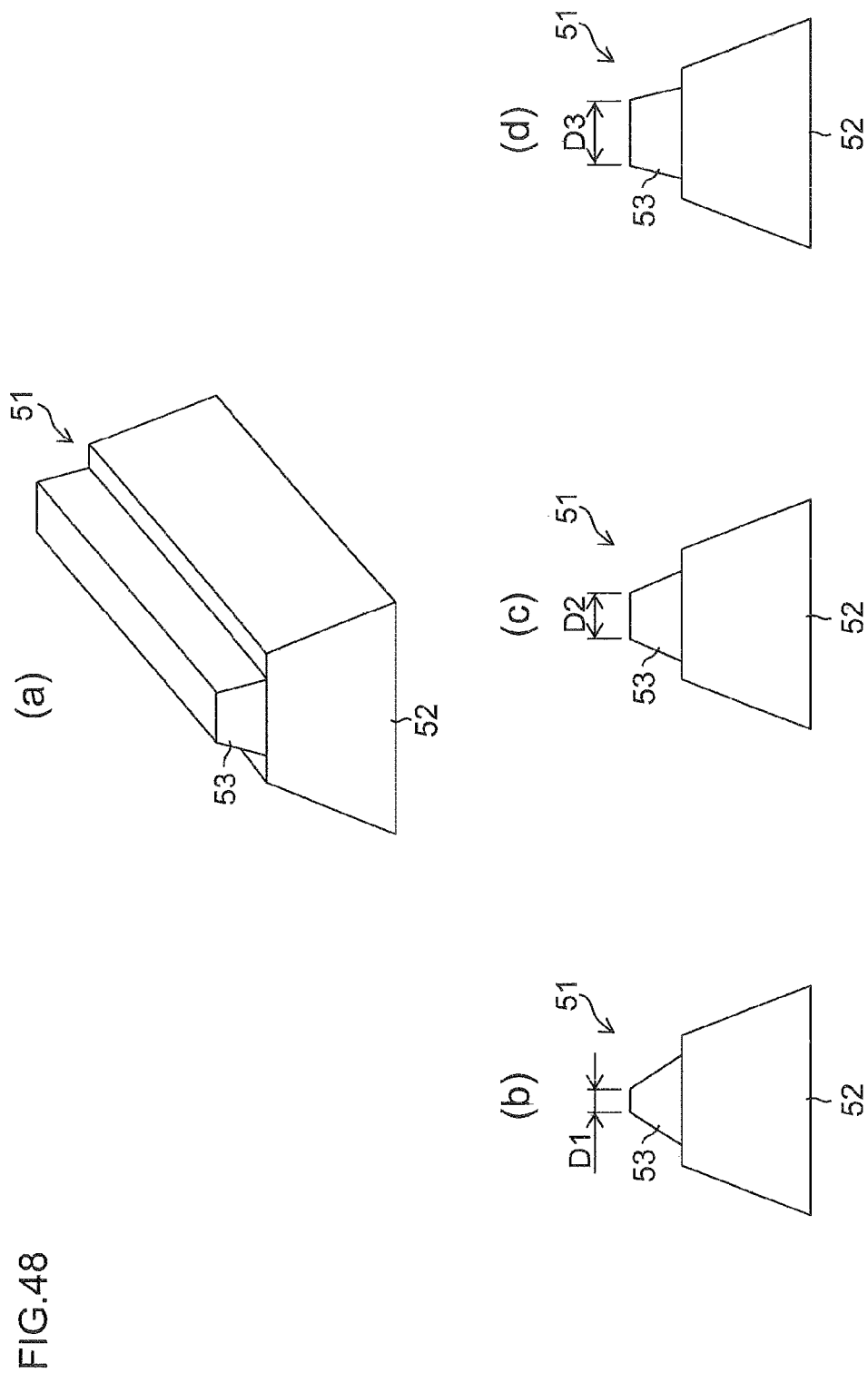
FIG. 48 is an external view of protrusions to describe an example of correcting a relief engraving shape (tip volume) for printing of a protruded thin line in accordance with distribution of printing pressure, and includes: a portion (a) that is a perspective view that shows an appearance of a protrusion for printing of a protruded thin line; a portion (b) that is a cross-sectional view of a protrusion in a case where printing pressure more than normal is applied; a portion (c) that is a cross-sectional view of a protrusion in a case where normal printing pressure is applied; and a portion (d) that is a cross-sectional view of a protrusion in a case where printing pressure less than normal is applied.

FIG. 48 is an external view of the protrusions 51 (relief 50) to describe an example of correcting a relief engraving shape (tip volume) for printing of a protruded thin line in accordance with distribution of printing pressure, and includes: a portion (a) that is a perspective view that shows an appearance of the protrusion 51 for printing of a protruded thin line; a portion (b) that is a cross-sectional view of the protrusion 51 in a case where printing pressure more than normal is applied; a portion (c) that is a cross-sectional view of the protrusion 51 in a case where normal printing pressure is applied; and a portion (d) that is a cross-sectional view of the protrusion 51 in a case where printing pressure less than normal is applied.

The base 52 of the protrusion 51 for printing of a protruded thin line of the present example has a quadrangular prism shape with a side face in a trapezoidal shape as with the protrusions 51 of FIG. 47, and the tip 53 also has a quadrangular prism shape with a side face in a trapezoidal shape.

For example, in a case where printing pressure applied at a position of interest is within a normal range to be expected due to less influence from the periphery of the position of interest, a size (width) of an "apex (ground portion) that is brought into contact with the printing medium 3" of the tip 53 of the protrusion 51 is also set at a normal size (refer to "D2" in the portion (c) of FIG. 48) so that volume of the tip 53 of the protrusion 51 also becomes normal. Meanwhile, in a case where the printing pressure applied at the position of interest is more than (excessively more than) a normal amplitude to be expected due to influence from the periphery of the position of interest, a size (width) of a ground portion that is brought into contact with the printing medium 3, of the tip 53, is determined so that the volume of the tip 53 of the protrusion 51 is reduced (refer to "D1" in the portion (b) of FIG. 48) as compared with that at the time of normal printing pressure (the portion (c) of FIG. 47). Accordingly, it is possible to perform prediction correction for reducing "expansion of the ground portion and the printed image 90" that may be caused by deformation of the protrusion 51 (tip 53). In addition, in a case where the printing pressure applied at the position of interest is less than (excessively less than) the normal amplitude to be expected due to influence from the periphery of the position of interest, a size (width) of the ground portion that is brought into contact with the printing medium 3, of the tip 53, is determined so that the volume of the tip 53 of the protrusion 51 is increased (refer to "D3" in the portion (d) of FIG. 47) as compared with that at the time of normal printing pressure (the portion (c) of FIG. 47). Accordingly, it is possible to perform prediction correction for reducing influence of "reduction of the ground portion and the printed image 90 in size" that may be caused by lack of deformation of the protrusion 51 (tip 53) due to small amplitude of printing pressure.

In addition, an engraving shape (engraving shape data) of the relief 50 (protrusions 51) for a protruded thin line of the flexographic printing plate 1 may be adjusted by a technique other than the above, and in combination with the techniques shown in FIGS. 47 to 48 described above, a width and height of the tip 53 of the protrusion 51, a width and height of the base 52, a size ratio (volume ratio) between the tip 53 and the base 52, and the like, may be appropriately adjusted.

(Example of Variation)

As described above, when the flexographic printing plate 1 (refer to FIG. 14) on which the image relief 12 and the printing pressure management relief 14 are formed is pressed on the printing medium 3, image contents based on image data is printed on the printing medium 3 with the image relief 12 and a printing pressure management chart that is an index of amplitude of printing pressure during actual printing is printed on the printing medium 3 with the printing pressure management relief 14.

The printing pressure management chart may be visually checked by a user, or may be mechanically checked by an imaging apparatus or the like.

Figure 49:
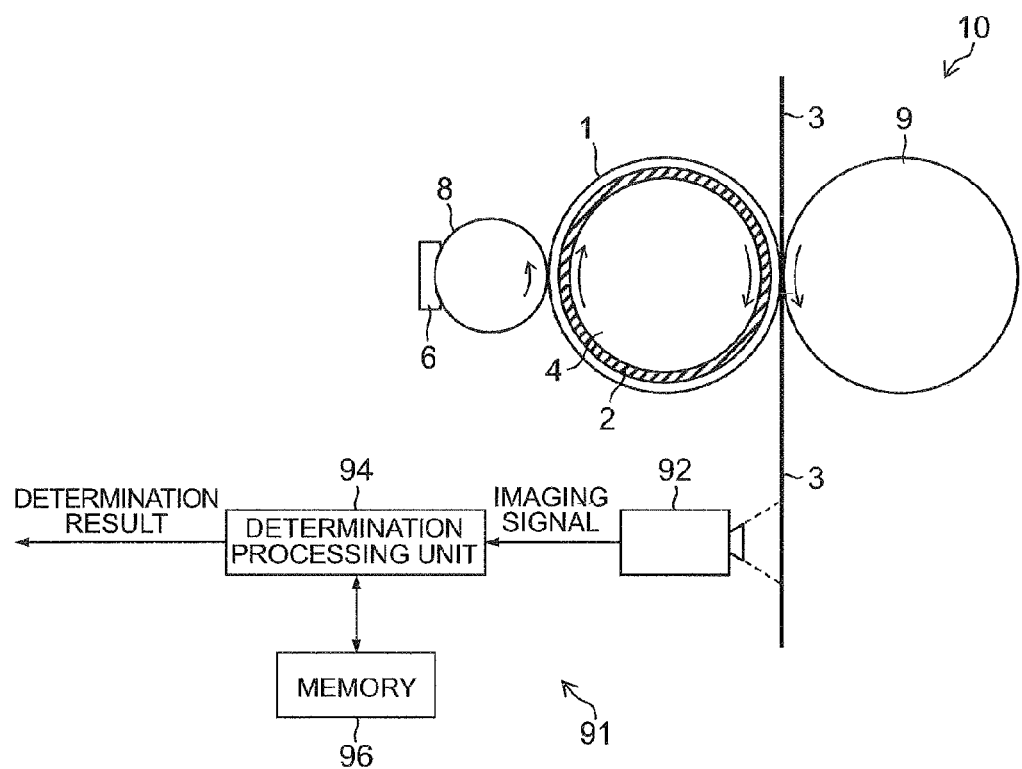
FIG. 49 shows an example of a configuration of a printing pressure determination device.

FIG. 49 shows an example of a configuration of a printing pressure determination device 91. The printing pressure determination device 91 of the present example is provided on a downstream side in a direction of feeding a medium in the flexographic printing press 10 (a lower side of FIG. 49), and includes an imaging unit 92, a determination processing unit 94, and a memory 96.

The imaging unit 92 is a camera taking an image printed on a printed matter P, and outputs an imaging signal showing the image taken to the determination processing unit 94. The determination processing unit 94 detects optical density at a predetermined portion in the image shown by the imaging signal. The predetermined portion includes a portion where the printing pressure management chart is to be printed with the printing pressure management relief. The memory 96 stores a table showing a relationship between optical density of the predetermined portion and printing pressure applied on a plate face of a printing letterpress C during printing. The determination processing unit 94 is capable of determining (estimating) printing pressure corresponding to the optical density detected with reference to the table stored in the memory 96. Then, the determination processing unit 94 determines that printing has been performed on the printing medium 3 under optimum printing pressure (proper printing pressure) if the printing pressure determined is within a predetermined range. Meanwhile, the determination processing unit 94 determines that the printing has been performed on the printing medium 3 under excess printing pressure (proper printing pressure) or too small printing pressure if the printing pressure determined is out of a predetermined range. A determination result obtained by the determination processing unit 94 is notified to external (such as a user) by an arbitrary technique.

The present invention is not limited to the embodiments described above, and therefore it is needless to say that a variety of modifications are possible within a range without departing from the spirit of the present invention.

What is claimed is:

1. A platemaking method of forming relief based on relief pattern data in a printing plate to be pressed on a printing medium, the platemaking method comprising the steps of:
    calculating relief pattern data on the basis of image data;
    estimating distribution of printing pressure of a printing plate pressed on a printing medium on the basis of the image data;
    acquiring setting printing pressure;
    calculating an amount of correction of the relief pattern data on the basis of the distribution of printing pressure and the setting printing pressure;
    correcting the relief pattern data on the basis of the amount of correction; and
    forming the relief based on the corrected relief pattern data.

2. The platemaking method according to claim 1, wherein the relief includes an image relief based on the image data, and a printing pressure management relief for printing a management index of the printing pressure between the printing plate and the printing medium, and wherein the printing pressure management relief is formed in the printing plate on the basis of the setting printing pressure.

3. The platemaking method according to claim 1, further comprising the step of acquiring distribution data of plate thickness showing distribution of plate thickness of a printing plate, wherein the distribution of printing pressure is estimated on the basis of the image data and the distribution data of plate thickness.

4. The platemaking method according to claim 1, wherein the distribution of printing pressure is estimated on the basis of an area ratio of a portion with which the printing medium is to be brought into contact within a prescribed range of the printing plate.

5. The platemaking method according to claim 1, wherein the relief includes a plurality of protrusions, and the relief pattern data includes height data of the plurality of protrusions and shape data of the plurality of the protrusions, and wherein the amount of correction of the relief pattern data relates to at least any one of the height data and the shape data.

6. The platemaking method according to claim 5, wherein each of the plurality of the protrusions includes a base and a tip provided on the base, on which a printing medium is pressed, and wherein the shape data of the plurality of the protrusions includes at least shape data of the tip.

7. The platemaking method according to claim 6, wherein the shape data of the tip of each of the plurality of protrusions includes data on a portion of the tip that is to be brought into contact with the printing medium during printing.

8. The platemaking method according to claim 5, wherein the plurality of the protrusions includes a base and a tip provided on the base, on which a printing medium is pressed, and wherein the height data of the plurality of the protrusions relates to at least any one of tip height, base height, and entire height of the tip and the base.

9. The platemaking method according to claim 1, wherein the relief includes a plurality of protrusions, and the relief pattern data includes volume data of the plurality of the protrusions, and wherein the amount of correction of the relief pattern data relates to the volume data of the plurality of the protrusions.

10. The platemaking method according to claim 1, further comprising the step of forming the relief on the printing plate on the basis of the relief pattern data corrected.

11. The platemaking method according to claim 10, wherein the relief is formed on the printing plate by exposure processing with respect to the printing plate, and exposure characteristics related to a thickness direction of the printing plate are derived on the basis of the distribution data of plate thickness so that the relief is formed on the printing plate by the exposure processing in consideration of the exposure characteristics.

12. A platemaking device that forms relief based on relief pattern data in a printing plate to be pressed on a printing medium, the platemaking device comprising:
    a relief calculation unit that calculates relief pattern data on the basis of image data;
    a printing pressure distribution estimation unit that estimates distribution of printing pressure of the printing plate pressed on the printing medium on the basis of the image data;
    a setting printing pressure acquisition unit that acquires setting printing pressure;
    a correction amount calculation unit that calculates an amount of correction of the relief pattern data on the basis of the distribution of printing pressure and the setting printing pressure;
    a data correction unit that corrects the relief pattern data on the basis of the amount of correction; and
    a relief forming unit that forms the relief based on the corrected relief pattern data.

13. A printing press comprising:
    the platemaking device according to claim 12; and
    a printing unit that presses the printing plate in which relief is formed by the platemaking device on a printing medium.

* * * * *